US008867126B2

(12) United States Patent
Shirota et al.

(10) Patent No.: US 8,867,126 B2
(45) Date of Patent: *Oct. 21, 2014

(54) MICROSCOPE CONTROLLER AND MICROSCOPE SYSTEM HAVING MICROSCOPE CONTROLLER

(71) Applicant: Olympus Corporation, Tokyo (JP)

(72) Inventors: Tetsuya Shirota, Tokyo (JP); Katsuyoshi Yamaguchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/573,775

(22) Filed: Oct. 4, 2012

(65) Prior Publication Data
US 2013/0038931 A1 Feb. 14, 2013

Related U.S. Application Data

(63) Continuation of application No. PCT/JP2011/058554, filed on Apr. 4, 2011.

(30) Foreign Application Priority Data

Apr. 5, 2010 (JP) ................................ 2010-086751
May 18, 2010 (JP) ................................ 2010-114567

(51) Int. Cl.
*G02B 21/26* (2006.01)
*G02B 21/36* (2006.01)

(52) U.S. Cl.
CPC ............. *G02B 21/26* (2013.01); *G02B 21/365* (2013.01)
USPC .......................................... 359/392; 359/393

(58) Field of Classification Search
USPC ................................ 359/392, 393
See application file for complete search history.

(56) References Cited

U.S. PATENT DOCUMENTS 5,557,456 A * 9/1996 Garner et al. ................. 359/393
6,151,161 A * 11/2000 Mayer et al. .................. 359/392

(Continued)

FOREIGN PATENT DOCUMENTS

JP 06-004213 A 1/1994
JP 07-103735 A 4/1995

(Continued)

OTHER PUBLICATIONS

International Search Report dated Jun. 28, 2011 (in English) issued in parent International Application No. PCT/JP2011/058554.

(Continued)

*Primary Examiner* — Frank Font
(74) *Attorney, Agent, or Firm* — Holtz, Holtz, Goodman & Chick PC

(57) ABSTRACT

A microscope controller improves the operability in moving a stage when a stage moving operation is performed on a touch panel. The microscope controller for control of the operation of each electric unit configuring the microscope system solves problems by including: a touch panel unit having a display function and receiving an input by an external physical contact; a control unit for setting a display region as a function area by assigning an image for operation of the electric unit to a specified display region of the touch panel unit, and, when an input to the function area is detected, generating a control instruction signal for control of the electric unit depending on the contact operation to the electric unit corresponding to the function area, and a communication control unit for transmitting the control instruction signal to an external device for controlling the operation of the electric unit.

17 Claims, 79 Drawing Sheets

(56) References Cited

U.S. PATENT DOCUMENTS

| | | | |
|---|---|---|---|
| 6,989,928 B2 * | 1/2006 | Kawanabe et al. | 359/392 |
| 7,180,662 B2 * | 2/2007 | Rondeau et al. | 359/393 |
| 7,426,345 B2 * | 9/2008 | Takamatsu et al. | 396/432 |
| 7,630,129 B2 * | 12/2009 | Kawanabe et al. | 359/393 |
| 8,184,150 B2 * | 5/2012 | Mizusawa | 348/79 |
| 8,309,921 B2 * | 11/2012 | Bierhoff et al. | 250/310 |
| 8,466,958 B2 | 6/2013 | Shirota et al. | |
| 2005/0105174 A1 | 5/2005 | Ogihara et al. | |
| 2007/0247441 A1 | 10/2007 | Kim et al. | |
| 2009/0052022 A1 * | 2/2009 | Wagener et al. | 359/385 |
| 2009/0066668 A1 | 3/2009 | Kim et al. | |
| 2009/0322870 A1 * | 12/2009 | Fujiki | 348/79 |
| 2010/0020393 A1 * | 1/2010 | Mazzio | 359/392 |
| 2010/0110031 A1 | 5/2010 | Miyazawa et al. | |
| 2010/0230590 A1 * | 9/2010 | Bierhoff et al. | 250/310 |

FOREIGN PATENT DOCUMENTS

| | | |
|---|---|---|
| JP | 7-199077 A | 8/1995 |
| JP | 08-086965 A | 4/1996 |
| JP | 08-223563 A | 8/1996 |
| JP | 10-333053 A | 12/1998 |
| JP | 2001-059940 A | 3/2001 |
| JP | 2001-091854 A | 4/2001 |
| JP | 2005-114859 A | 4/2005 |
| JP | 2007-034050 A | 2/2007 |
| JP | 2007-293820 A | 11/2007 |
| JP | 2008-292578 A | 12/2008 |
| JP | 2010108273 A | 5/2010 |
| JP | 2011-022283 A | 2/2011 |
| WO | WO 96/18924 A1 | 6/1996 |

OTHER PUBLICATIONS

Japanese Office Action dated Apr. 1, 2014 issued in counterpart Japanese Application No. 2010-086751.

Japanese Office Action dated Apr. 1, 2014 issued in counterpart Japanese Application No. 2010-114567.

Japanese Office Action dated Aug. 5, 2014 in counterpart Japanese Application No. 2010-114567.

* cited by examiner

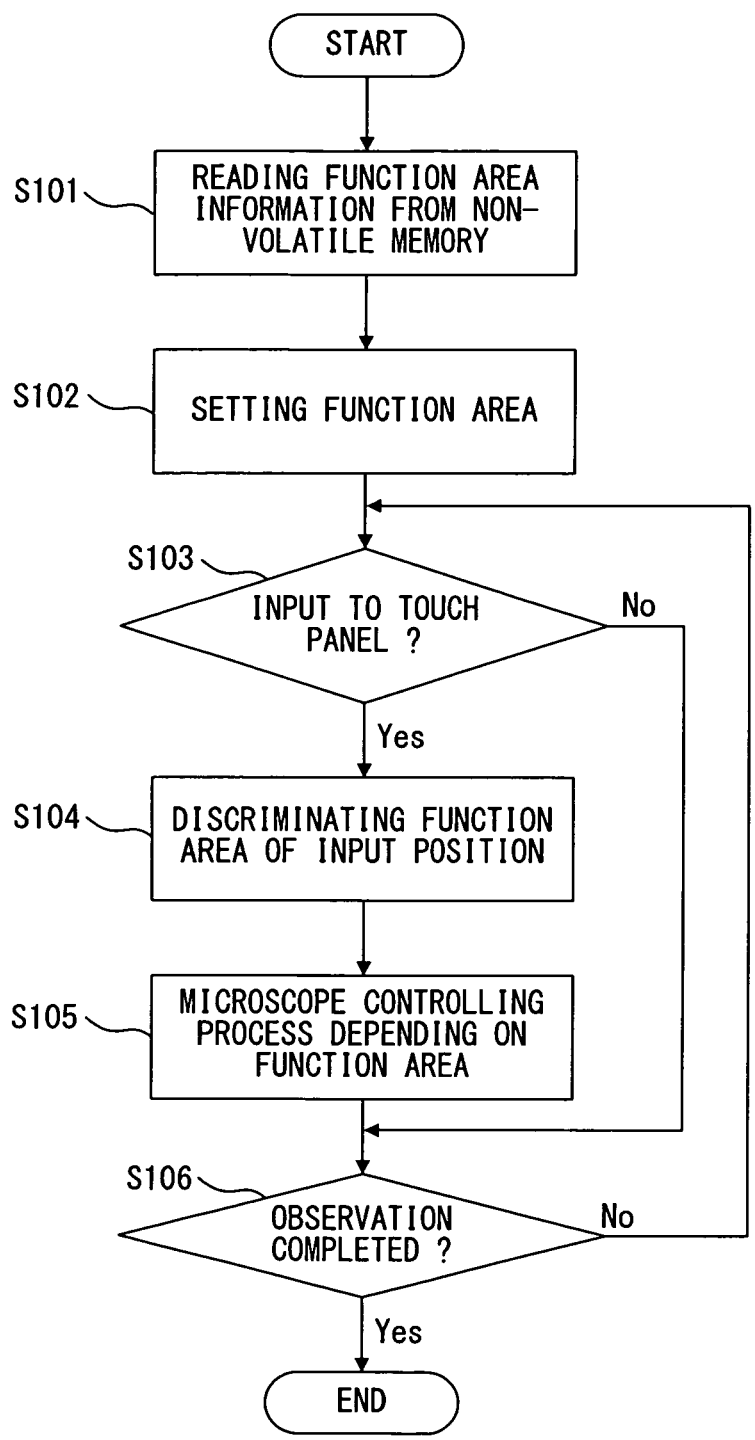
F I G. 5

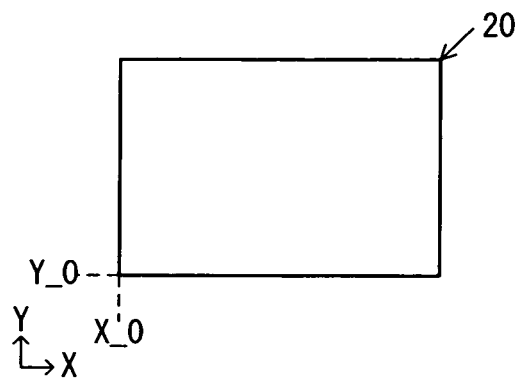
F I G. 7B

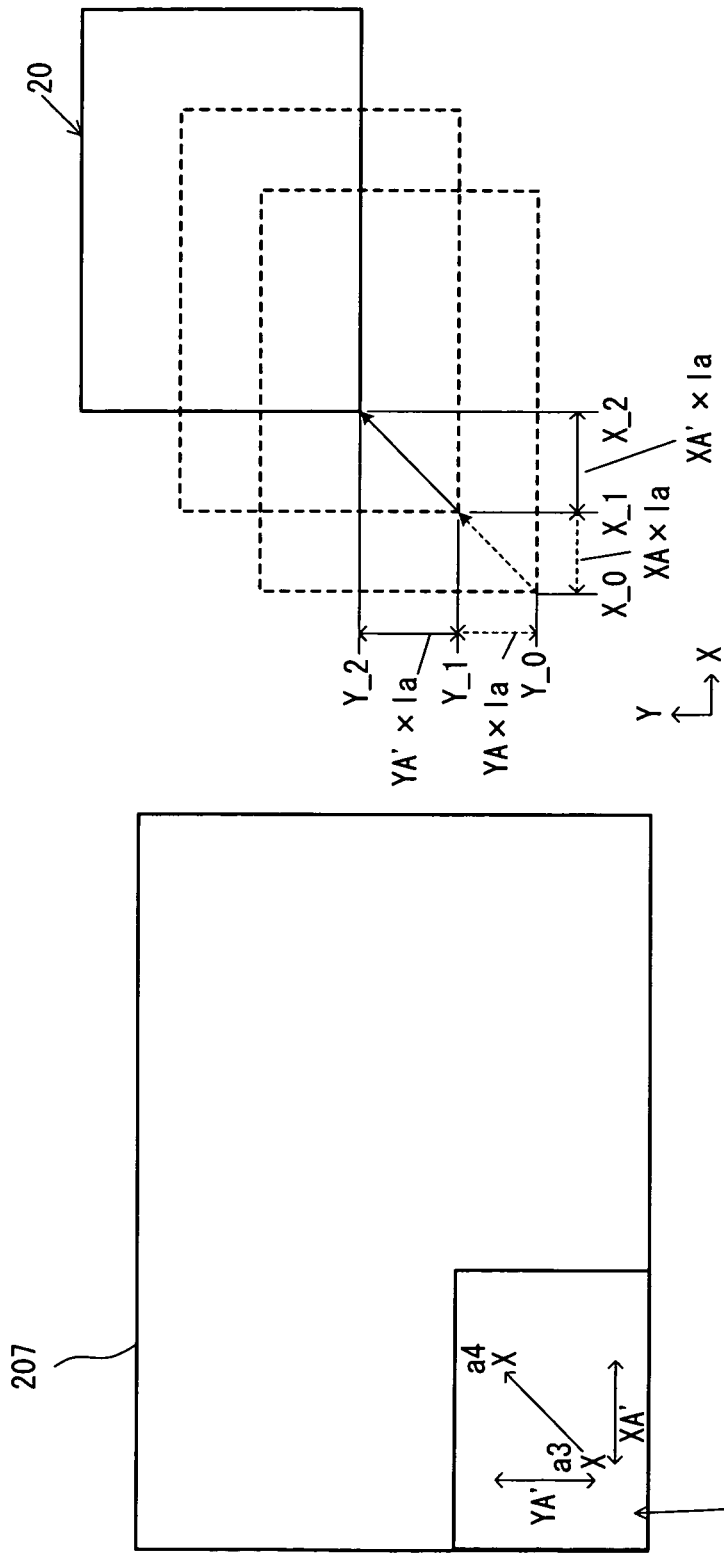

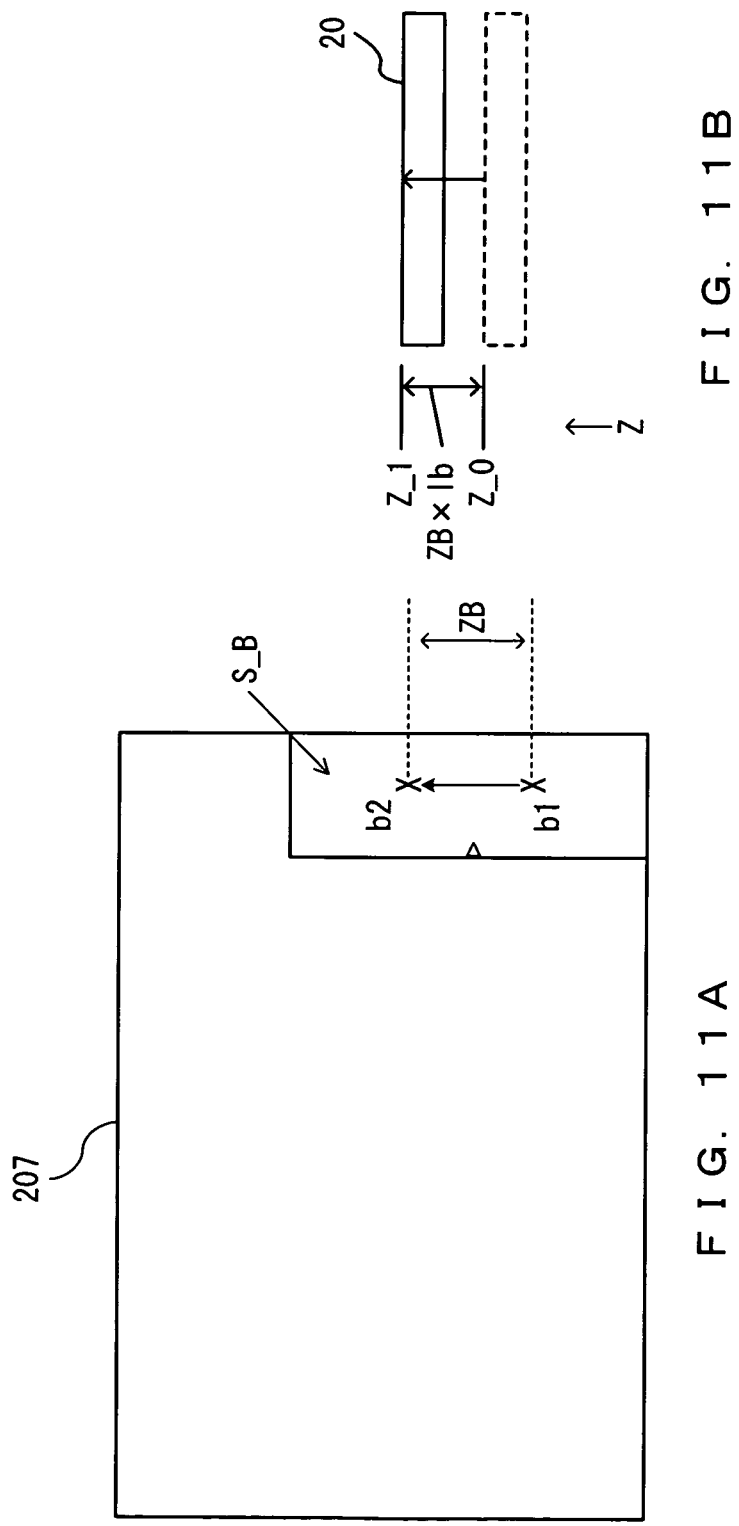

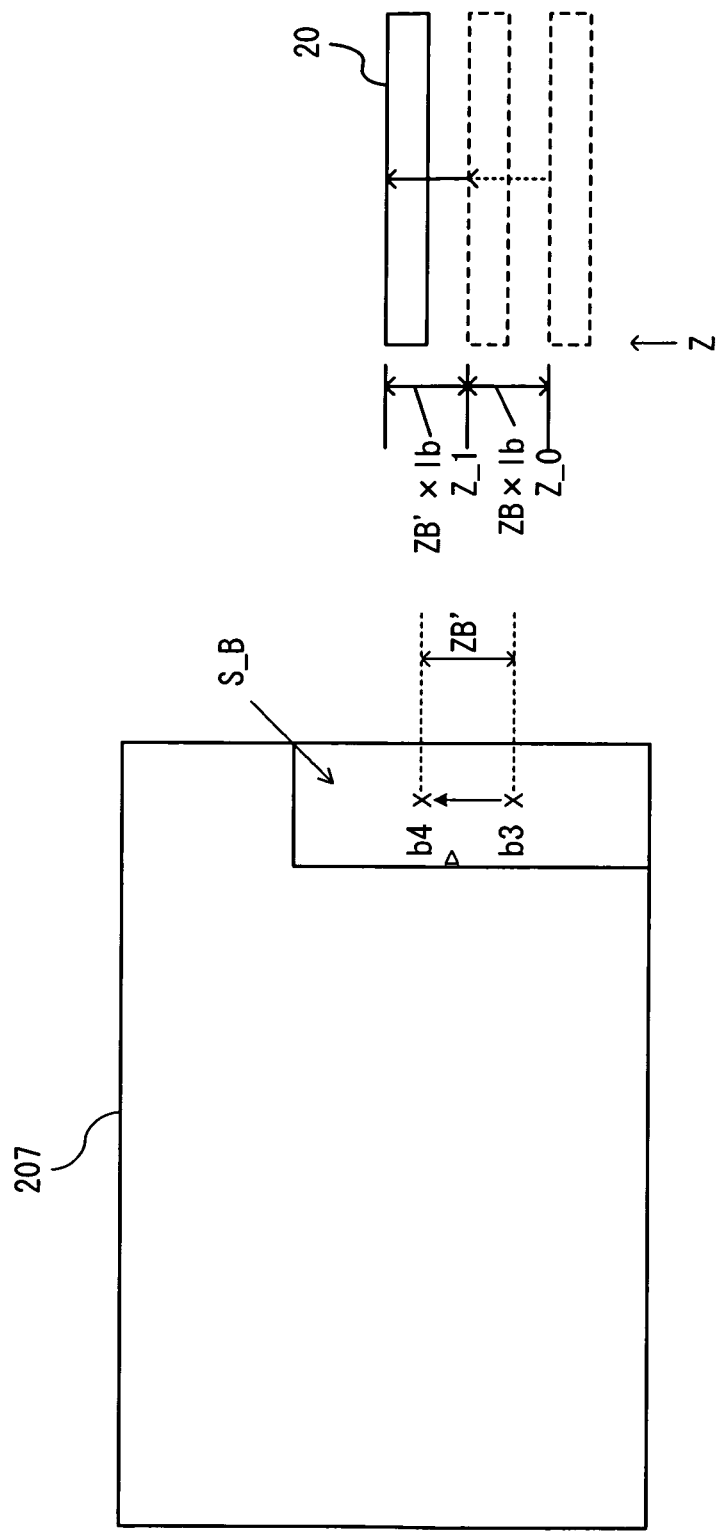

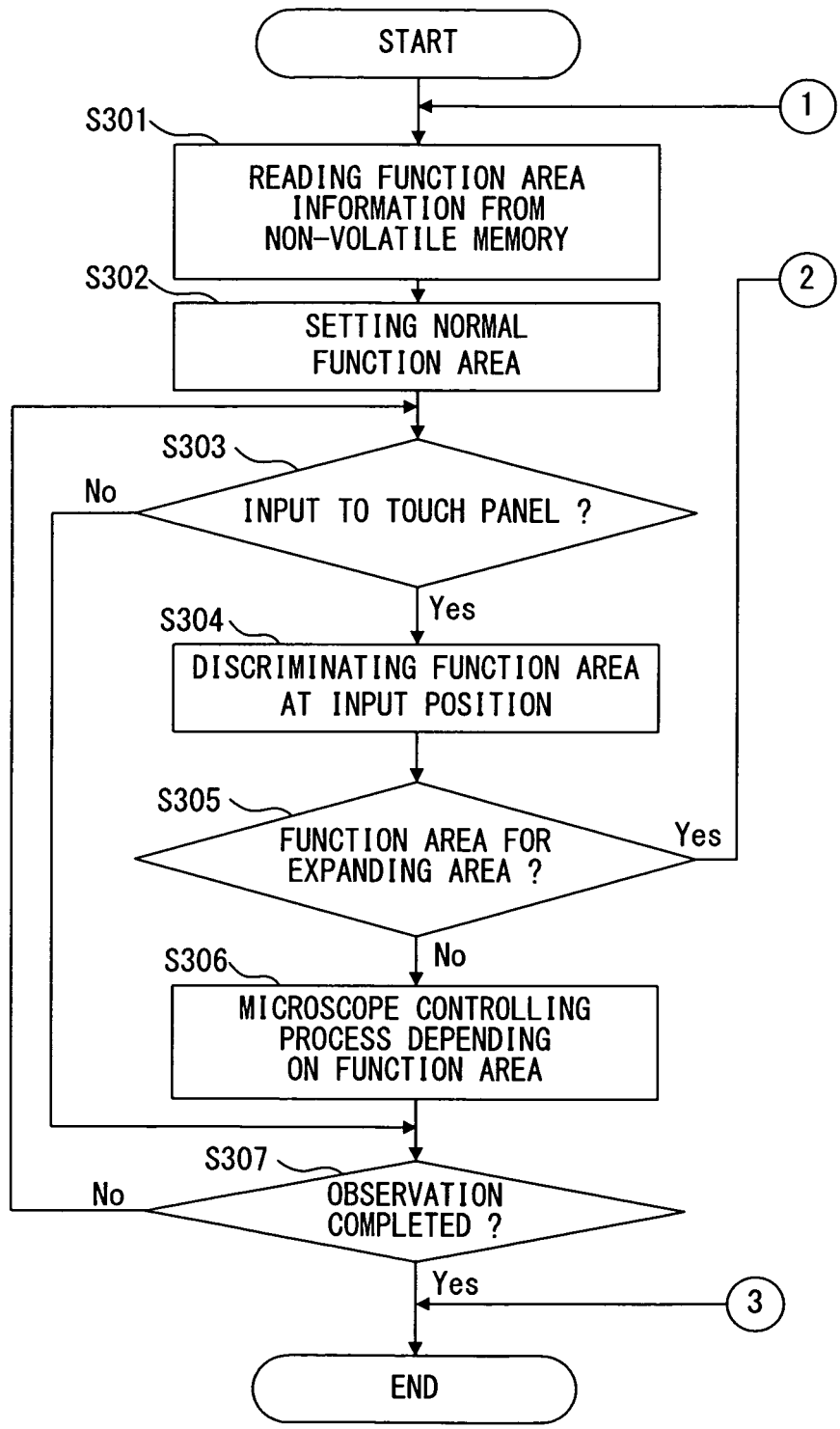
F I G. 17A

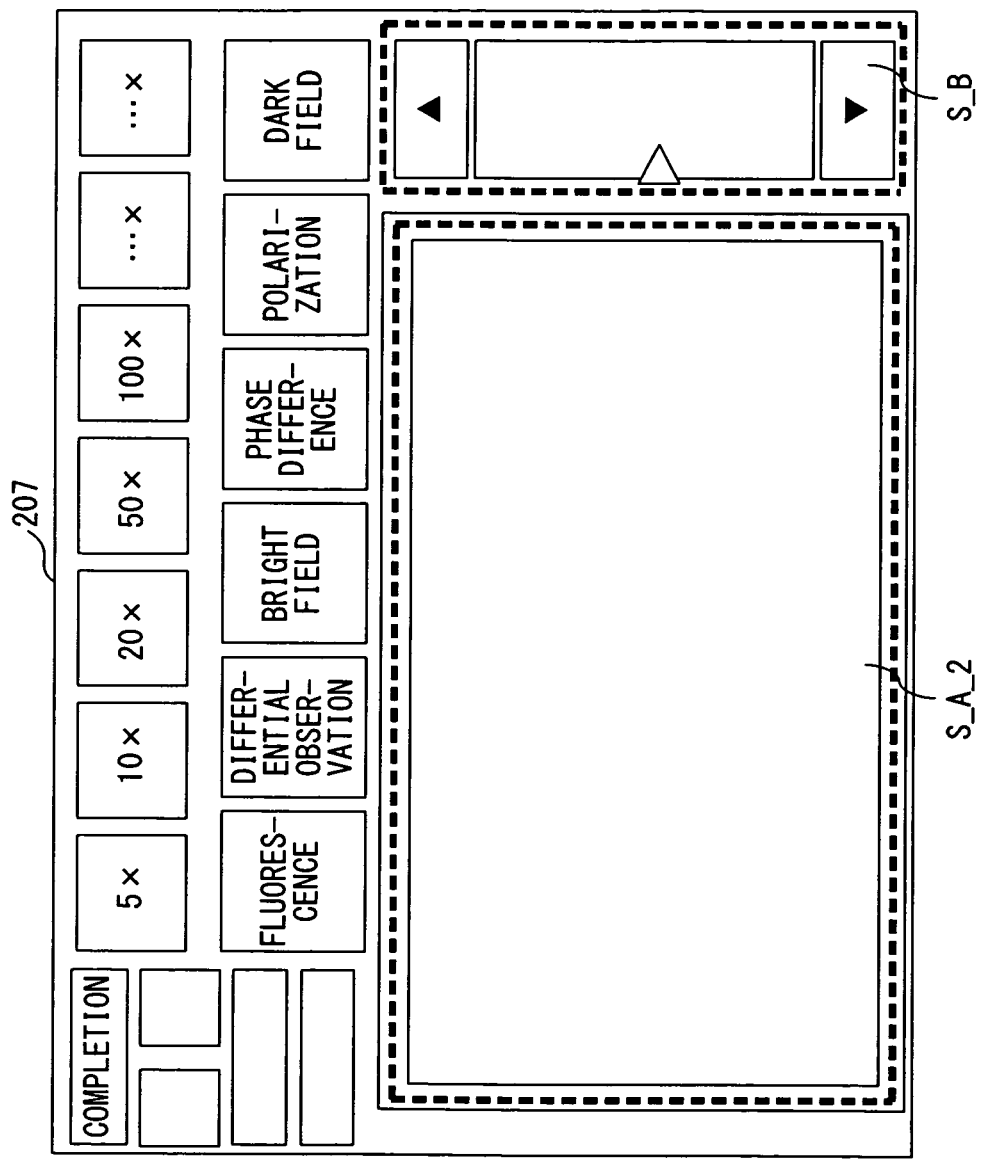

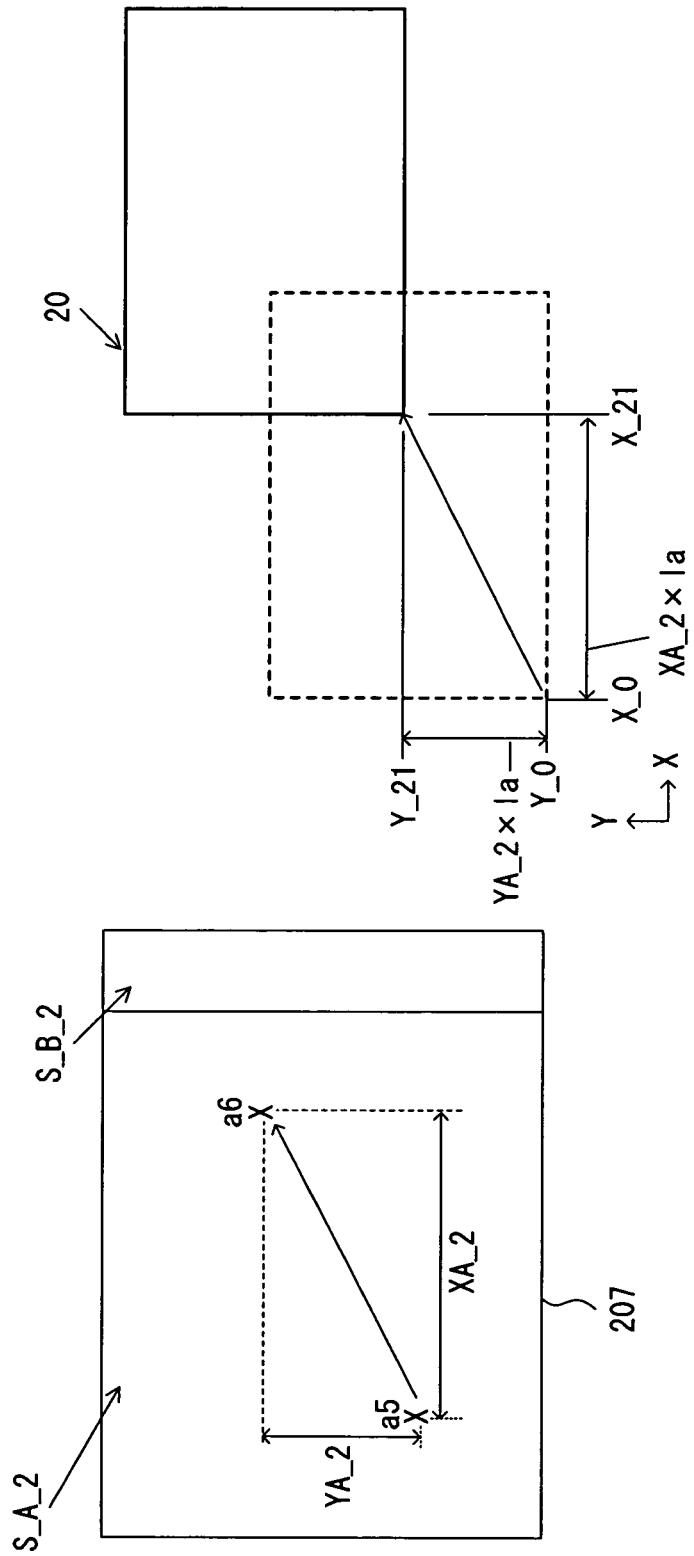

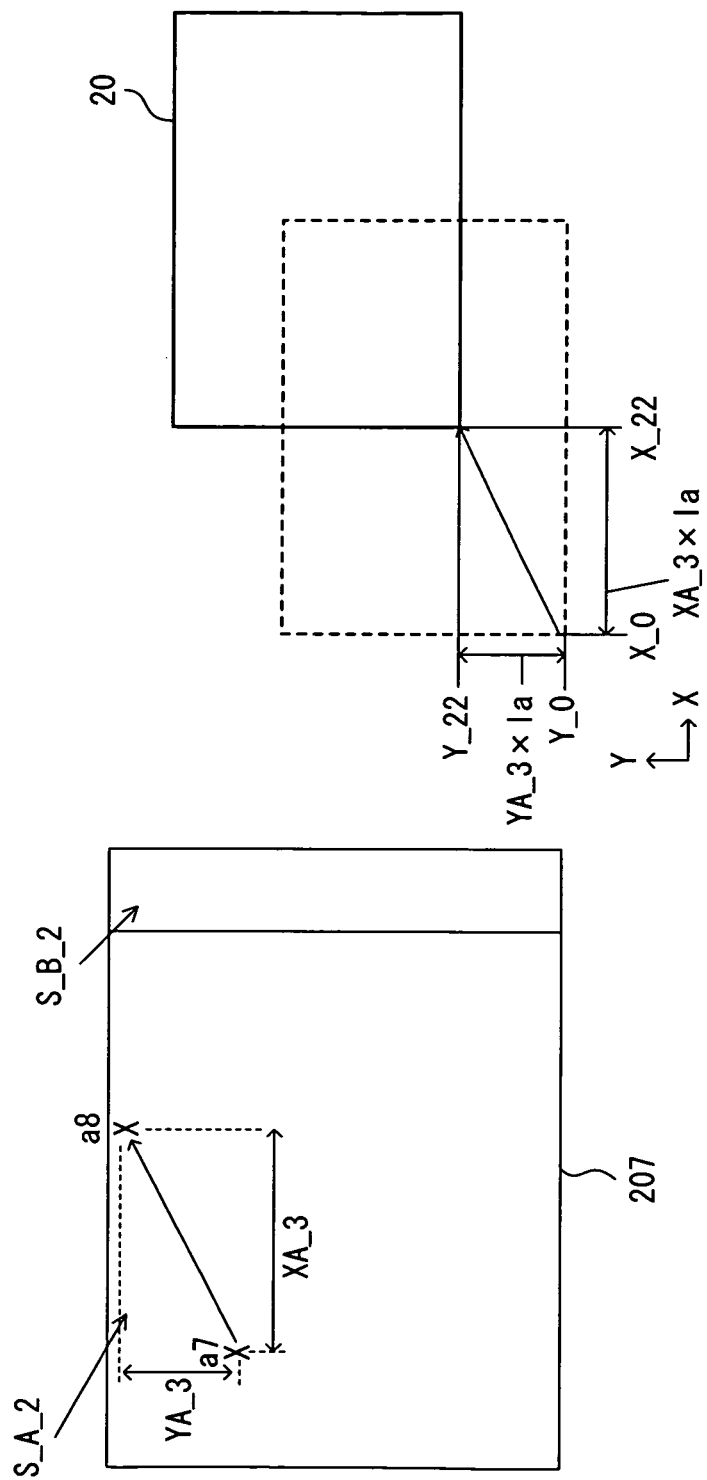

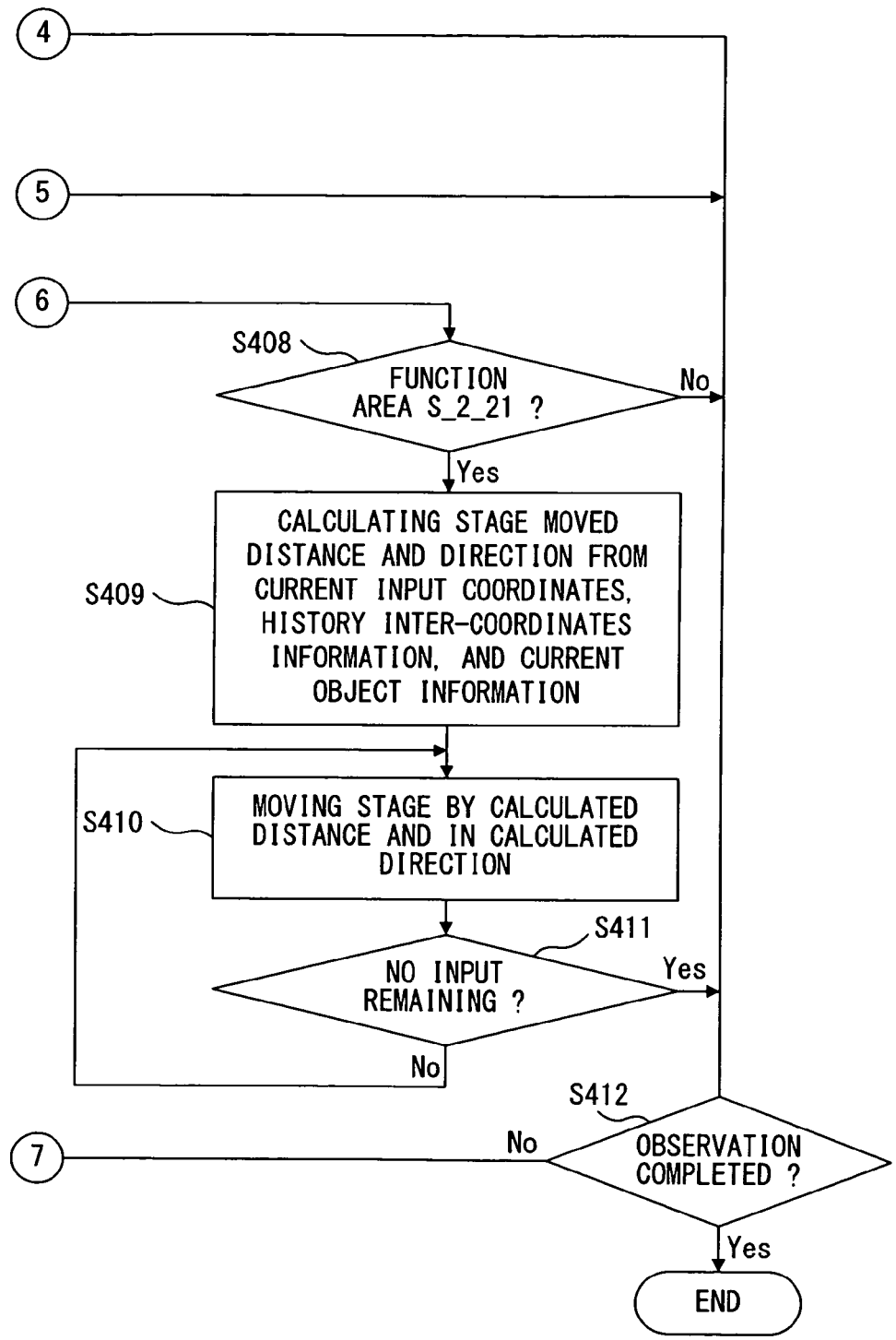
F I G. 2 2 B

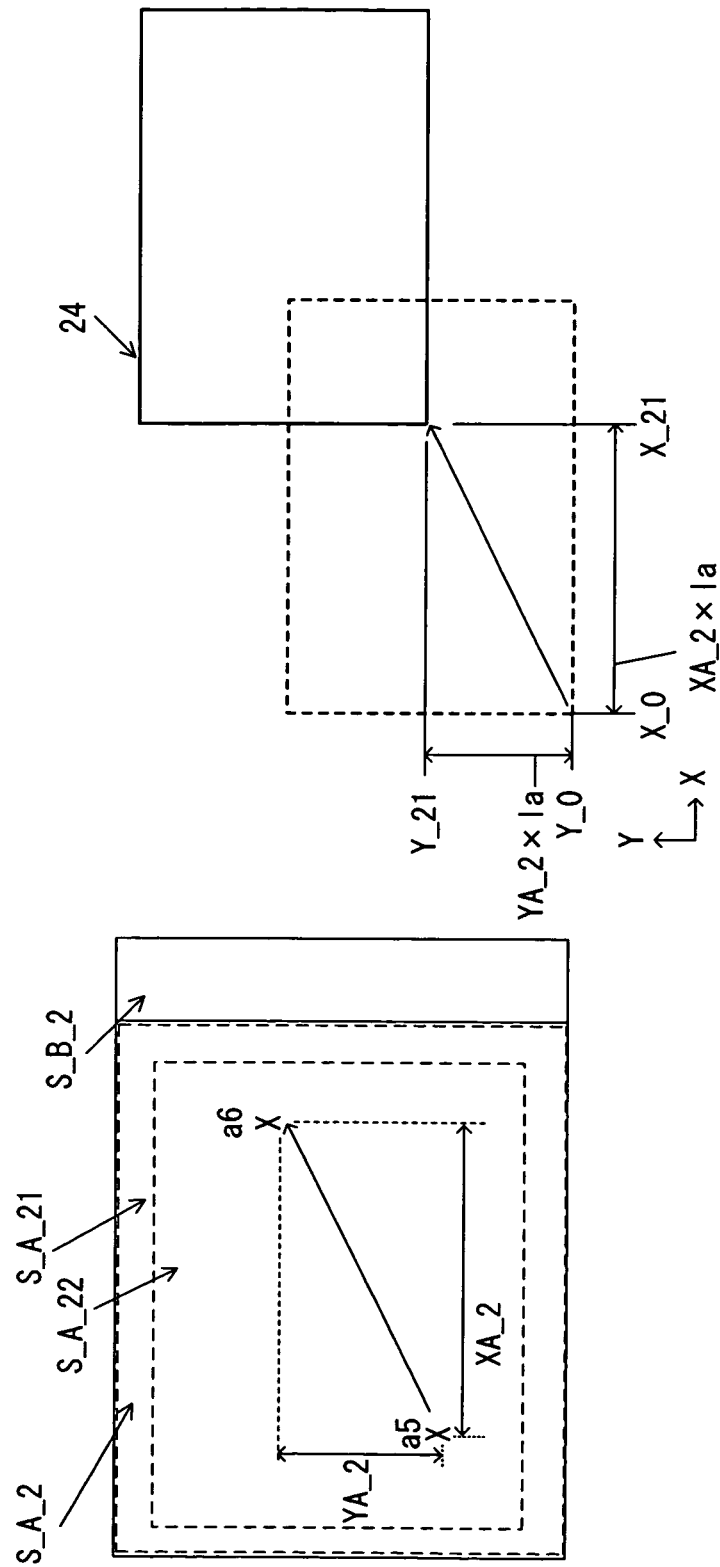

| ID | OBJECTIVE | CONTINUOUS MOVING SPEED |
|---|---|---|
| 1 | 5x | V1 |
| 2 | 10x | V2 |
| 3 | 20x | V3 |
| 4 | 50x | V4 |
| 5 | 100x | V5 |
| 6 | · | |
| 7 | · | |
| 8 | · | |
| 9 | · | |
| 10 | · | |

FIG. 26

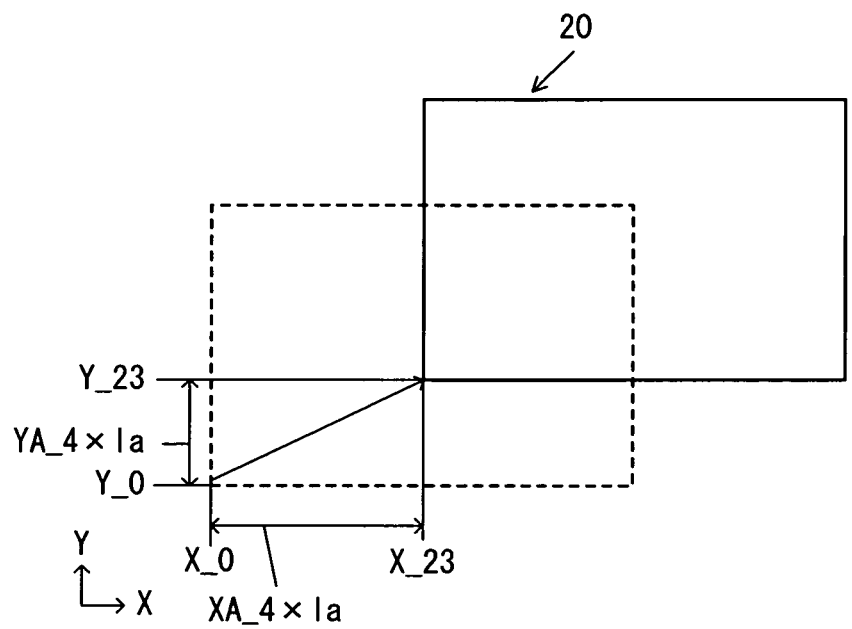
F I G. 27B

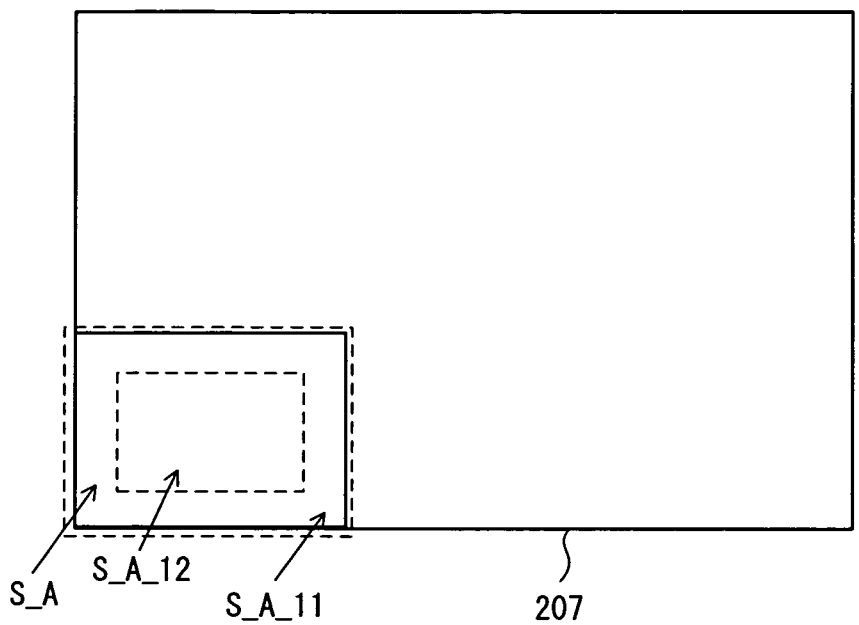
F I G. 2 9

| ID | OBJECTIVE | MOVING SPEED | MOVED DISTANCE |
|---|---|---|---|
| 1 | 5x | V1 | L1 |
| 2 | 10x | V2 | L2 |
| 3 | 20x | V3 | L3 |
| 4 | 50x | V4 | L4 |
| 5 | 100x | V5 | L5 |
| 6 | · | · | · |
| 7 | · | · | · |
| 8 | · | · | · |
| 9 | · | · | · |
| 10 | · | · | · |

FIG. 30

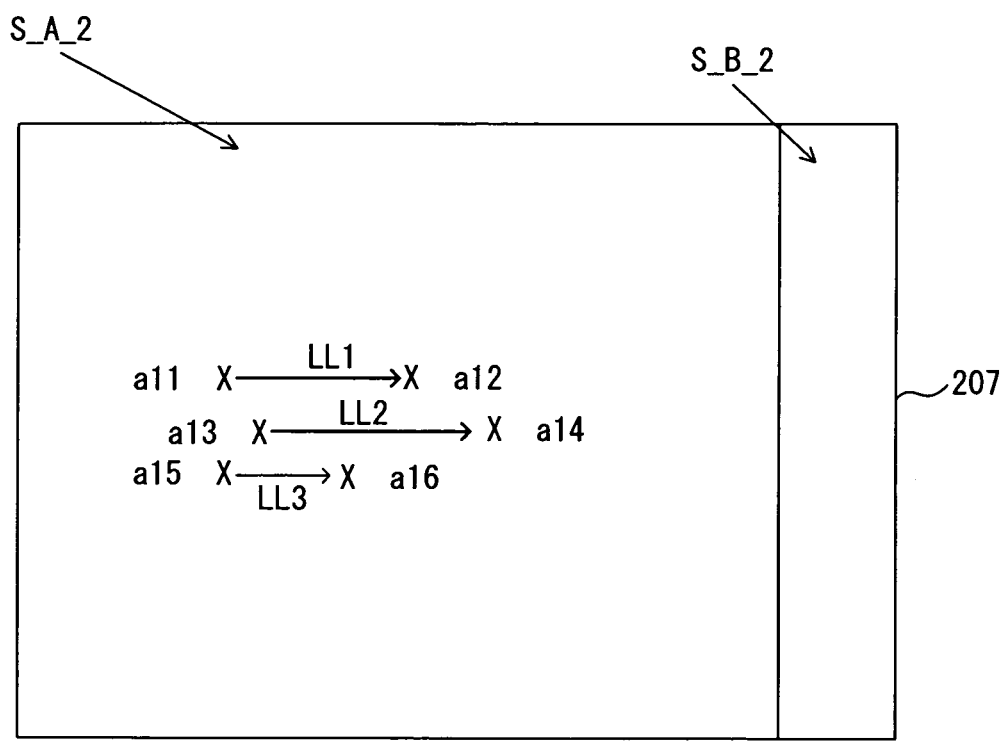
F I G. 3 2 A

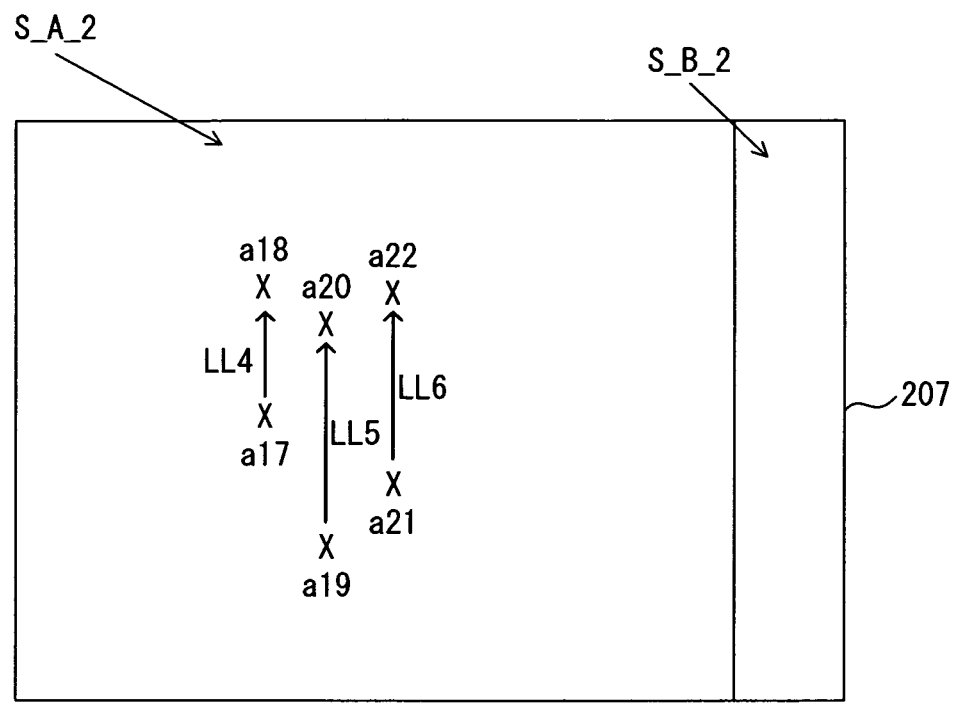
F I G. 3 3 A

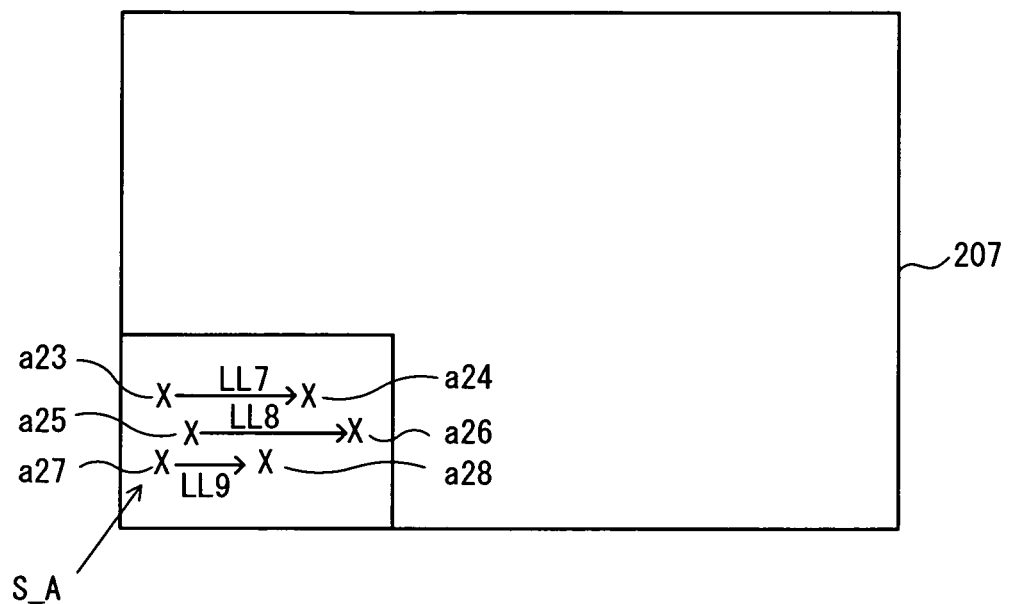
F I G. 3 4 A

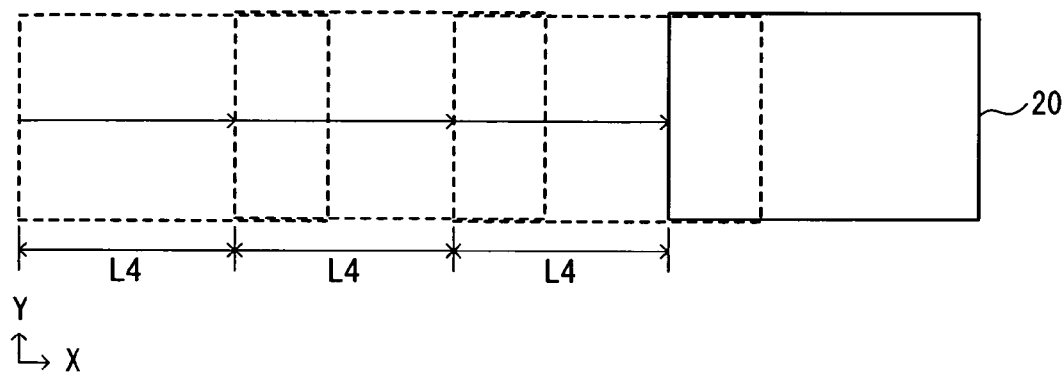
F I G. 3 4 B

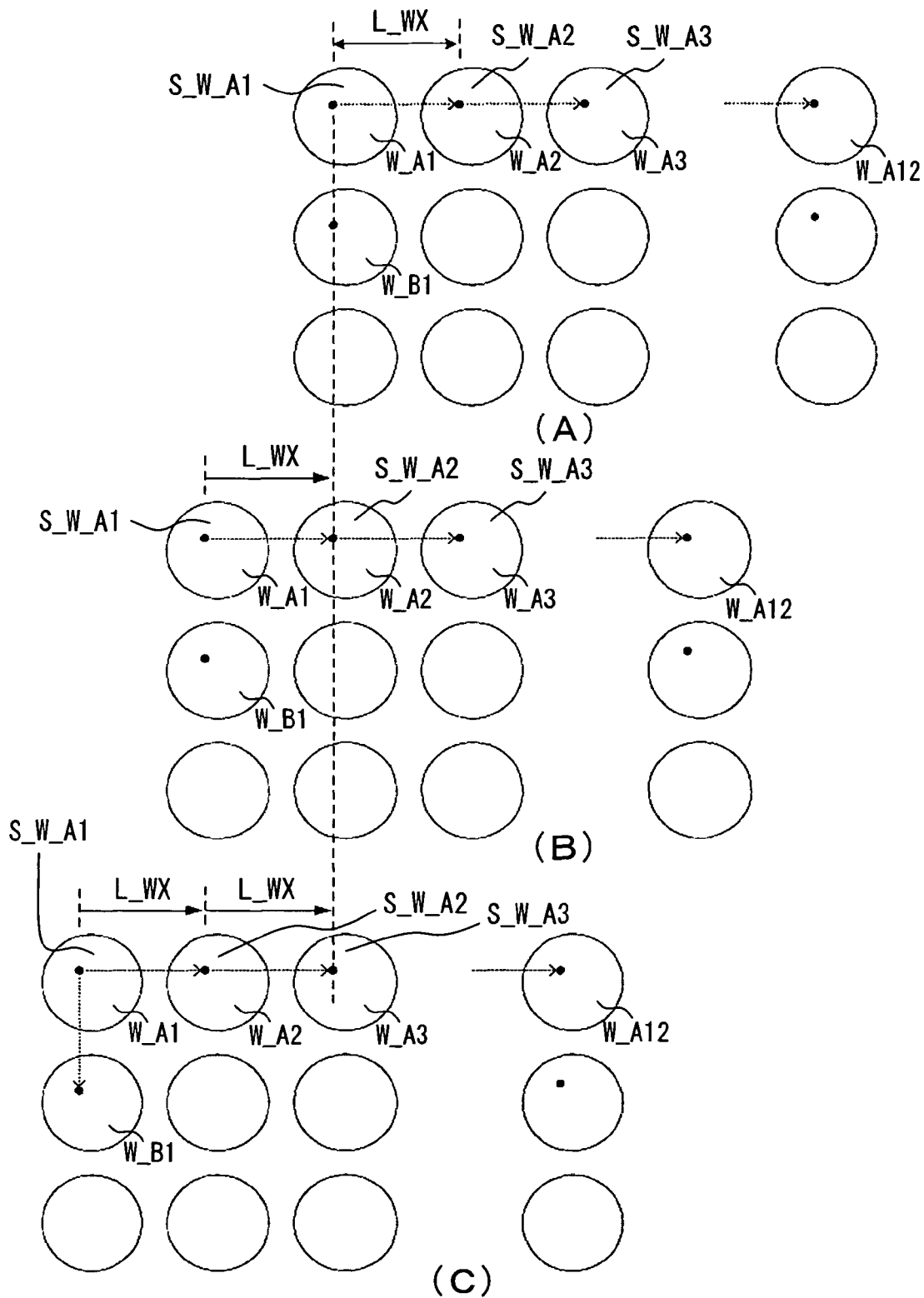
F I G. 4 3

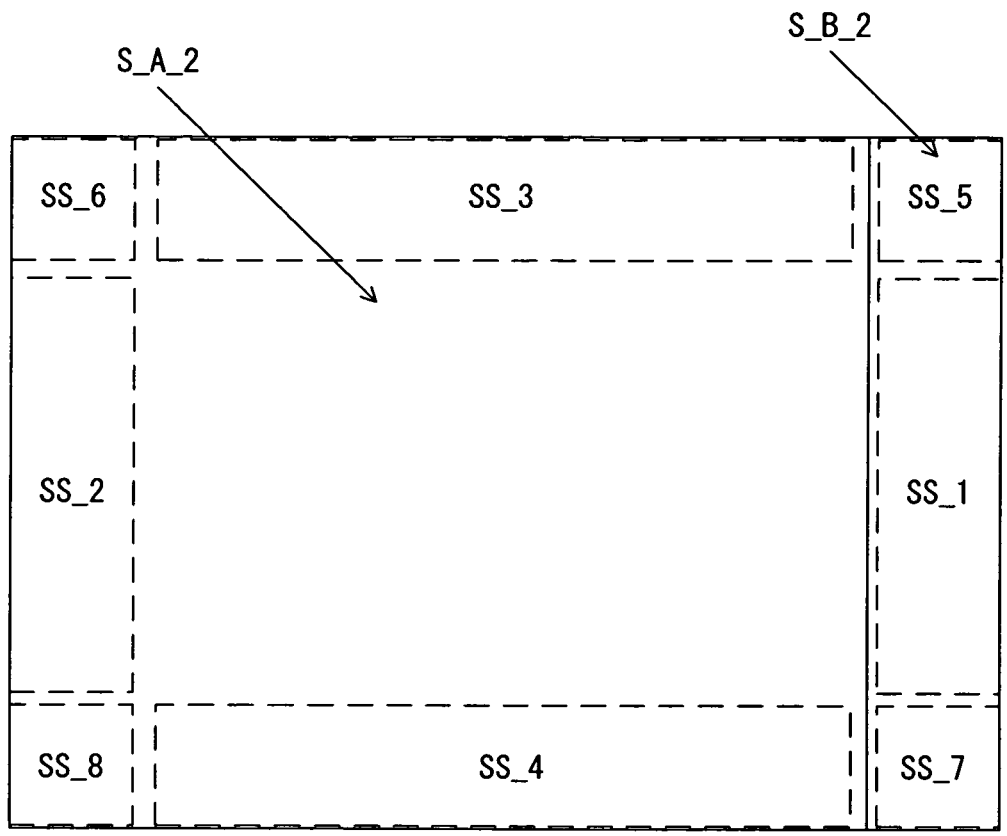
F I G. 4 6

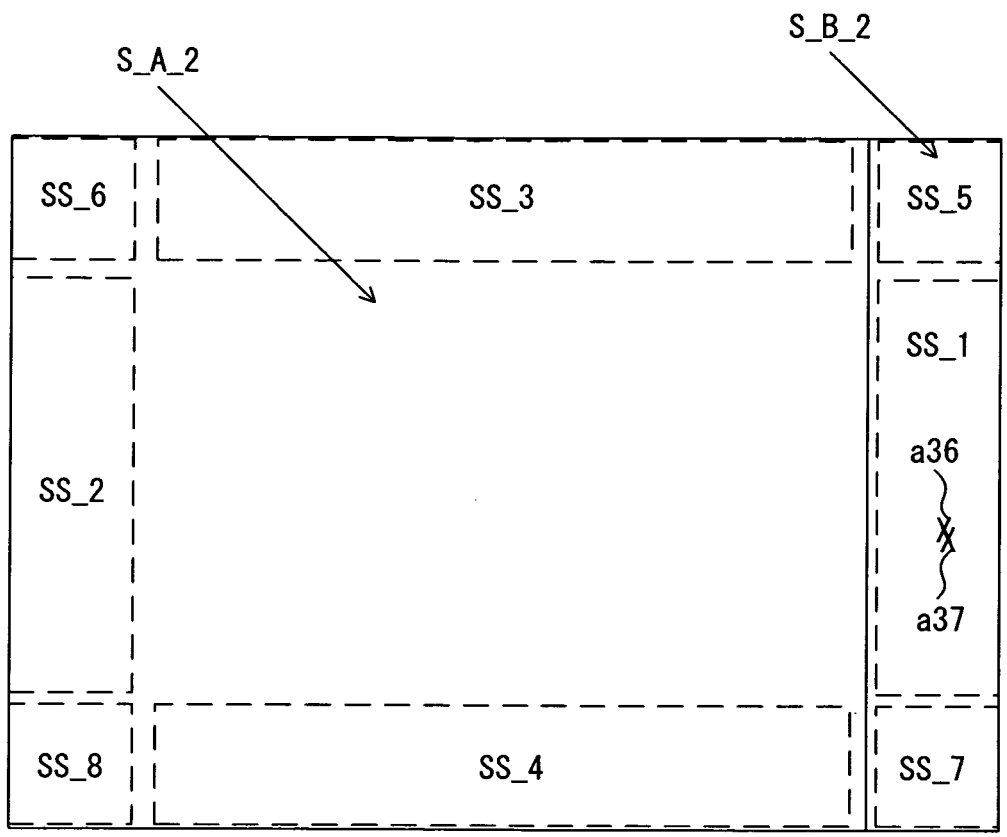
F I G. 4 7

| ID (41) | INPUT AREA (42) | TOUCH PANEL INPUT SPECIFIC OPERATION (43) | DRIVE PORTION (44) | CONTROL CONTENTS (45) |
|---|---|---|---|---|
| ID03 | SS_1 | TWO TIME CONTINUOUS TOUCH INPUT IN SPECIFIED TIME T2 | ELECTRIC STAGE | DRIVE BY DISTANCE OF L_WX IN DIRECTION IN WHICH X COORDINATES INDICATE + VALUE. |
| ID04 | SS_2 | TWO TIME CONTINUOUS TOUCH INPUT IN SPECIFIED TIME T2 | ELECTRIC STAGE | DRIVE BY DISTANCE OF L_WX IN DIRECTION IN WHICH X COORDINATES INDICATE − VALUE |
| ID05 | SS_3 | TWO TIME CONTINUOUS TOUCH INPUT IN SPECIFIED TIME T2 | ELECTRIC STAGE | DRIVE BY DISTANCE OF L_WY IN DIRECTION IN WHICH Y COORDINATES INDICATE + VALUE |
| ID06 | SS_4 | TWO TIME CONTINUOUS TOUCH INPUT IN SPECIFIED TIME T2 | ELECTRIC STAGE | DRIVE BY DISTANCE OF L_WY IN DIRECTION IN WHICH Y COORDINATES INDICATE − VALUE |

FIG. 49

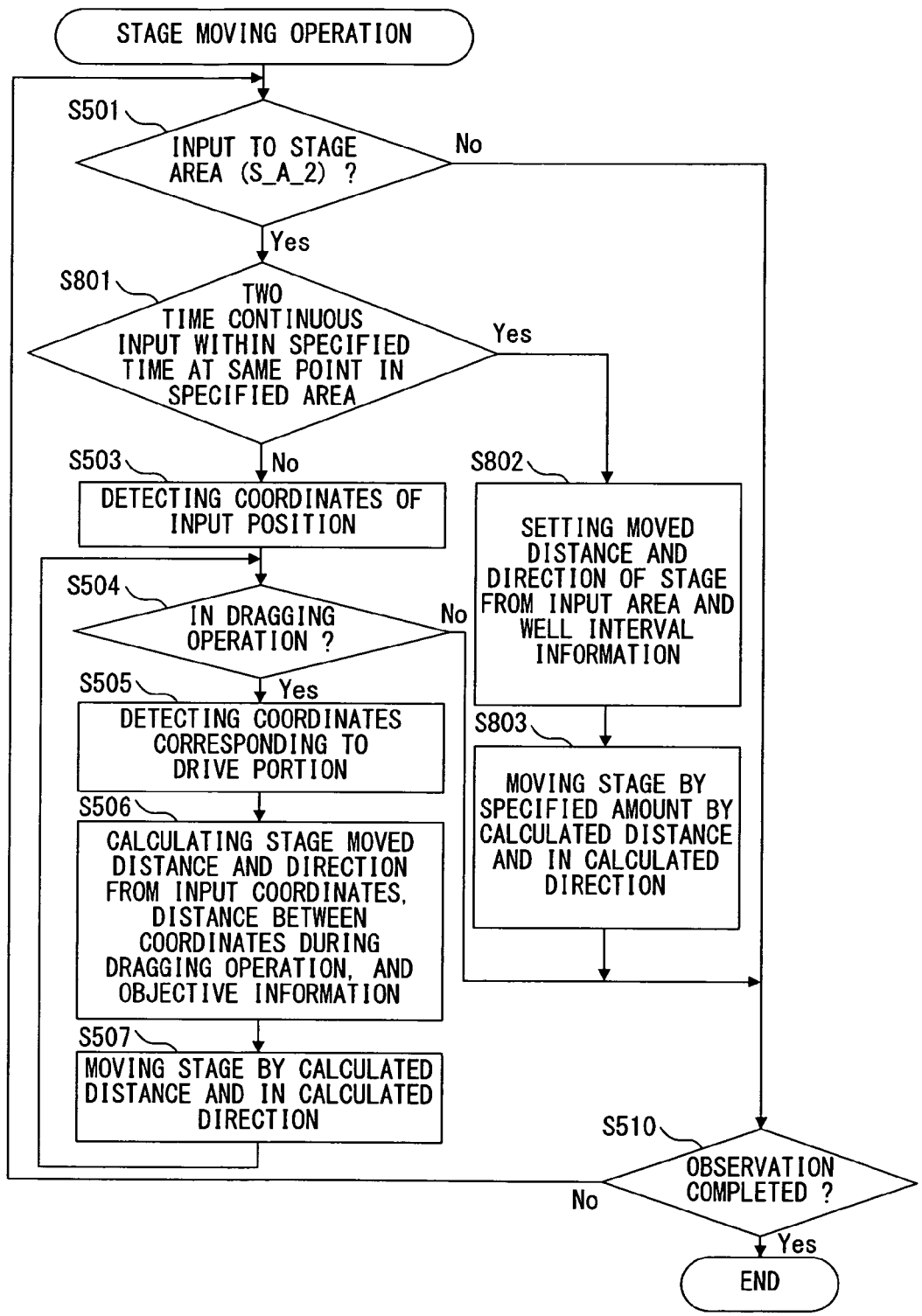
F I G. 50

FIG. 52A

| ID | INPUT AREA | TWO-POINT INPUT SPECIFIC OPERATION | DRIVE PORTION | CONTROL CONTENTS | ON/OFF |
|---|---|---|---|---|---|
| ID01 | S_A_2 | SIMULTANEOUS DRAGGING OPERATION ON TWO POINTS | ELECTRIC STAGE | DRIVE IN X- AND Y-AXIS DIRECTIONS CORRESPONDING TO DRAGGING OPERATION BY MULTIPLICATION BY MOVEMENT COEFFICIENT S | ON |
| ID02 | S_A_2 | DRAGGING OPERATION WITH ONE POINT FIXED | ELECTRIC STAGE | DRIVE IN X- AND Y-AXIS DIRECTIONS CORRESPONDING TO DRAGGING OPERATION BY MULTIPLICATION BY MOVEMENT COEFFICIENT S | OFF |
| ID03 | S_A_2 | DRAGGING OPERATION WITH ONE POINT FIXED IN Y-AXIS DIRECTION | Z AXIS | DRIVE IN Z-AXIS DIRECTION CORRESPONDING TO DRAGGING OPERATION | ON |
| ID04 | S_A_2 | DRAGGING OPERATION WITH ONE POINT FIXED IN X-AXIS DIRECTION (LEFTWARD) | ELECTRIC REVOLVER | SWITCH TO HIGHER MAGNIFICATION | ON |
| ID05 | S_A_2 | DRAGGING OPERATION WITH ONE POINT FIXED IN X-AXIS DIRECTION (RIGHTWARD) | ELECTRIC REVOLVER | SWITCH TO LOWER MAGNIFICATION | ON |

| | | | | | |
|---|---|---|---|---|---|
| ID06 | S_A_2 | DRAGGING OPERATION WITH ONE POINT FIXED IN X-AXIS DIRECTION (RIGHTWARD) | LIGHT SOURCE | INCREASED LIGHT QUANTITY | OFF |
| ID07 | S_A_2 | DRAGGING OPERATION WITH ONE POINT FIXED IN X-AXIS DIRECTION (LEFTWARD) | LIGHT SOURCE | DECREASED LIGHT QUANTITY | OFF |
| ID08 | S_A_2 | DRAGGING OPERATION WITH ONE POINT FIXED IN X-AXIS DIRECTION (RIGHTWARD) | MICROSCOPY SWITCH | SWITCH TO PREVIOUS MICROSCOPY | OFF |
| ID09 | S_A_2 | DRAGGING OPERATION WITH ONE POINT FIXED IN X-AXIS DIRECTION (LEFTWARD) | MICROSCOPY SWITCH | SWITCH TO NEXT MICROSCOPY | OFF |
| ID10 | | NOT ENTERED | NOT ENTERED | NOT ENTERED | OFF |
| ID11 | | NOT ENTERED | NOT ENTERED | NOT ENTERED | OFF |
| ID12 | | NOT ENTERED | NOT ENTERED | NOT ENTERED | OFF |

FIG. 52B

| ID | INPUT AREA | TWO-POINT INPUT SPECIFIC OPERATION | DRIVE PORTION | CONTROL CONTENTS | ON/OFF |
|---|---|---|---|---|---|
| ID01 | S_A_2 | SIMULTANEOUS DRAGGING OPERATION ON TWO POINTS | ELECTRIC STAGE | DRIVE IN X- AND Y-AXIS DIRECTIONS CORRESPONDING TO DRAGGING OPERATION BY MULTIPLICATION BY MOVEMENT COEFFICIENT S | OFF |
| ID02 | S_A_2 | DRAGGING OPERATION WITH ONE POINT FIXED | ELECTRIC STAGE | DRIVE IN X- AND Y-AXIS DIRECTIONS CORRESPONDING TO DRAGGING OPERATION BY MULTIPLICATION BY MOVEMENT COEFFICIENT S | ON |
| ID03 | S_A_2 | DRAGGING OPERATION WITH ONE POINT FIXED IN Y-AXIS DIRECTION | Z AXIS | DRIVE IN Z-AXIS DIRECTION CORRESPONDING TO DRAGGING OPERATION | OFF |
| ID04 | S_A_2 | DRAGGING OPERATION WITH ONE POINT FIXED IN X-AXIS DIRECTION (LEFTWARD) | ELECTRIC REVOLVER | SWITCH TO HIGHER MAGNIFICATION | OFF |
| ID05 | S_A_2 | DRAGGING OPERATION WITH ONE POINT FIXED IN X-AXIS DIRECTION (RIGHTWARD) | ELECTRIC REVOLVER | SWITCH TO LOWER MAGNIFICATION | OFF |

FIG. 52C

| | | | | |
|---|---|---|---|---|
| ID06 | S_A_2 | DRAGGING OPERATION WITH ONE POINT FIXED IN X-AXIS DIRECTION (RIGHTWARD) | LIGHT SOURCE | INCREASED LIGHT QUANTITY | OFF |
| ID07 | S_A_2 | DRAGGING OPERATION WITH ONE POINT FIXED IN X-AXIS DIRECTION (LEFTWARD) | LIGHT SOURCE | DECREASED LIGHT QUANTITY | OFF |
| ID08 | S_A_2 | DRAGGING OPERATION WITH ONE POINT FIXED IN X-AXIS DIRECTION (RIGHTWARD) | MICROSCOPY SWITCH | SWITCH TO PREVIOUS MICROSCOPY | OFF |
| ID09 | S_A_2 | DRAGGING OPERATION WITH ONE POINT FIXED IN X-AXIS DIRECTION (LEFTWARD) | MICROSCOPY SWITCH | SWITCH TO NEXT MICROSCOPY | OFF |
| ID10 | | NOT ENTERED | NOT ENTERED | NOT ENTERED | OFF |
| ID11 | | NOT ENTERED | NOT ENTERED | NOT ENTERED | OFF |
| ID12 | | NOT ENTERED | NOT ENTERED | NOT ENTERED | OFF |

FIG. 52D

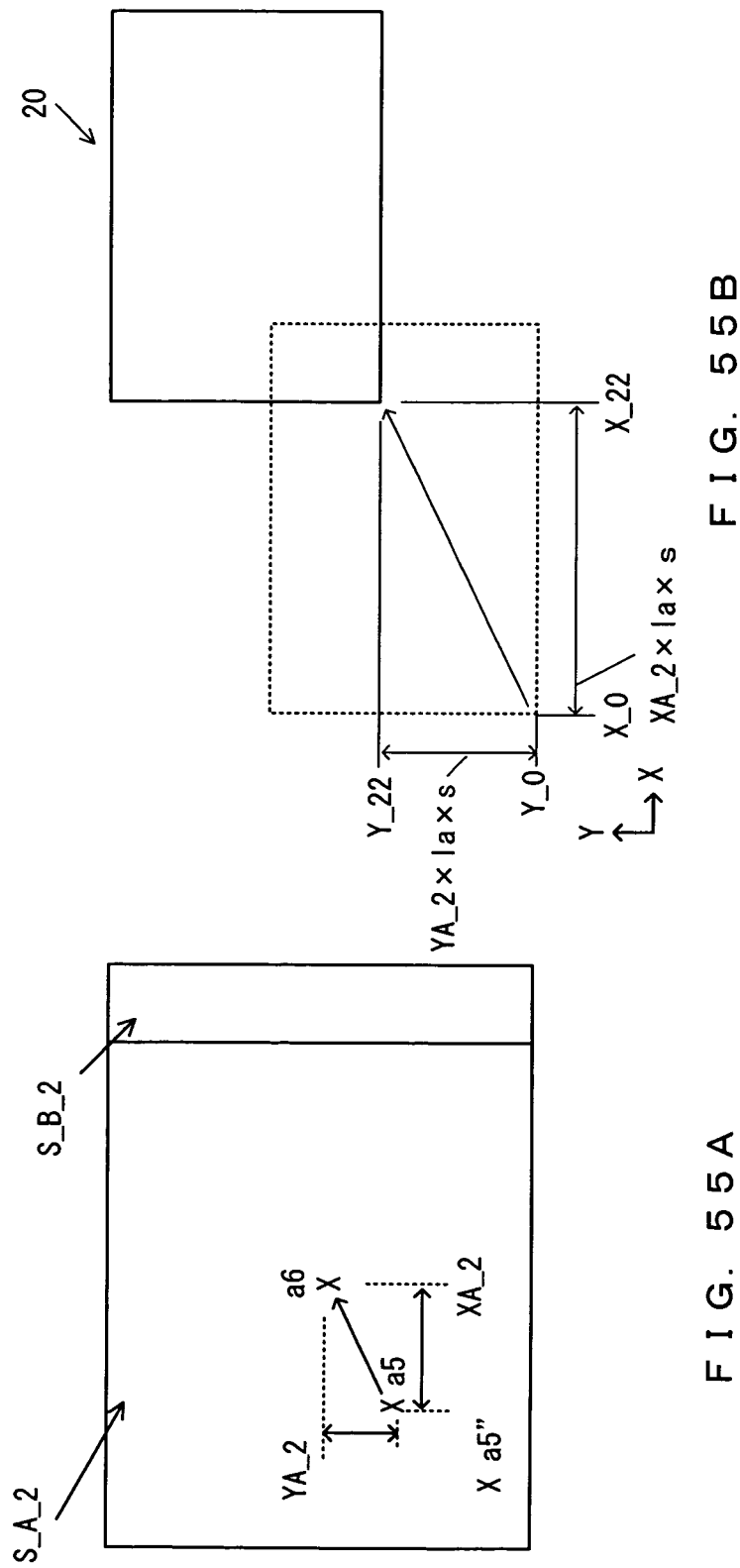

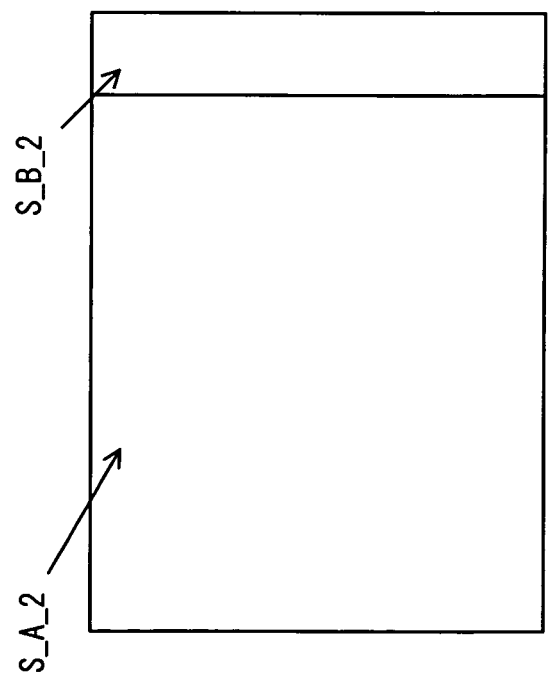
F I G. 59B
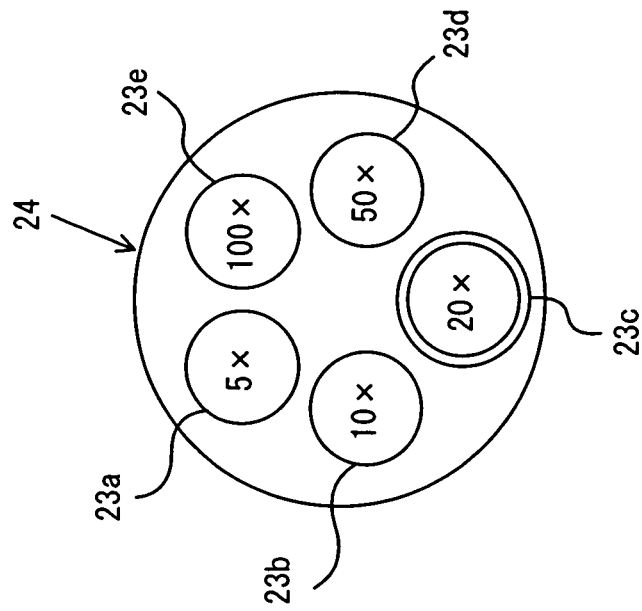
F I G. 59A

MICROSCOPE CONTROLLER AND MICROSCOPE SYSTEM HAVING MICROSCOPE CONTROLLER

CROSS REFERENCE TO RELATED APPLICATIONS

This application is based on and claims the benefit of priority from the prior Japanese Patent Application No. 2010-086751 filed in Japan on Apr. 5, 2010, the entire contents of which are incorporated by this reference. This application is based on and claims the benefit of priority from the prior Japanese Patent Application No. 2010-114567 filed in Japan on May 18, 2010, the entire contents of which are incorporated by this reference. This application is a continuation application of International PCT Application No. PCT/JP2011/058554 which was filed on Apr. 4, 2011.

FIELD

The present invention relates to a microscope system which has a plurality of objectives, and performs a scale-up observation of a small specimen, and whose optical members are driven by a motor.

BACKGROUND

A microscope device is widely used in the industrial fields, studies, inspections, etc. in the biological fields. When the inspections are performed using the microscope device, an observation and an inspection are performed by the microscope device having a plurality of objectives generally having different magnifications by operating an electric stage which moves a specimen to be observed on the plane orthogonal to the observation optical path from the objectives. When the specimen is observed using the microscope, it is necessary to operate various configuration units configuring the microscope (for example, various types of illumination, an aperture stop, a field stop, a revolver, an automatic focusing mechanism, an optical element switching mechanism such as a lens, a filter, etc.) depending on each observation condition.

As a method for operating these configuration units, for example, the following method is used. That is, well known is the method of connecting an operation device to a microscope body, driving each configuration unit depending dn the operation of the operation device, and grasping the driving state of each configuration unit based on the display of the operation device. That is, a microscope controller such as a dedicated controller, a PC (personal computer), etc. is connected to a microscope body through a communication cable. Then, a command is communicated between the microscope controller and the microscope body by the operation of the microscope controller, and various settings are made by the drive control of each configuration unit.

Patent Document 1: International Publication Pamphlet No. WO96/18924

Patent Document 2: Japanese Laid-open Patent Publication No. 2008-292578

SUMMARY

A microscope controller which performs an operation to control the operation of an electric stage used in a microscope system includes: a touch panel unit having a display function and receiving an input by an external physical contact; a function setting unit for setting a stage operation function of operating the electric stage in a specified display region of the touch panel unit; an input detection unit for detecting the input by the physical contact performed in the operation display region as a display region in which the stage operation function is set; a determination unit for determining a moving mode of the electric stage depending on the detected input result, and generating a control instruction signal for control of the electric stage; and a communication control unit for transmitting the control instruction signal to an external device for control of the operation of the electric stage.

A computer-readable storage medium which stores an electric stage operation control program used to direct a computer to perform a process of controlling an operation of an electric stage used in a microscope system including: a function setting process of receiving an input by an external physical contact and setting a stage operation function for operating the electric stage on a specified display region of a touch panel unit having a display function; a determining process of determining a moving mode of the electric stage depending on the input by the physical contact performed on an operation display region as a display region in which the stage operation function is set, and generating a control instruction signal for control of the electric stage; and a communication control process for transmitting the control instruction signal to an external device for control of the operation of the electric stage.

An electric stage operation controlling method for controlling an operation of an electric stage used in a microscope system including: receiving an input by an external physical contact and setting a stage operation function for operating the electric stage on a specified display region of a touch panel unit having a display function; detecting the input by the external physical contact performed on an operation display region as a display region on which the stage operation function is set; determining a moving mode of the electric stage depending on a result of the detected input; generating a control instruction signal for controlling the electric stage based on the determined moving mode; and transmitting the control instruction signal to an external device for controlling an operation of the electric stage.

A microscope controller which performs an operation to control the operation of an electric stage used in a microscope system according to the present invention includes: a touch panel unit having a display function and receiving an input by an external physical contact; a function setting unit for setting an operation function of operating the electric stage in a specified display region of the touch panel unit; an input detection unit for detecting the input by the physical contact performed in the operation display region as a display region in which the operation function is set; a control unit for deciding a number of input points indicating a position of the input to the operation display region and a moving mode of an input point based on a result of the detected input, determining an operation mode of the electric unit based on the decided number of the input points, and generating a control instruction signal for direction to control drive of the electric unit based on the determined moving mode; and a communication control unit for transmitting the control instruction signal to an external device for controlling an operation of the electric unit.

A computer-readable storage medium storing a microscope control program used to direct a computer according to the present invention which performs an operation to control the operation of an electric stage used in a microscope system including: a touch panel unit having a display function and receiving an input by an external physical contact; a function setting unit for setting an operation function of operating the electric stage in a specified display region of the touch panel unit; an input detection unit for detecting the input by the physical contact performed in the operation display region as a display region in which the operation function is set to perform a process of controlling an operation of the electric unit includes: a deciding process of deciding a number of input points indicating a position of the input to the operation display region and a moving mode of an input point based on a result of the detected input; a determining process of determining an operation mode of the electric unit based on the determined number of the input points; a generating process of generating a control instruction signal for direction to control drive of the electric unit based on the determined moving mode; and a transmitting process for transmitting the control instruction signal to an external device for controlling an operation of the electric unit.

A microscope controlling method for directing a microscope controller which performs an operation for control of an operation of an electric unit used in a microscope system according to the present invention, and includes: a touch panel unit having a display function and receiving an input by an external physical contact; a function setting unit for setting an operation function of operating the electric stage in a specified display region of the touch panel unit; and an input detection unit for detecting the input by the physical contact performed in the operation display region as a display region in which the operation function is set to perform a process for controlling an operation of the electric unit includes: deciding a number of input points indicating a position of the input to the operation display region and a moving mode of an input point based on a result of the detected input; determining an operation mode of the electric unit based on the decided number of the input points; generating a control instruction signal for direction to control drive of the electric unit based on the determined moving mode; and transmitting the control instruction signal to an external device for controlling an operation of the electric unit.

According to the present invention, the operability of the movement of a stage may be improved when a stage moving operation is performed on a touch panel. In addition, according to the present invention, the operability of the operation of the electric unit using a touch panel may be improved.

BRIEF DESCRIPTION OF DRAWINGS

FIG. 5 is a flowchart of the control of the microscope controller 2 when the touching operation is performed on the function area to which the function according to the first embodiment is assigned;

FIG. 7B is an explanatory view (1) of the movement of the stage 20 in the X- and Y-axis directions in the operation according to the first embodiment (normal function area mode, normal movement mode);

FIG. 9A is an explanatory view of an operation in the function area S_A to which the function for moving a stage 20 in the X- and Y-axis directions is assigned. FIG. 9B is an explanatory view (3) of the movement of the stage 20 in the X- and Y-axis directions in the operation according to the first embodiment (normal function area mode, normal movement mode);

FIG. 11A is an explanatory view of an operation in the function area S_B to which the function for moving a stage 20 in the Z-axis direction is assigned. FIG. 11B is an explanatory view (2) of the movement of the stage 20 in the X- and Y-axis directions in the operation according to the first embodiment (normal function area mode, normal movement mode);

FIG. 12A is an explanatory view of an operation in the function area S_B to which the function for moving a stage 20 in the Z-axis direction is assigned. FIG. 12B is an explanatory view (3) of the movement of the stage 20 in the X- and Y-axis directions in the operation according to the first embodiment (normal function area mode, normal movement mode);

FIGS. 17A and 17B are a flowchart of the control of the microscope controller 2 in the touching operation on the function area to which the function according to the first embodiment (scale-up function area mode) is assigned;

FIG. 19 illustrates a function area S_A_2 and a function area S_B_2 (embodiment 2) according to the first embodiment (scale-up function area mode);

FIG. 20A is an explanatory view of an operation in the function area S_A_2 to which the function for moving a stage 20 in the X- and Y-axis directions is assigned. FIG. 20B is an explanatory view (1) of the movement of the stage 20 in the X- and Y-axis directions in the operation according to the first embodiment (scale-up function area mode, normal movement mode);

Figure 22A:
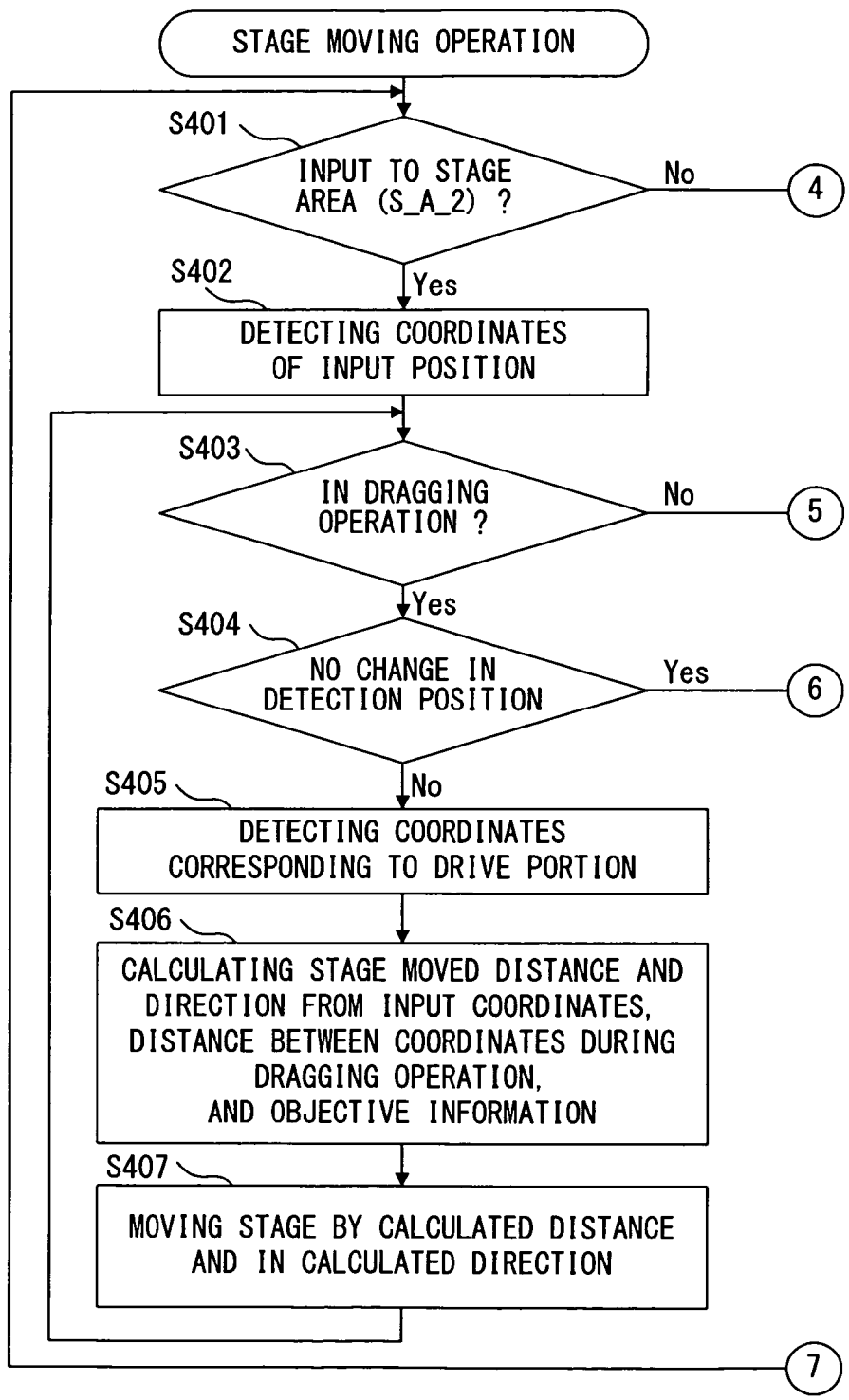
Figure 24A:
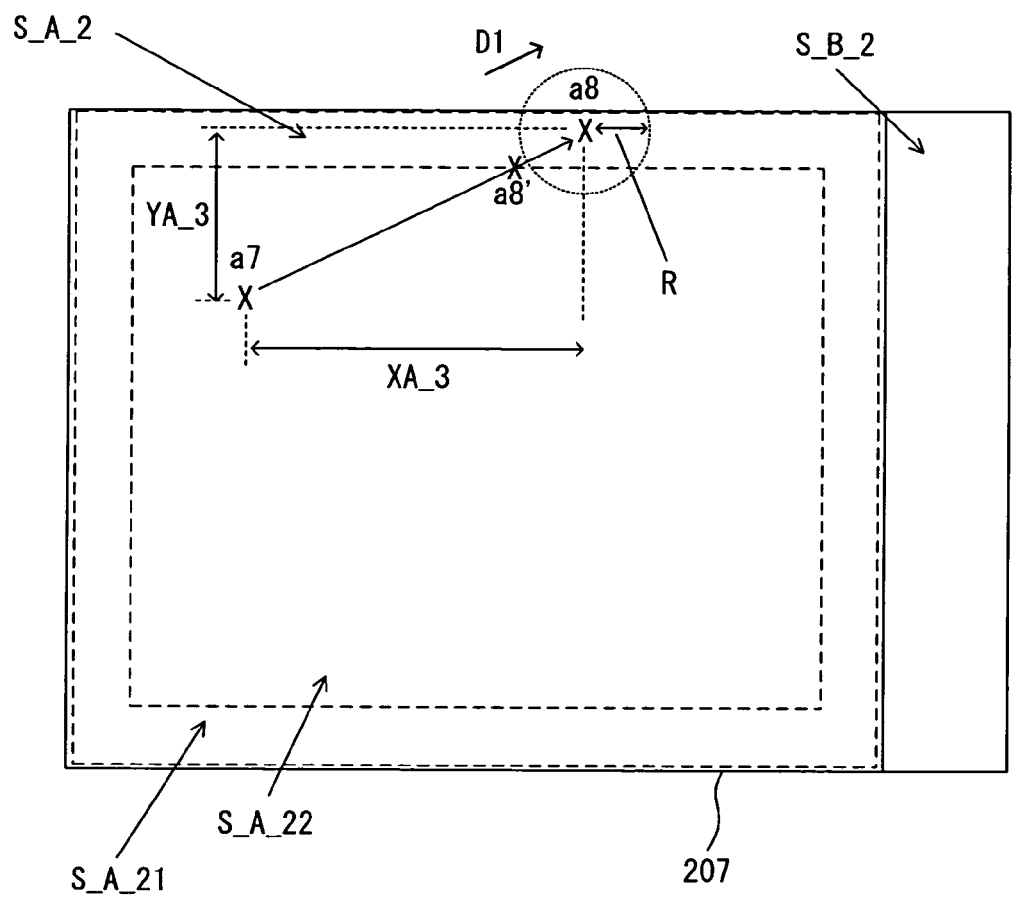
Figure 24B:
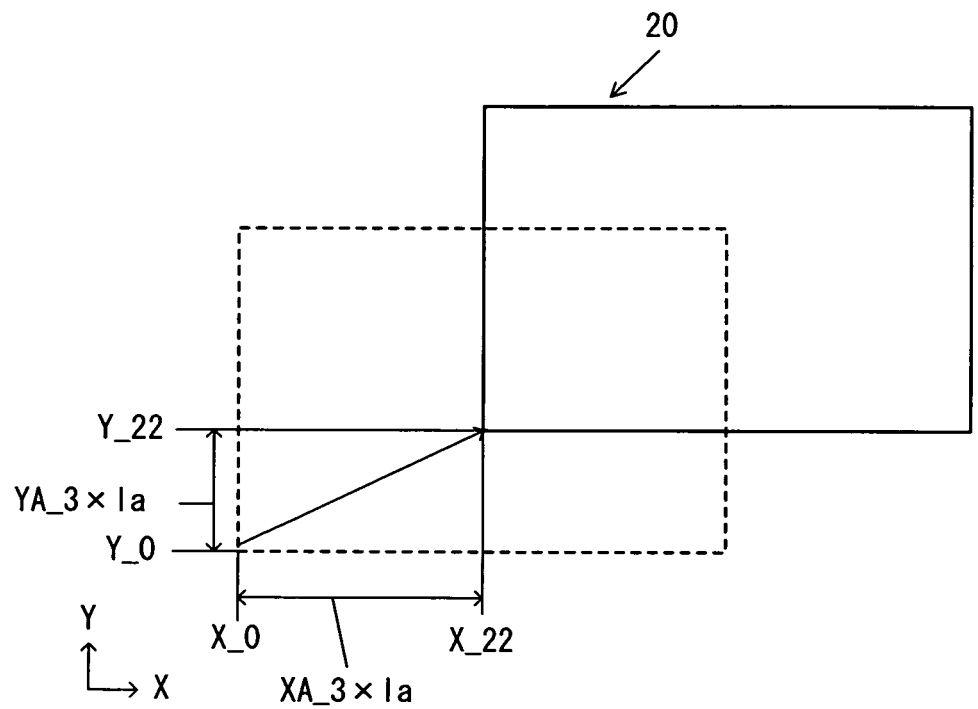
Figure 25A:
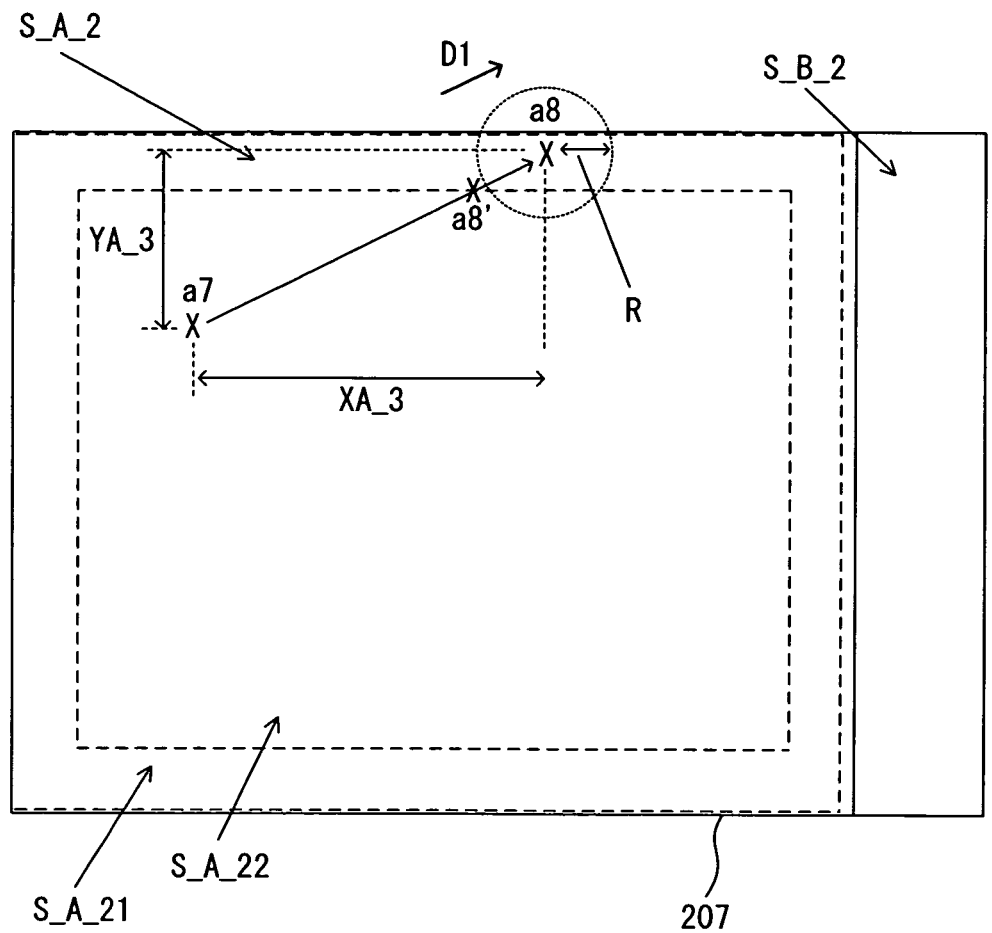
Figure 25B:
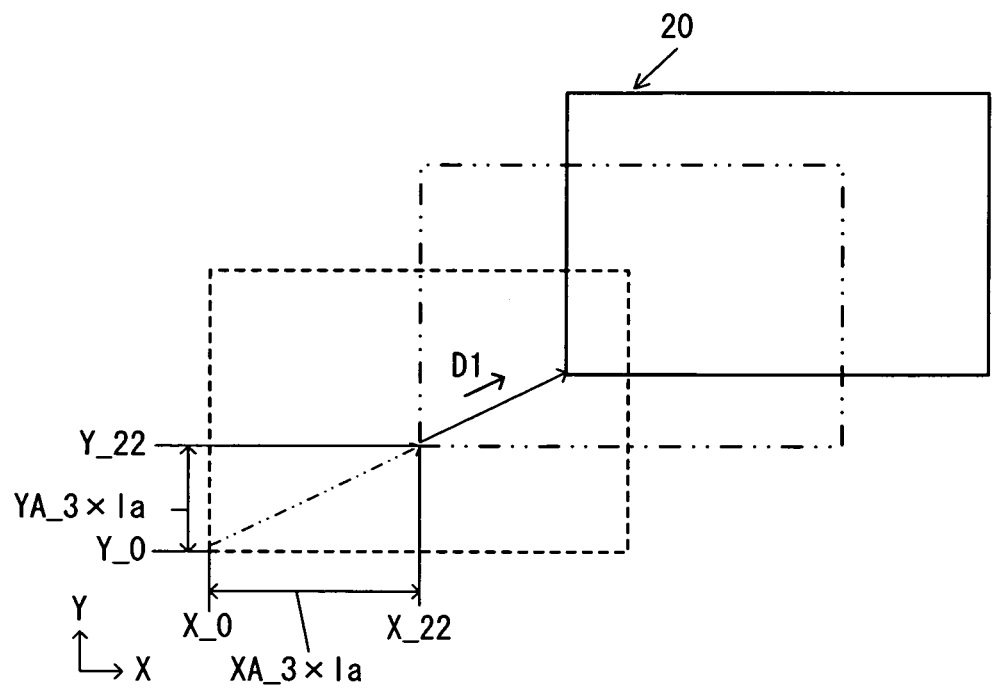
Figure 27A:
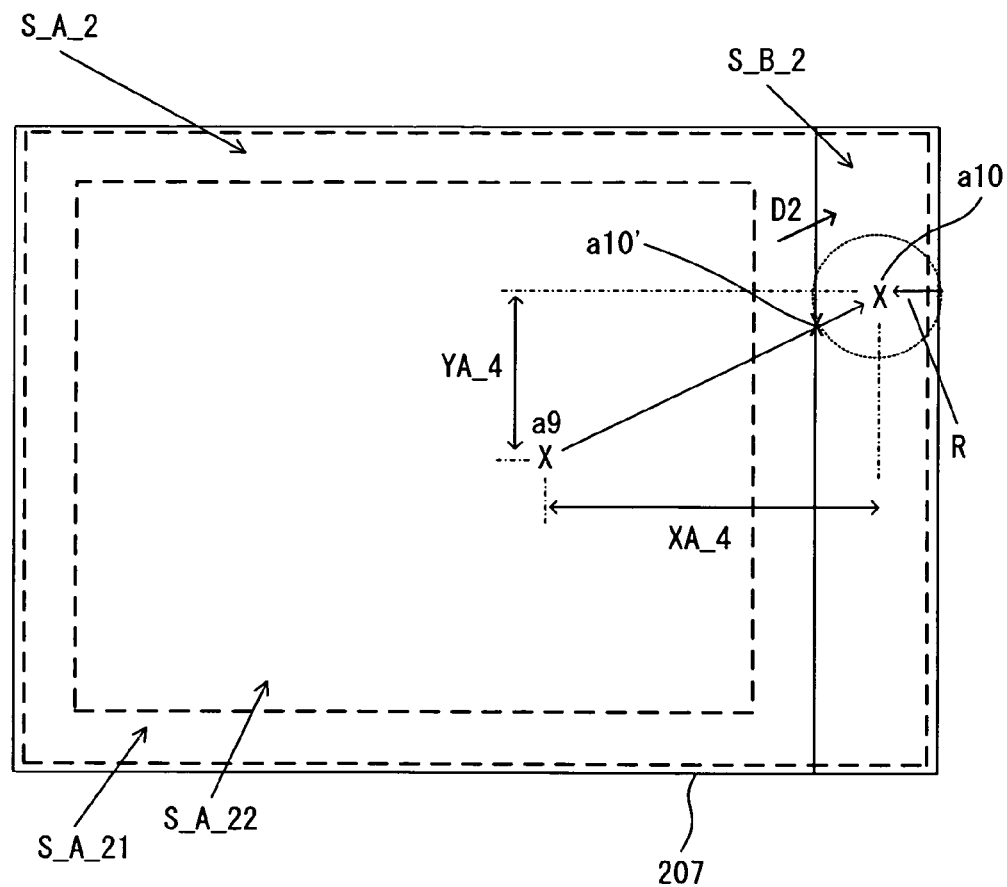
Figure 28A:
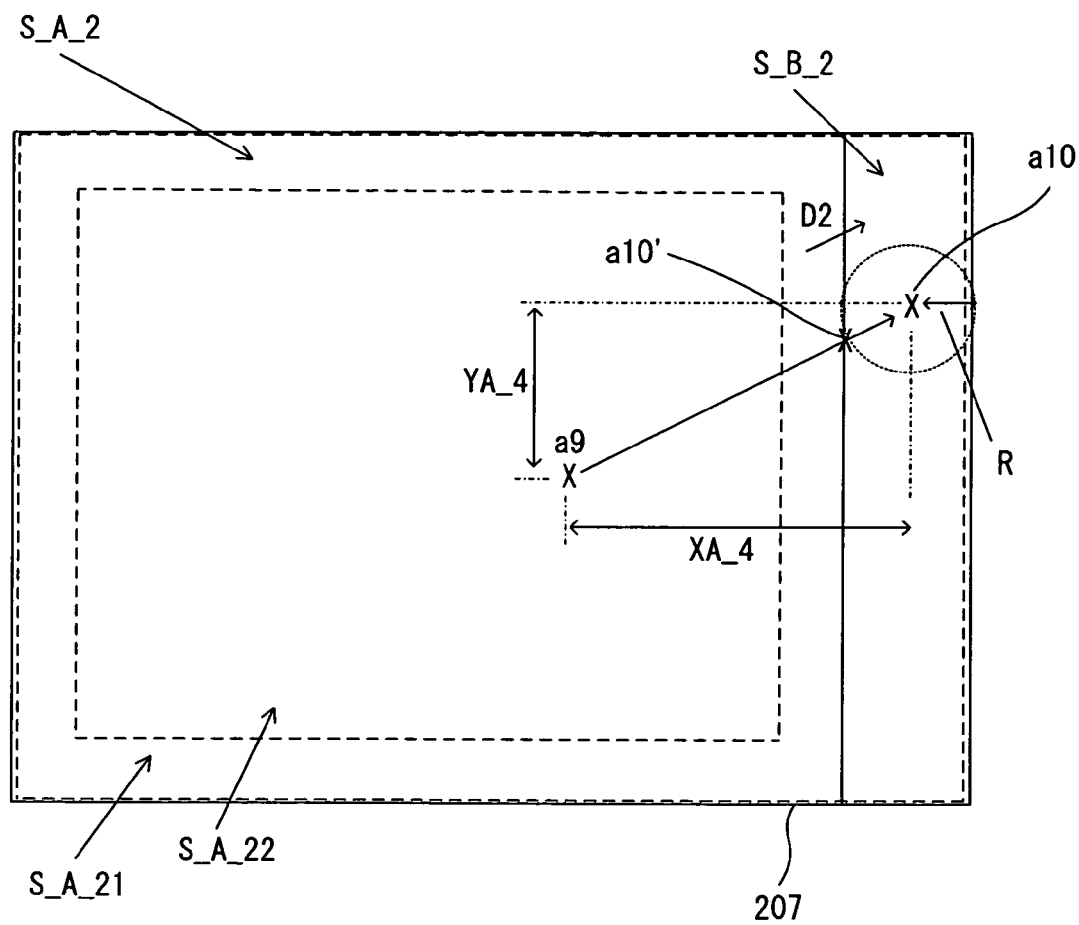
Figure 28B:
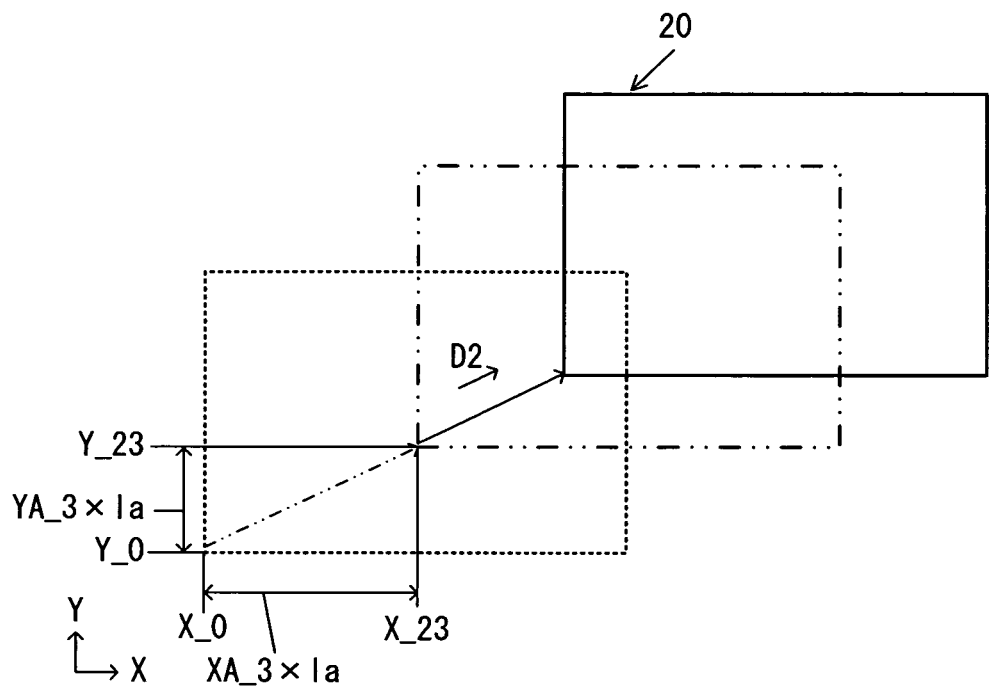
Figure 31A:
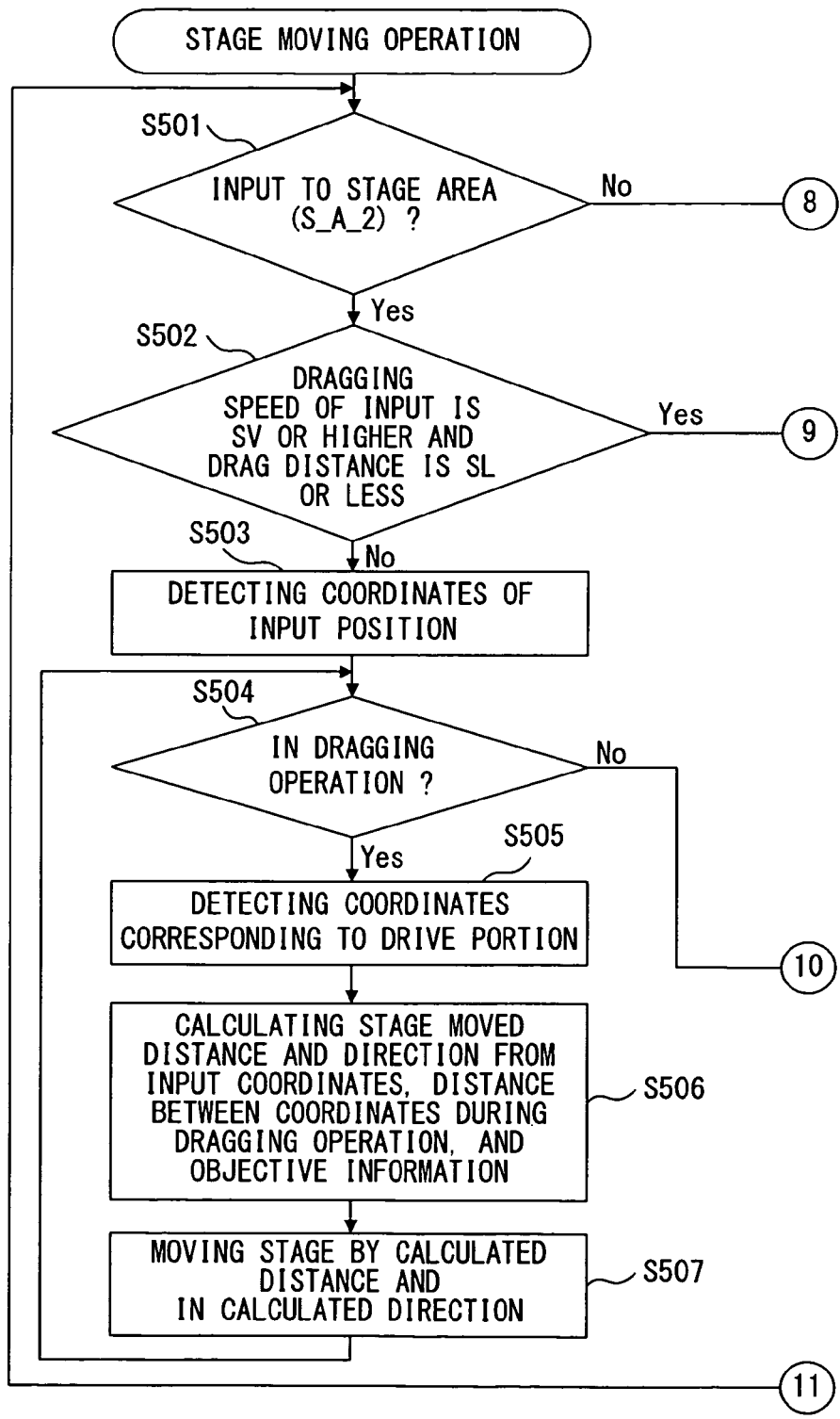
Figure 31B:
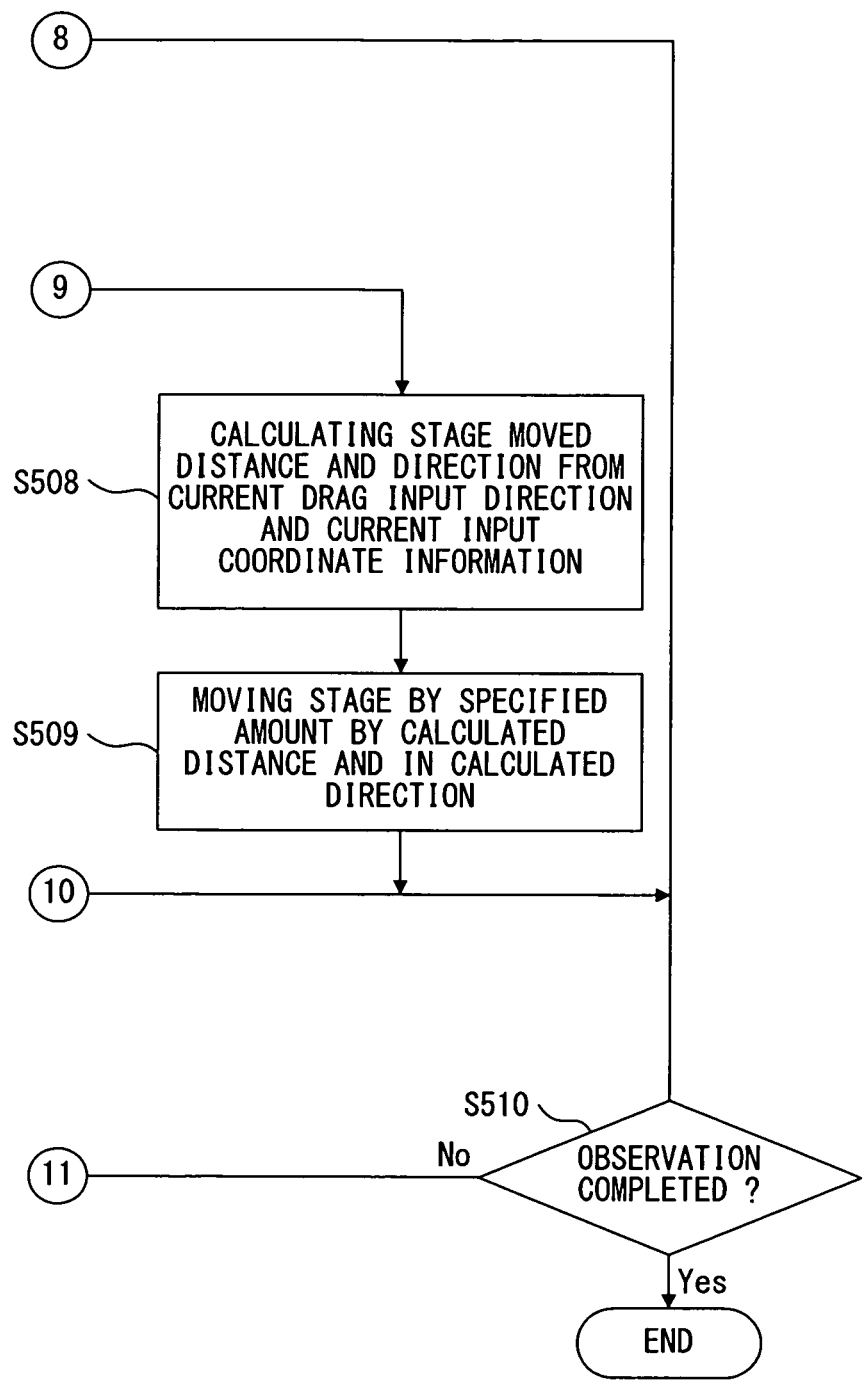
Figure 32B:
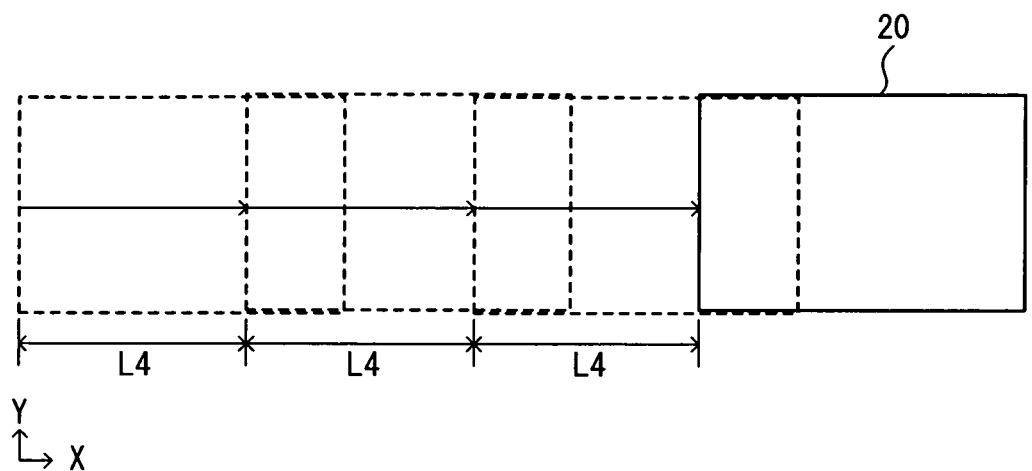
Figure 33B:
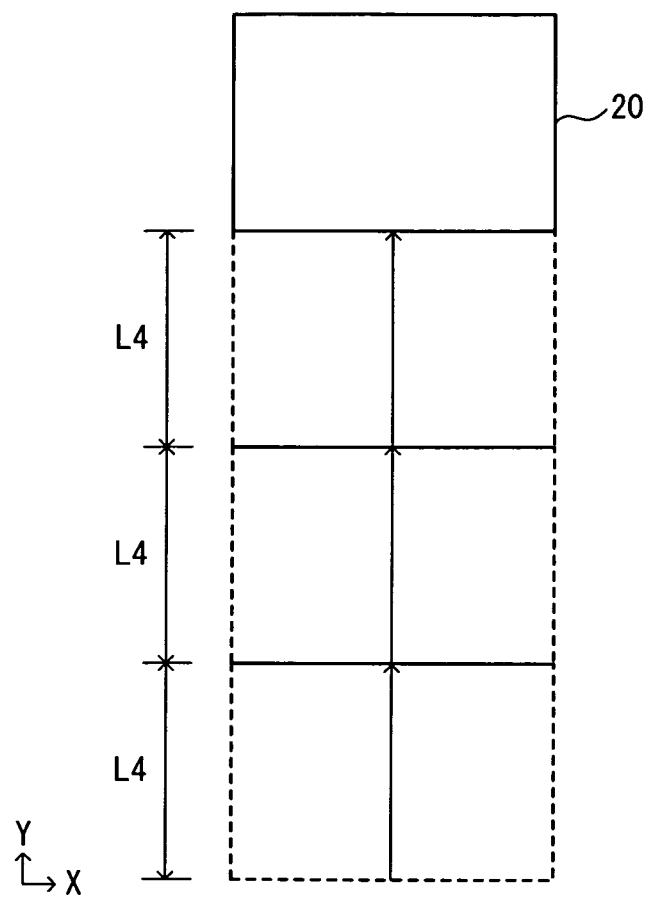
Figure 35:
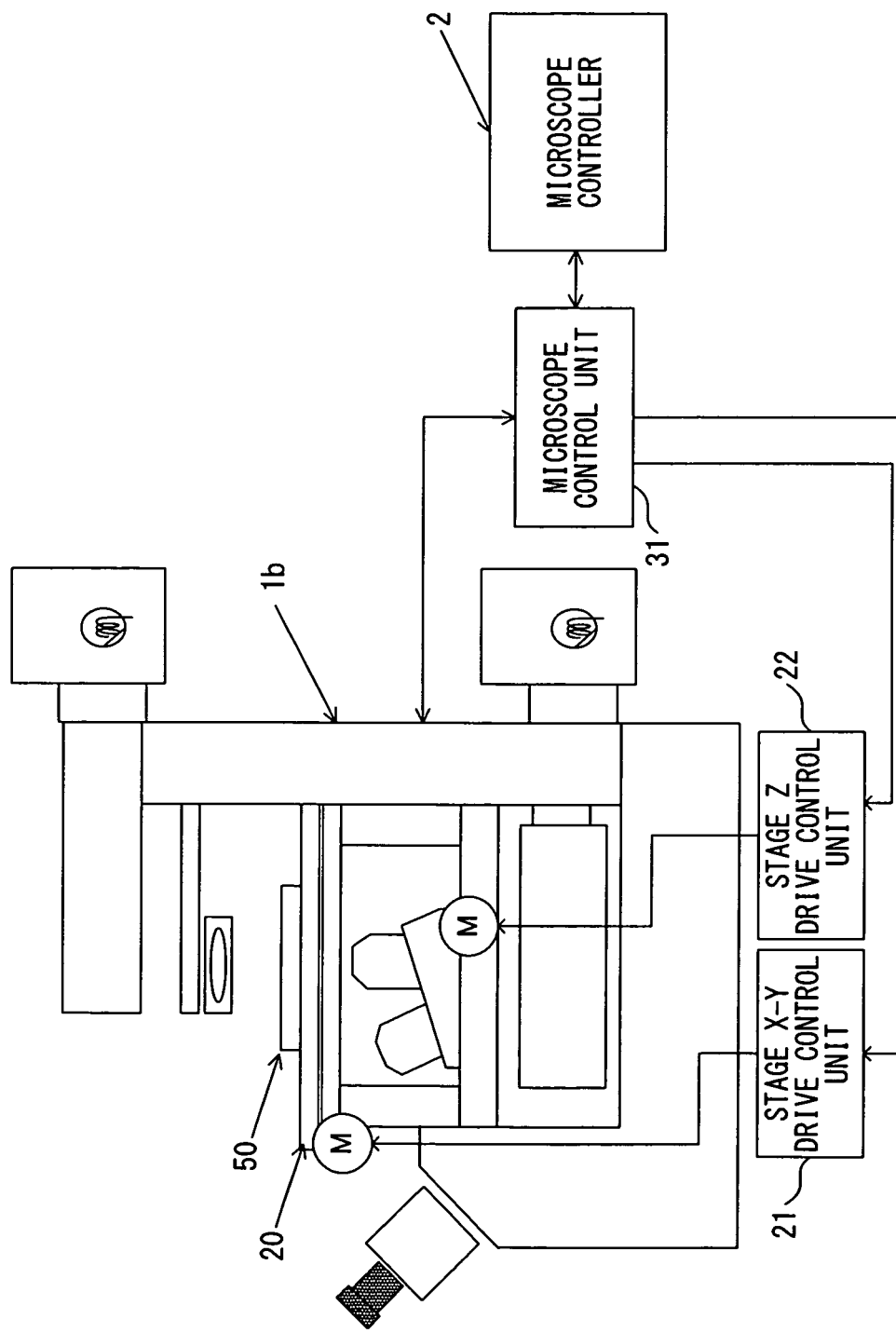
Figure 36:
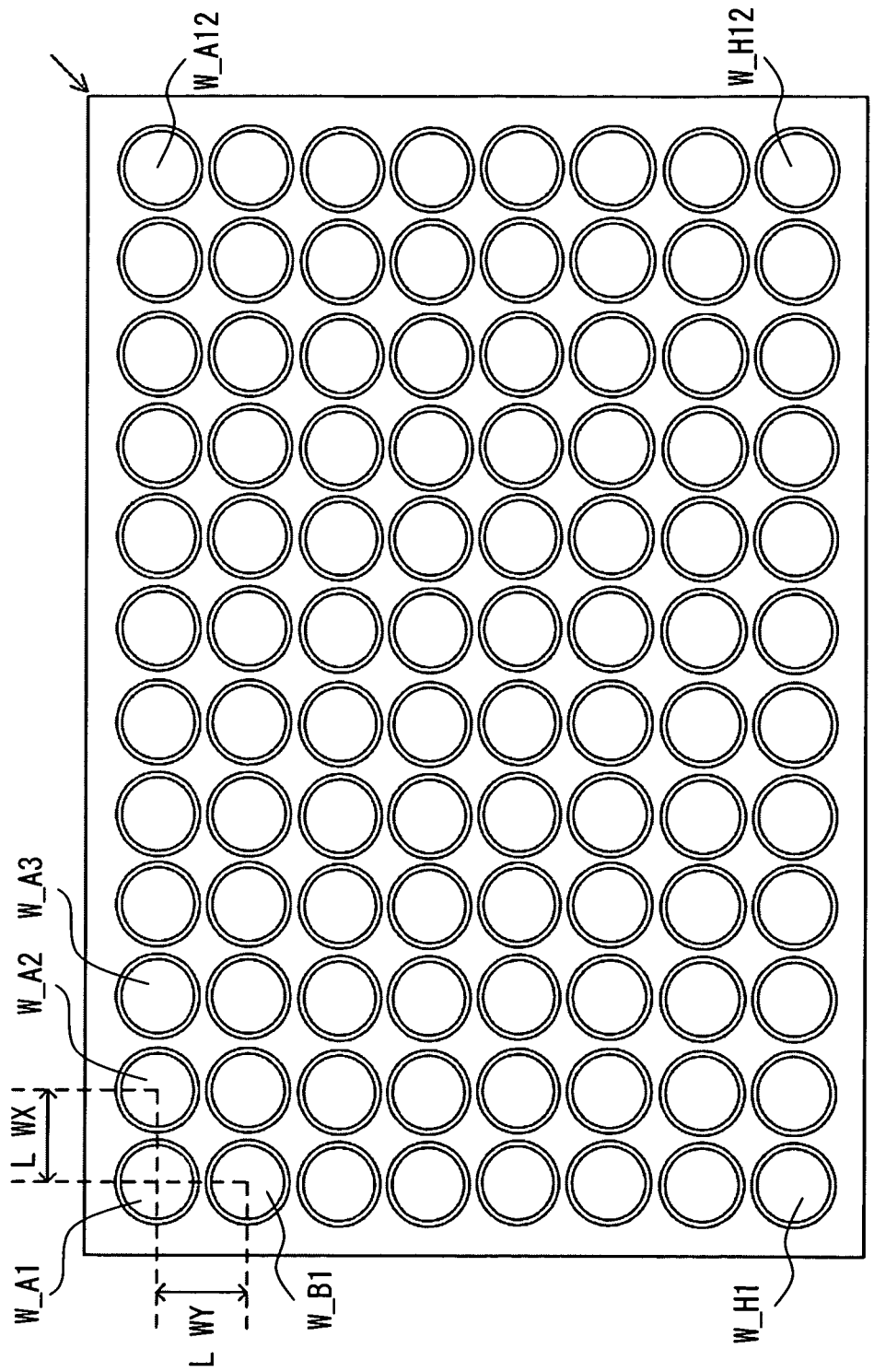
Figure 37:
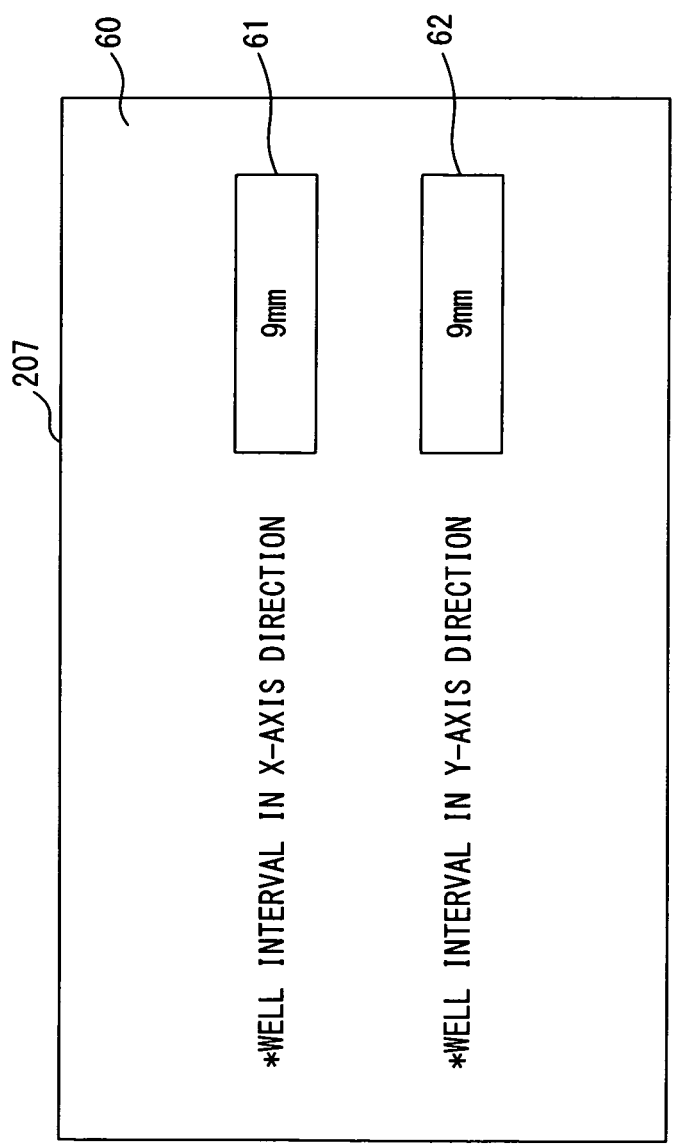
Figure 38:
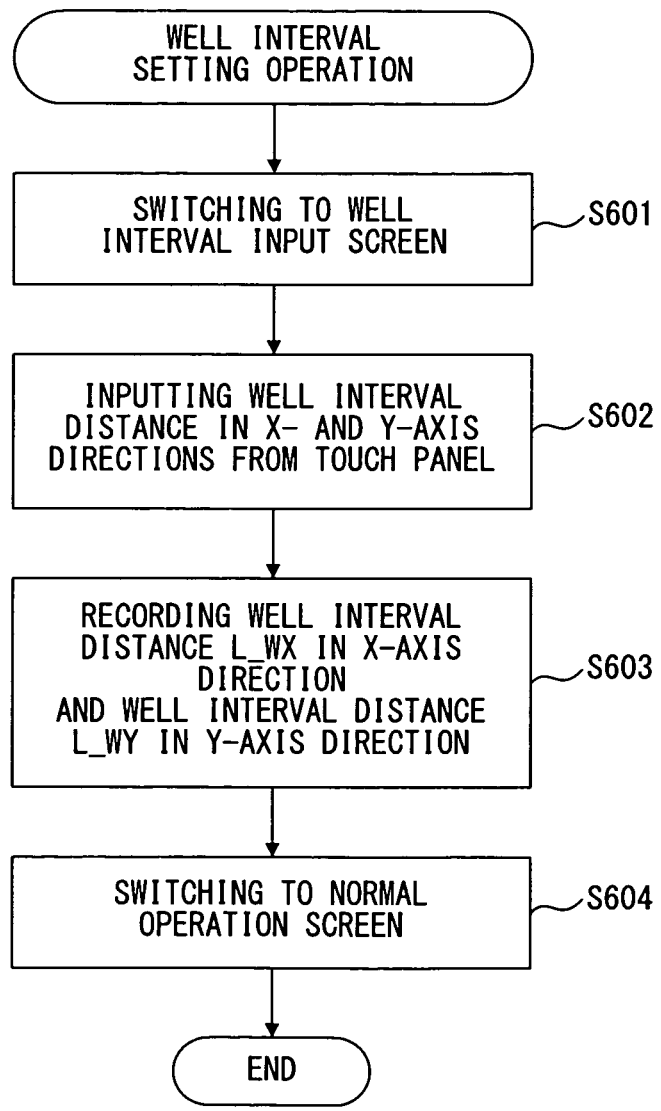
Figure 39:
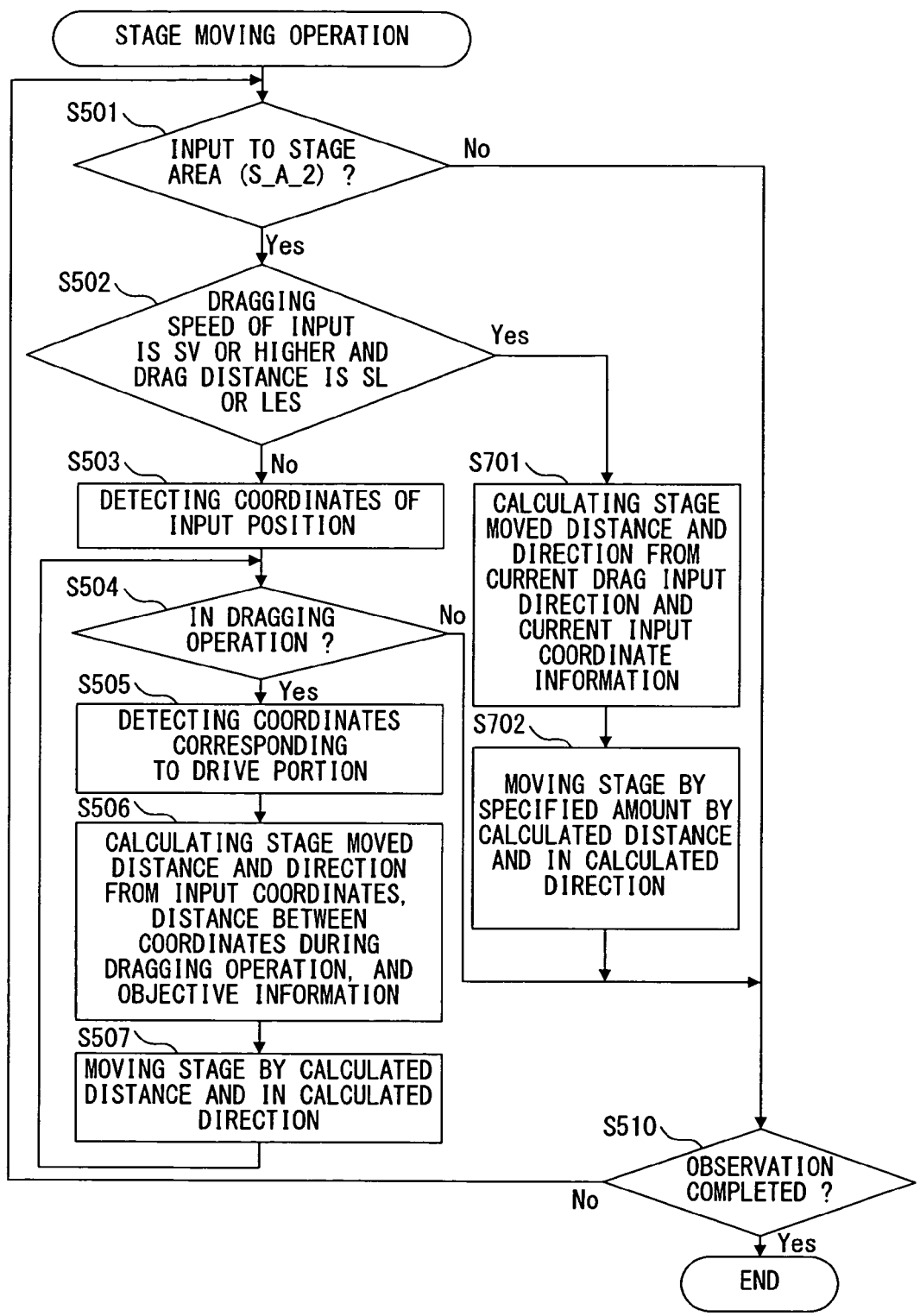
Figure 40:
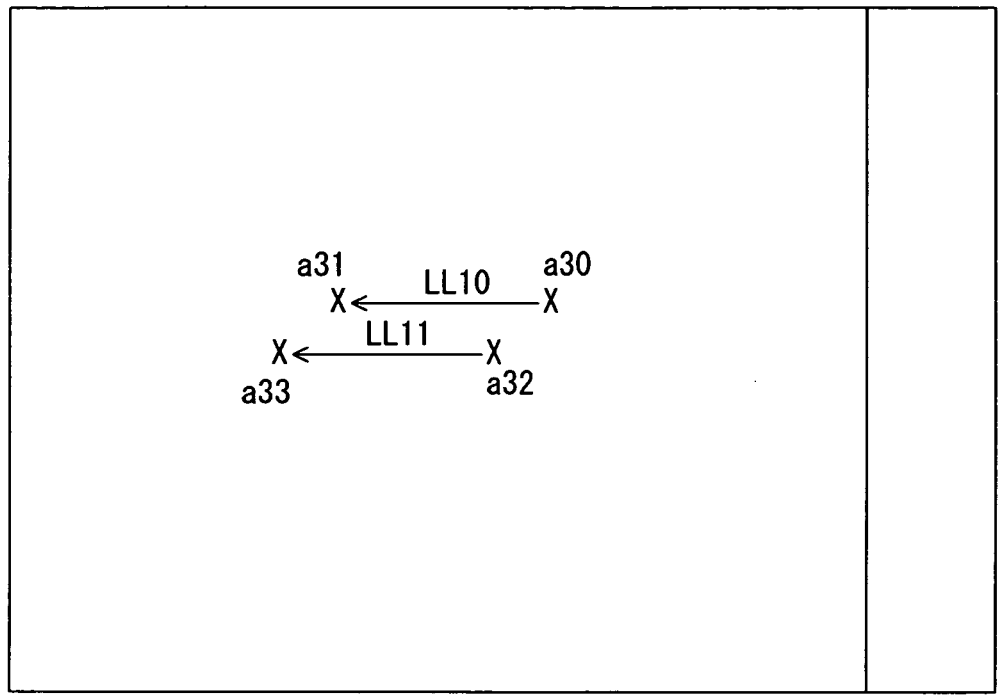
Figure 41:
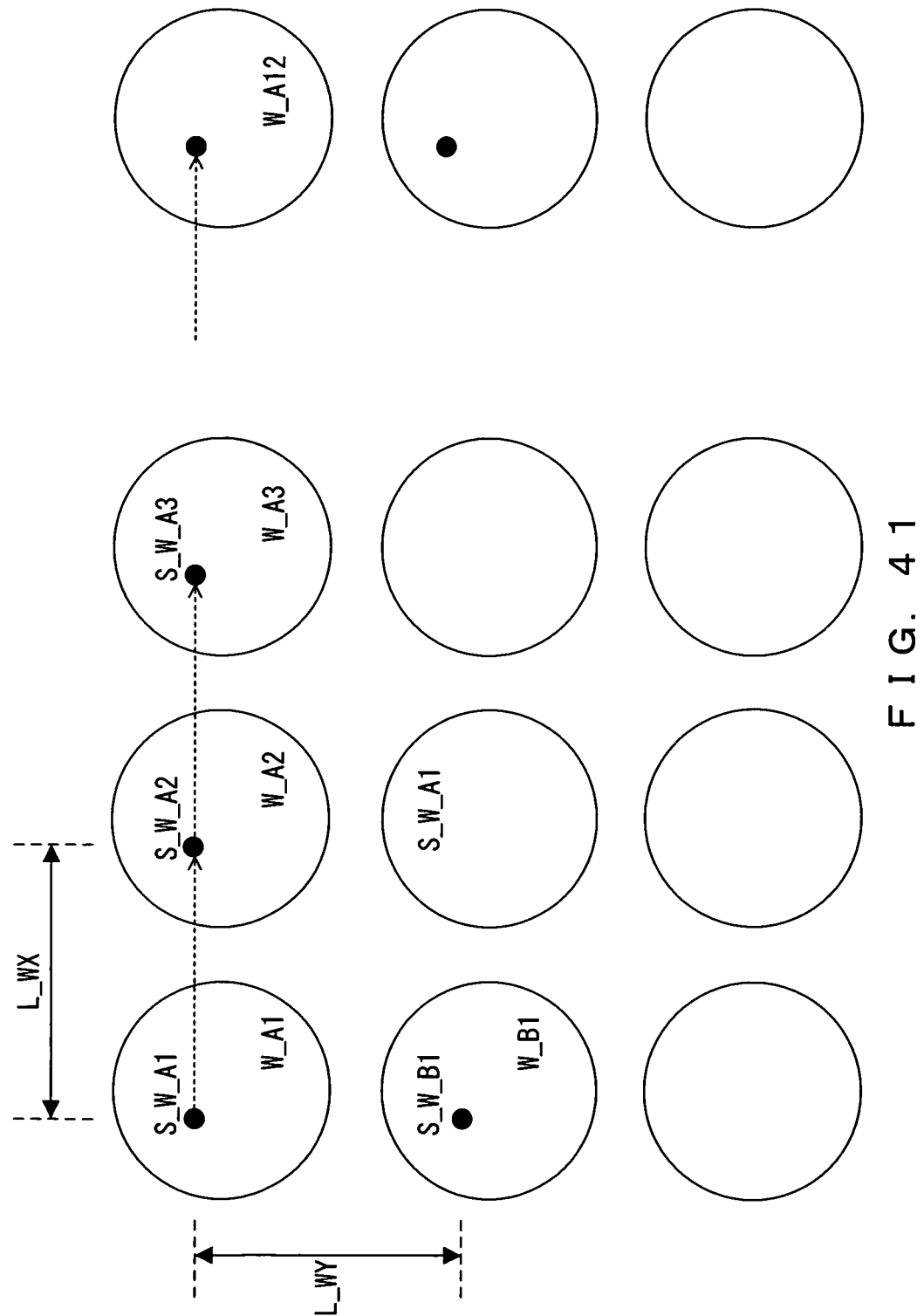
Figure 42:
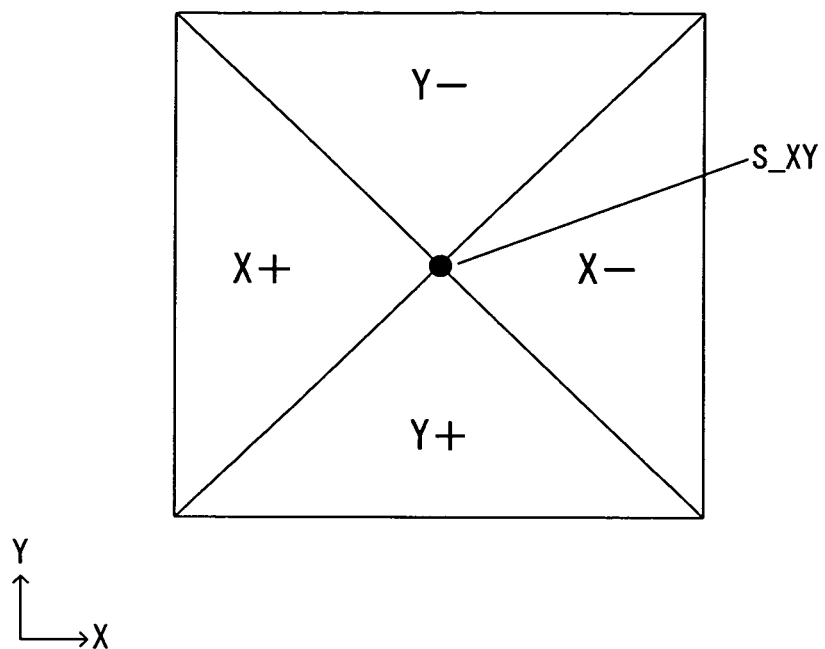
Figure 44:
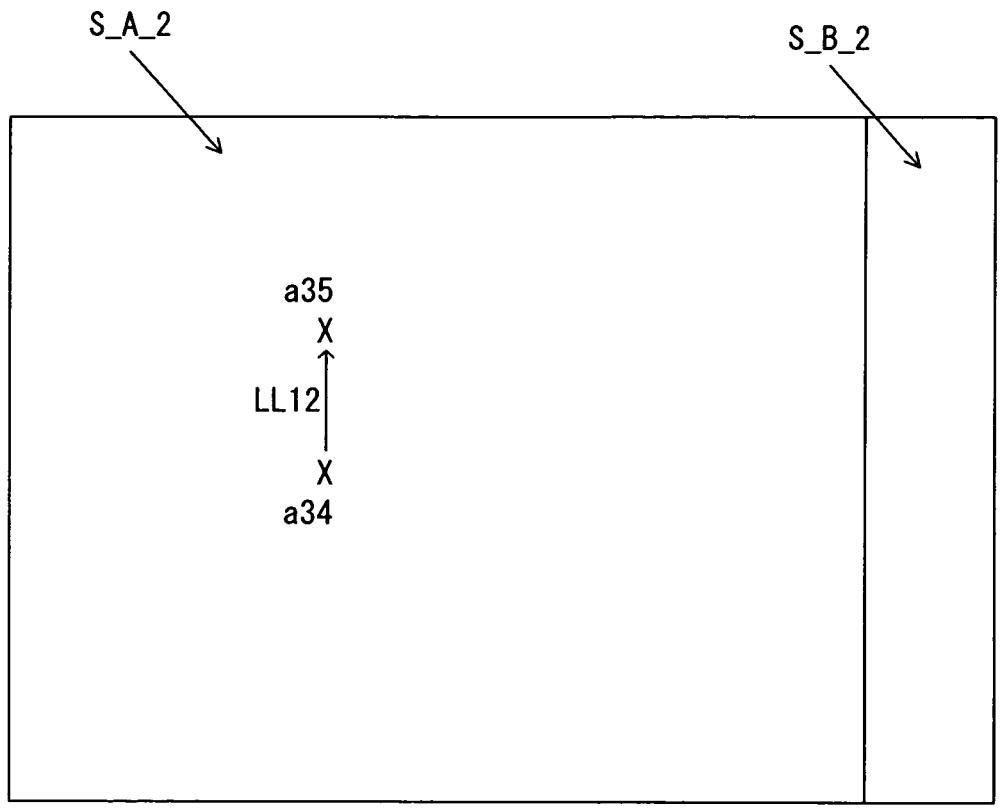
Figure 45:
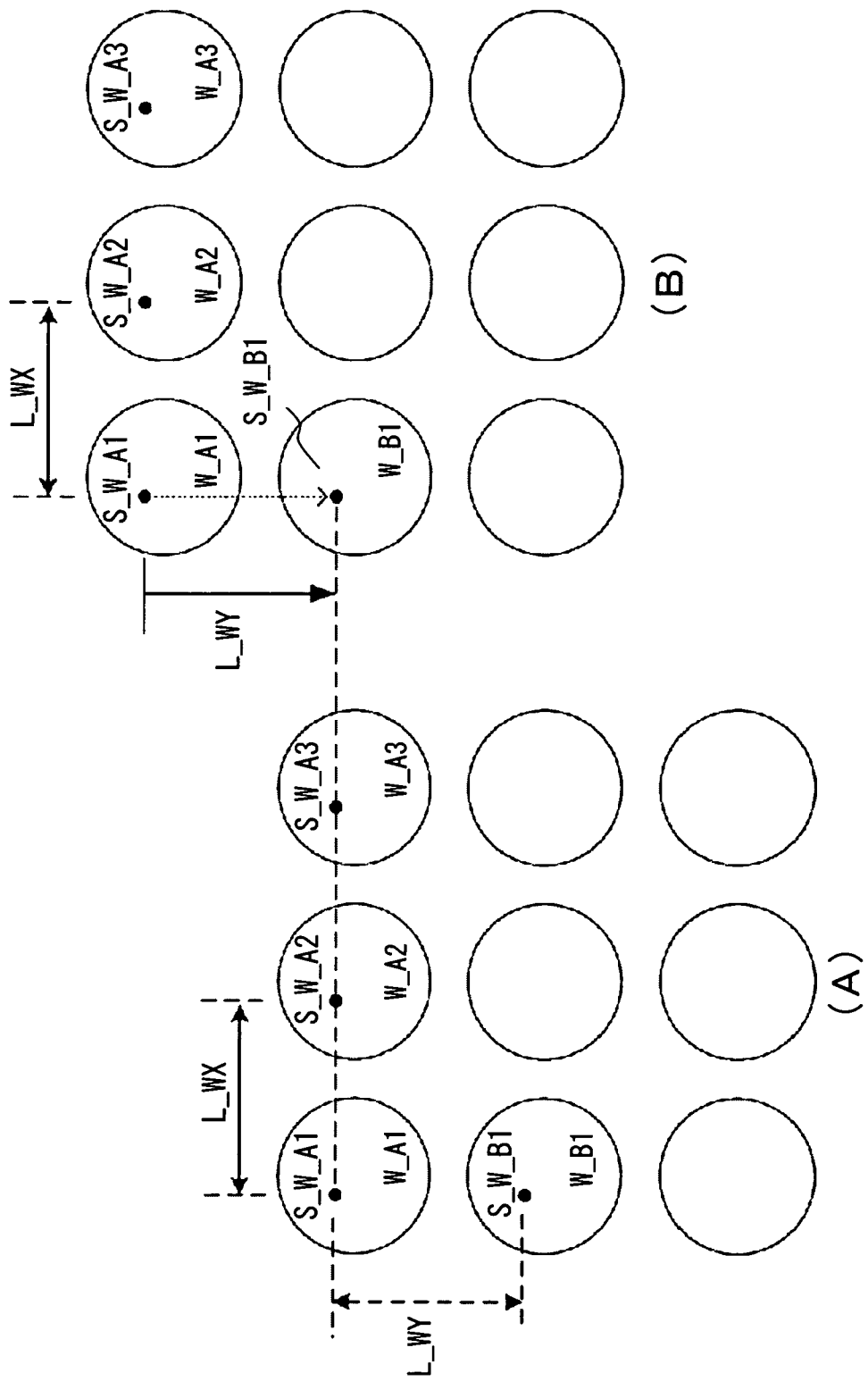

FIG. 21A is an explanatory view of an operation in the function area S_A_2 to which the function for moving a stage 20 in the X- and Y-axis directions is assigned. FIG. 21B is an explanatory view (2) of the movement of the stage 20 in the X- and Y-axis directions in the operation according to the first embodiment (scale-up function area mode, normal movement mode);

FIGS. 22A and 22B are a flowchart of the operation of the microscope controller when a dragging operation is performed on the function area S_A_2 according to the first embodiment (continuous movement mode);

FIG. 23A is an explanatory view of an operation in the function area S_A_2 to which the function for moving a stage 20 in the X- and Y-axis directions is assigned. FIG. 23B is an explanatory view (1) of the movement of the stage 20 in the X- and Y-axis directions in the operation in the continuous movement mode according to the first embodiment;

FIG. 24A is an explanatory view of an operation in the function area S_A_2 to which the function for moving a stage 20 in the X- and Y-axis directions is assigned. FIG. 24B is an explanatory view (2) of the movement of the stage 20 in the X- and Y-axis directions in the operation in the continuous movement mode according to the first embodiment;

FIG. 25A is an explanatory view of an operation in the function area S_A_2 to which the function for moving a stage 20 in the X- and Y-axis directions is assigned. FIG. 25B is an explanatory view (3) of the movement of the stage 20 in the X- and Y-axis directions in the operation in the continuous movement mode according to the first embodiment;

FIG. 26 is an example of a continuous movement speed table storing the continuous movement speed set for each objective according to the first embodiment (continuous movement mode);

FIG. 27A is an explanatory view of a touching operation when the range of a function area S_A_21 is set so as to include the range of the function area S_B_2. FIG. 27B is an explanatory view (1) of the movement of the stage 20 in the X- and Y-axis directions in the operation according to the first embodiment (scale-up function area mode, continuous movement mode);

FIG. 28A is an explanatory view of a touching operation when the range of a function area S_A_21 is set so as to include the range of the function area S_B_2. FIG. 28B is an explanatory view (2) of the movement of the stage 20 in the X- and Y-axis directions in the operation according to the first embodiment (scale-up function area mode, continuous movement mode);

FIG. 29 is an example of the case when the continuous movement mode is realized by the normal function area mode according to the first embodiment;

FIG. 30 is a table of the moving speed and the moved distance according to the second embodiment;

FIGS. 31A and 31B are a flowchart of the operation of the microscope controller when the touching operation is performed on the function area S_A_2 according to the second embodiment;

FIG. 32A is an explanatory view of the operation of moving the stage 20 by a specified distance in the X- and Y-axis directions (horizontally on the figure) regardless of the dragging length. FIG. 32B is an explanatory view of the movement of the stage 20 in the X- and Y-axis directions (horizontally on the figure) in the operation according to the second embodiment (scale-up function area mode);

FIG. 33A is an explanatory view of the operation of moving the stage 20 by a specified distance in the X- and Y-axis directions (vertically on the figure) regardless of the dragging length. FIG. 33B is an explanatory view of the movement of the stage 20 in the X- and Y-axis directions (vertically on the figure) in the operation according to the second embodiment (scale-up function area mode);

FIG. 34A is an explanatory view of the operation of moving the stage 20 by a specified distance in the X- and Y-axis directions regardless of the dragging length. FIG. 34B is an explanatory view of the movement of the stage 20 in the X- and Y-axis directions in the operation according to the second embodiment (normal function area mode);

FIG. 35 is an example of a configuration of the microscope system according to the third embodiment;

FIG. 36 illustrates a multiplate 50 according to the third embodiment;

FIG. 37 illustrates a well interval input screen according to the third embodiment;

FIG. 38 is a flowchart of the well interval setting operation according to the third embodiment;

FIG. 39 is a flowchart of the operation of the microscope controller when the touching operation is performed on the function area S_A_2 according to the third embodiment;

FIG. 40 is an explanatory view of the operation of moving the stage 20 by one well distance in the X- and Y-axis directions (horizontally on the figure) regardless of the dragging length according to the third embodiment (scale-up function area mode);

FIG. 41 is a view obtained by scaling up the multiplate 50 in FIG. 36;

FIG. 42 is an explanatory view of the decision of the direction of the dragging operation according to the third embodiment;

FIG. 43 is an explanatory view of the movement of the observation position in the X-axis direction with the drive of the electric stage 20 according to the third embodiment;

FIG. 44 is an explanatory view of the operation of moving the stage 20 by one well distance in the X- and Y-axis directions (vertically on the figure) regardless of the dragging length according to the third embodiment (scale-up function area mode);

FIG. 45 is an explanatory view illustrating that the input of the distance LL10 shorter than a specified distance SL has been performed at the dragging speed of FV or less on the touch panel from the point a34 to the point a35 in the function area S_A_2 of the touch panel 207 according to the third embodiment.

Figure 48:
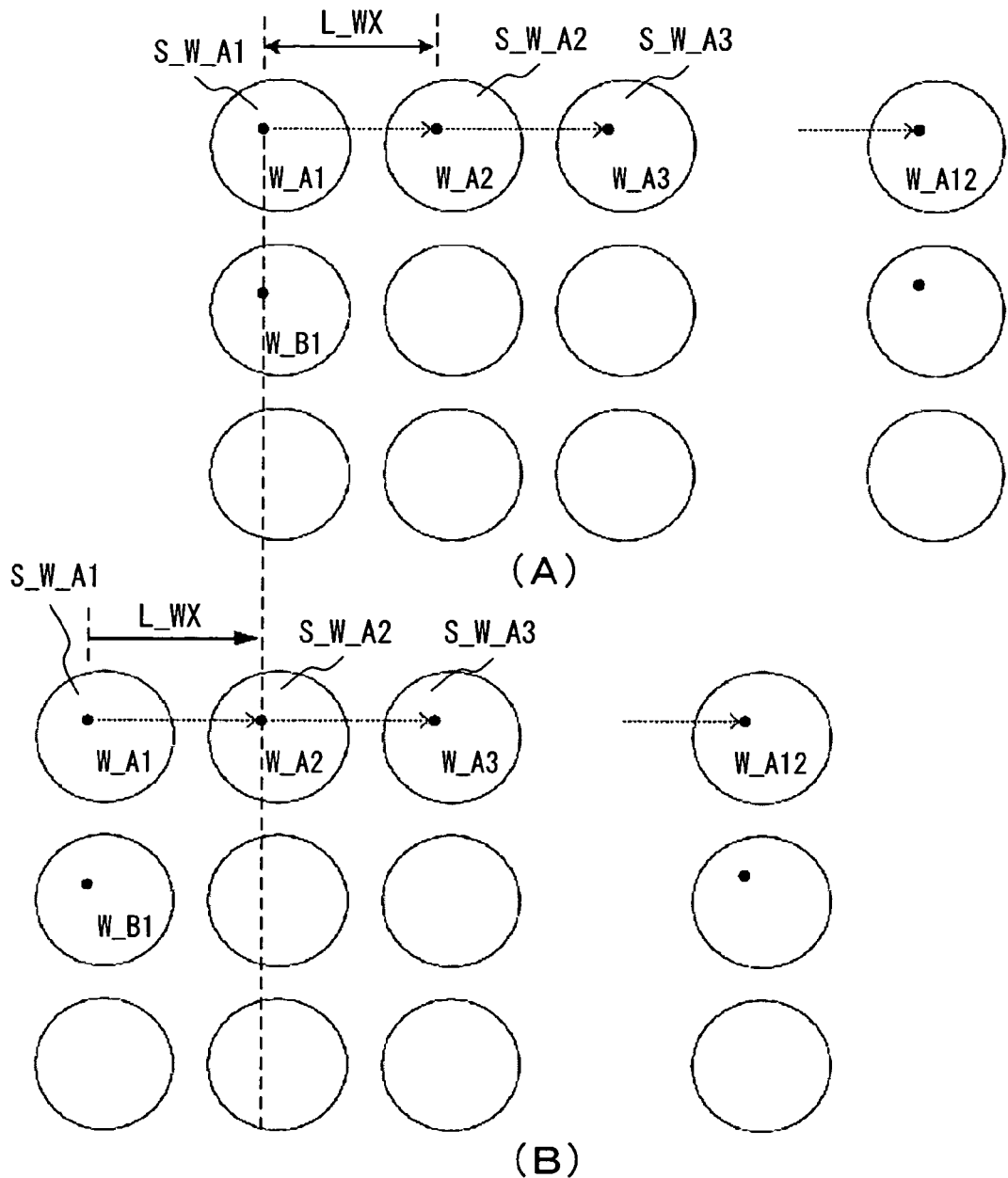
Figure 51A:
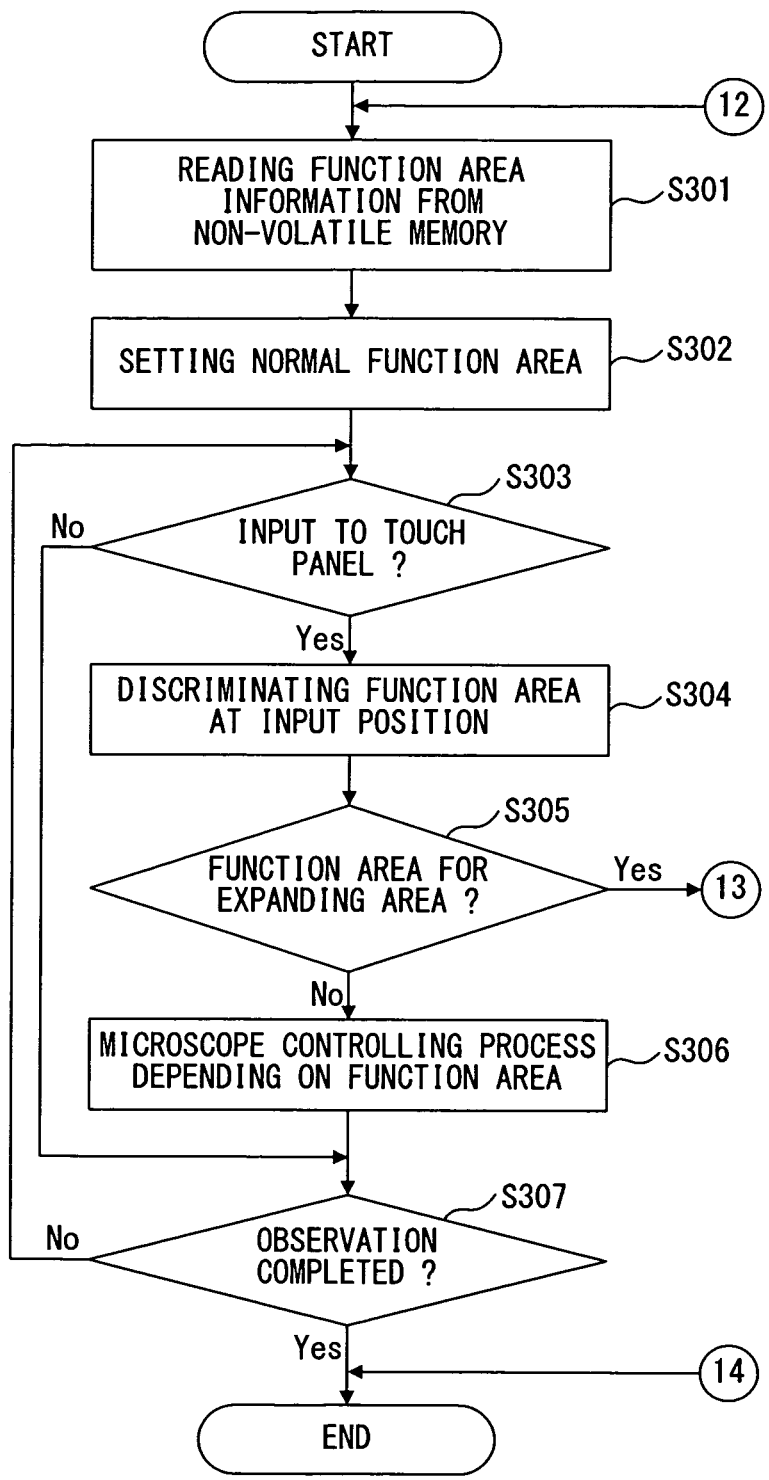
Figure 51B:
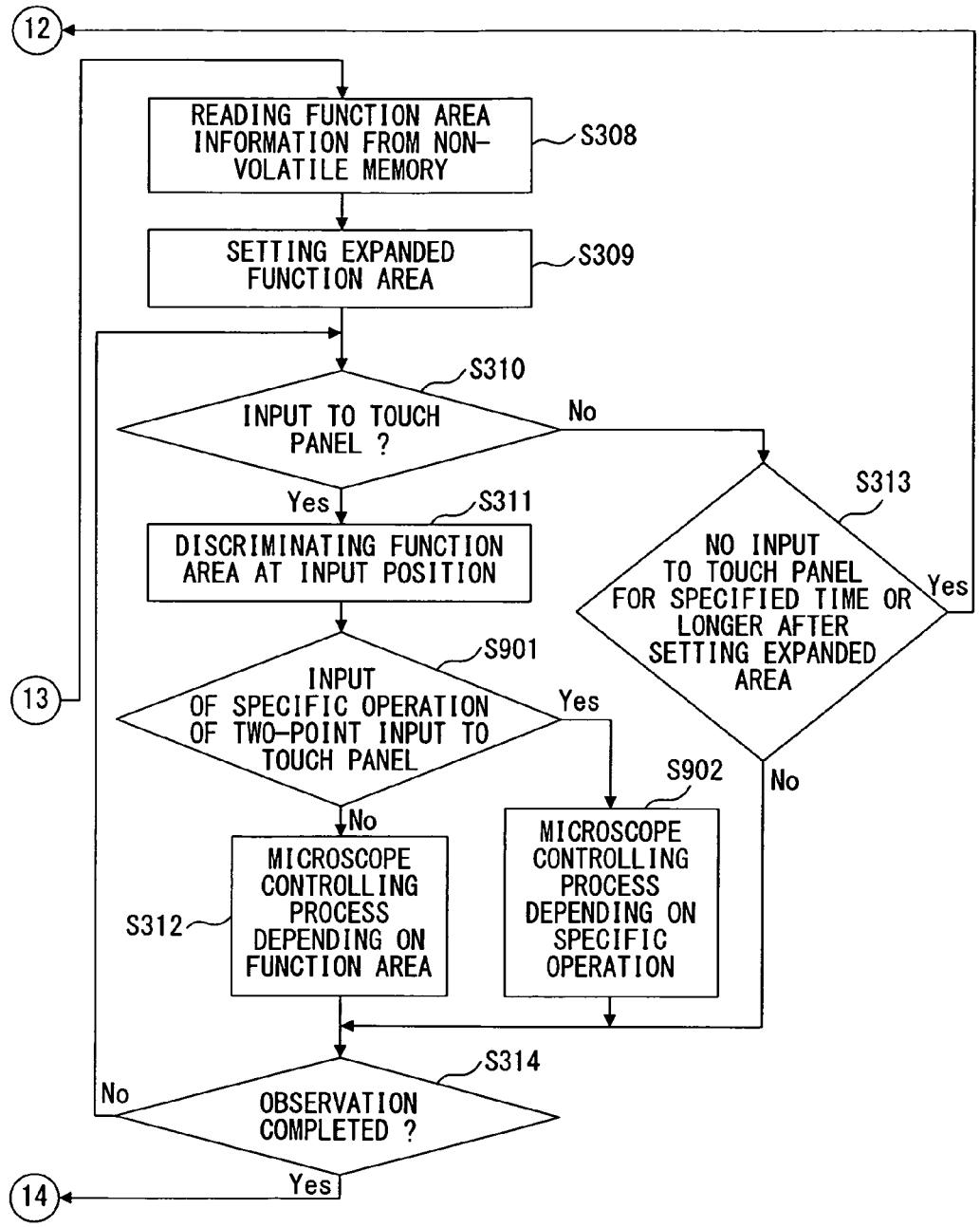
Figure 53A:
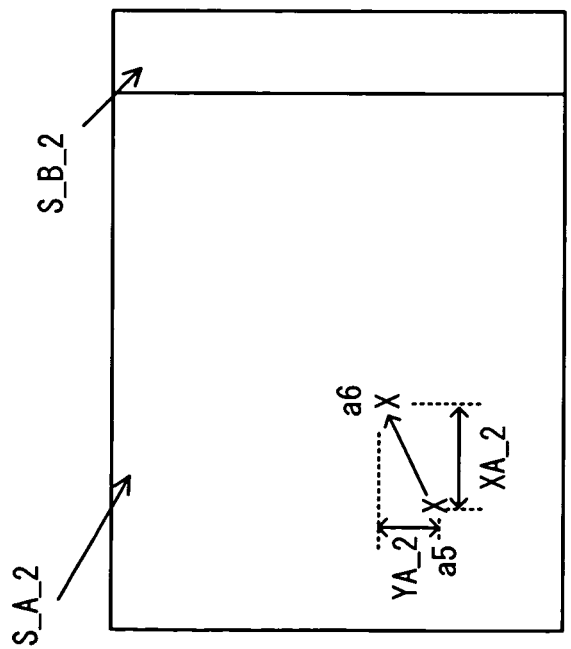
Figure 53B:
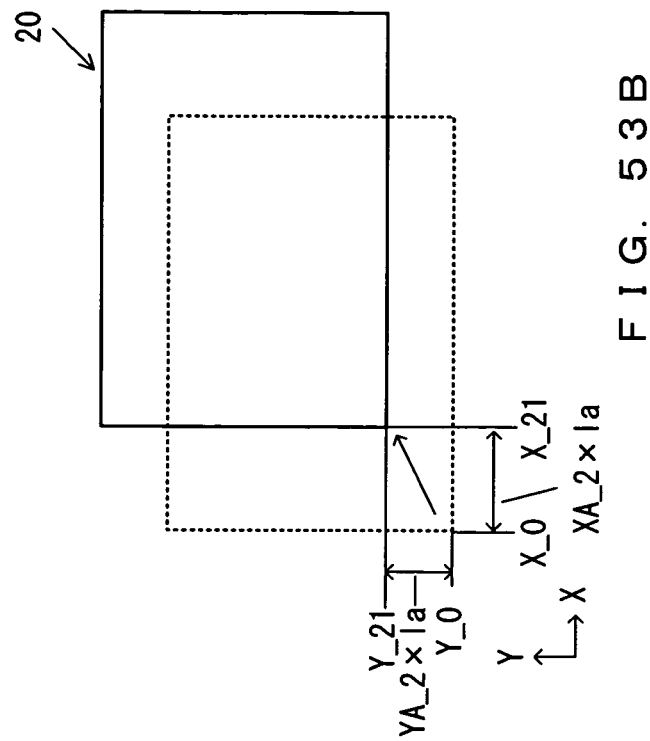
Figures 54A, 54B:
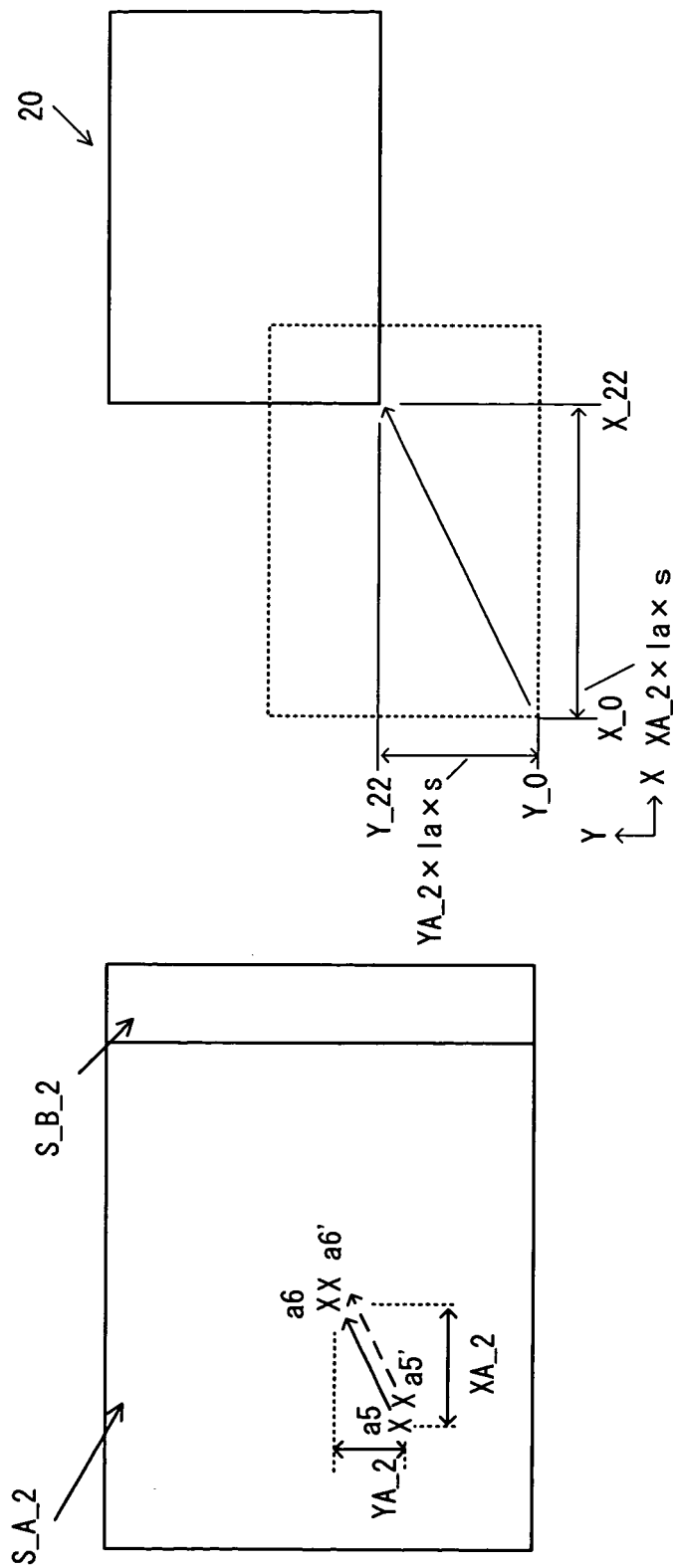
Figures 56A, 56B:
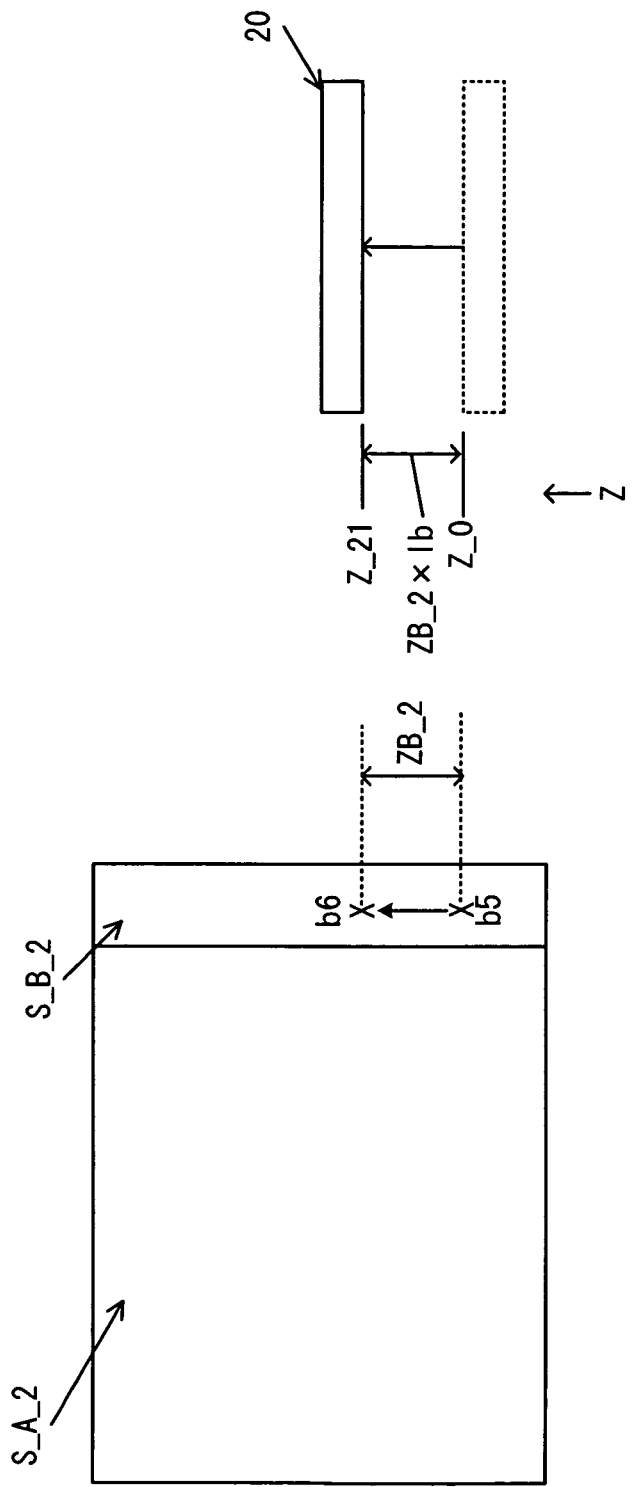
Figure 57B:
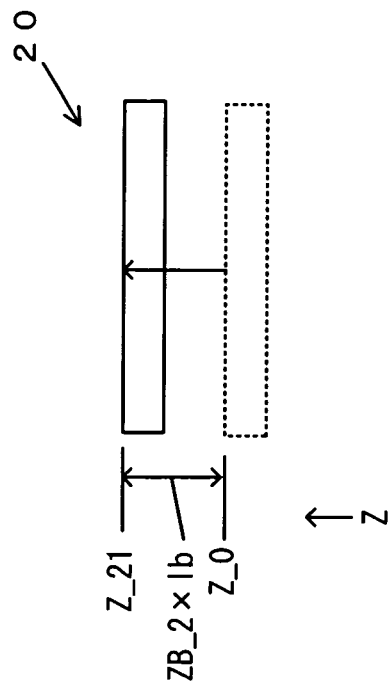
Figure 57A:
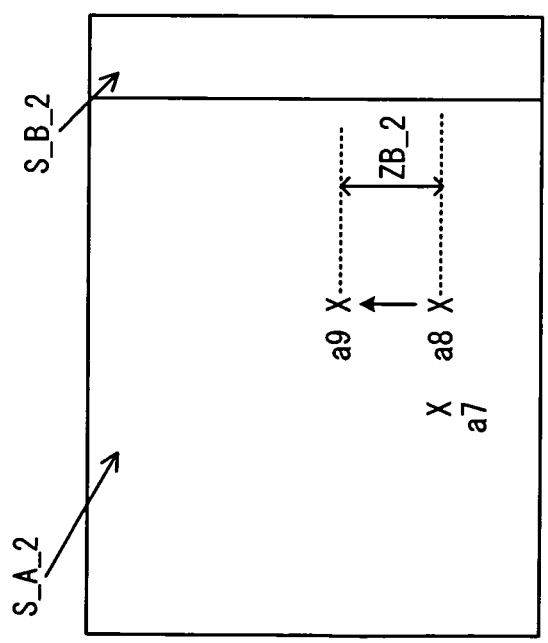
Figure 58A:
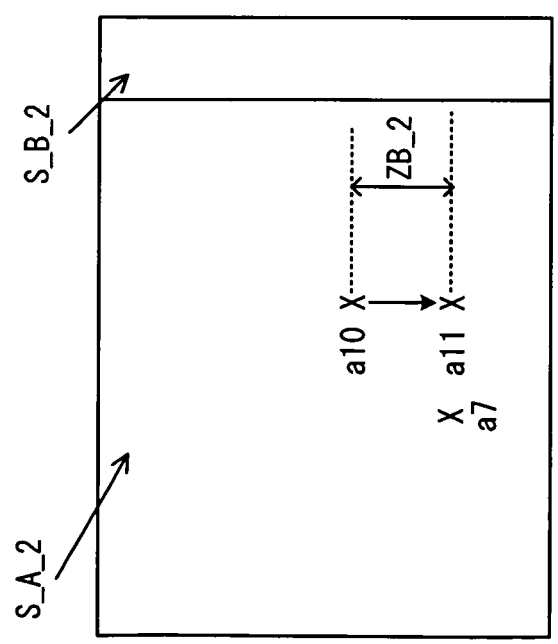
Figure 58B:
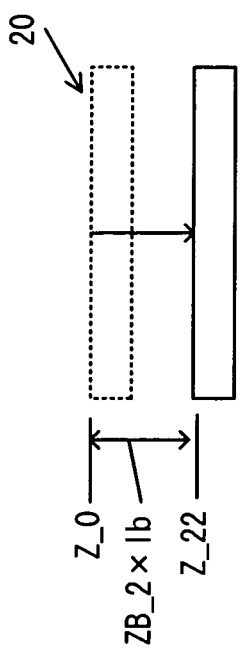
Figure 60B:
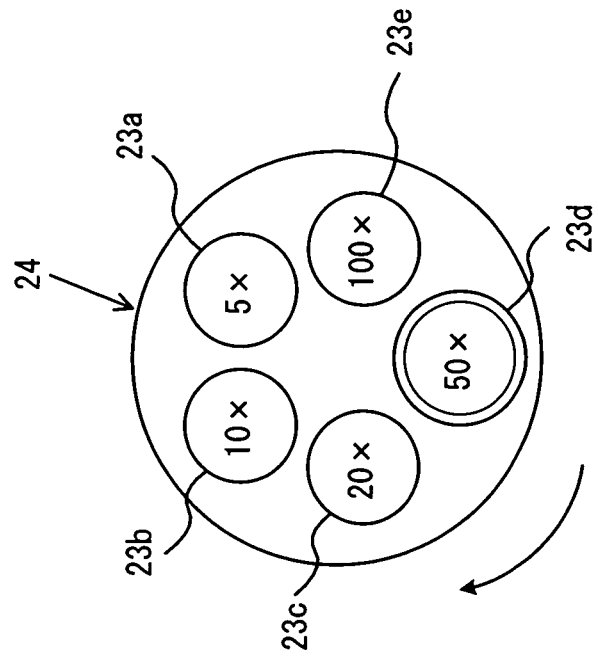
Figure 60A:
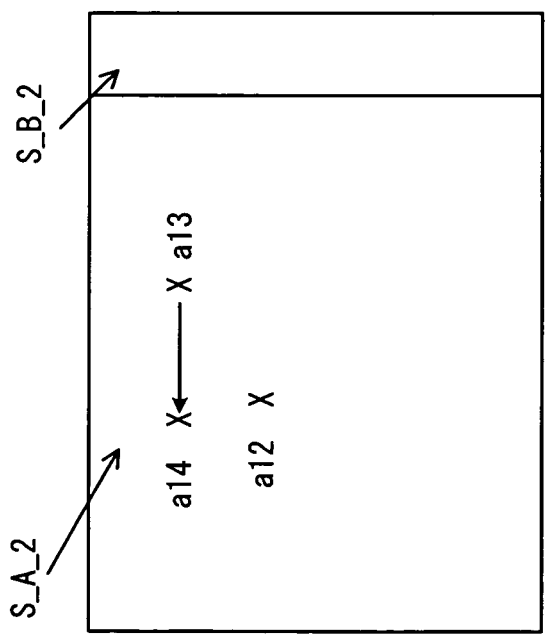
Figure 61B:
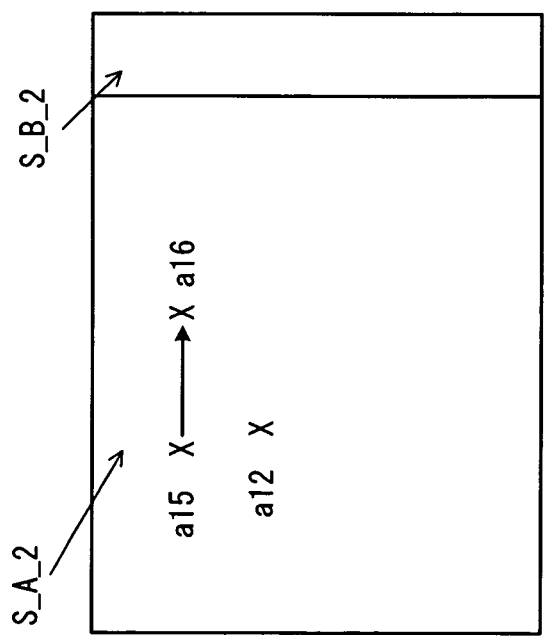
Figure 61A:
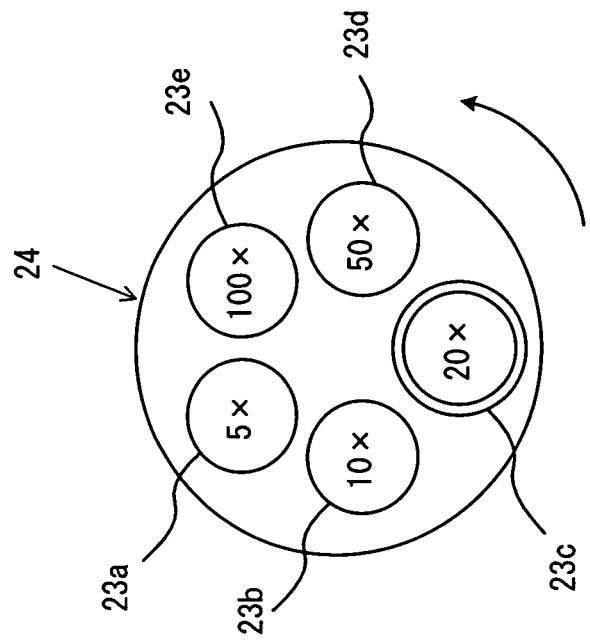

FIG. 46 illustrates the function area on the touch panel according to the fourth embodiment;

FIG. 47 is an explanatory view of the case in which an input by two continuous touches is made at the same place within a specified time T2 in a specific function area SS_1 according to the fourth embodiment;

FIG. 48 is an explanatory view of the movement of the observation position with the drive of the electric stage 20 according to the fourth embodiment;

FIG. 49 is an example of a microscope system operation control table used in the case in which an input by two continuous touches is made at the same place within a specified time T2 in each function area SS_1 according to the fourth embodiment;

FIG. 50 is a flowchart of the operation of the microscope controller when a touching operation is performed on the function area SS_1 according to the fourth embodiment;

FIG. 51A is a flowchart (1) of the operation of the microscope controller when an input of a specific operation of two points is performed on the function area S_A_2 according to the fifth embodiment;

FIG. 51B is a flowchart (2) of the operation of the microscope controller when an input of a specific operation of two points is performed on the function area S_A_2 according to the fifth embodiment;

FIGS. 52A and 52B are an example (1) of a microscope system operation control table used when an input of two points is performed on the touch panel according to the fifth embodiment;

FIGS. 52C and 52D are an example (2) of a microscope system operation control table used when an input of two points is performed on the touch panel according to the fifth embodiment;

FIG. 53A is an explanatory view of the case in which one point input operation is performed on the function area S_A_2 to move the stage 20 in the X- and Y-axis directions. FIG. 53B is an explanatory view of the movement in the X- and Y-axis directions of the stage 20 in the operation according to the fifth embodiment (scale-up function area mode);

FIG. 54A is an explanatory view of the case in which two point input operation is performed on the function area S_A_2 to move the stage 20 in the X- and Y-axis directions. FIG. 54B is an explanatory view (1) of the movement in the X- and Y-axis directions of the stage 20 in the operation according to the fifth embodiment (scale-up function area mode);

FIG. 55A is an explanatory view of the case in which two point input operation is performed on the function area S_A_2 to move the stage 20 in the X- and Y-axis directions. FIG. 55B is an explanatory view (2) of the movement in the X- and Y-axis directions of the stage 20 in the operation according to the fifth embodiment (scale-up function area mode);

FIG. 56A is an explanatory view of the case in which one point input operation is performed on the function area S_B_2 to move the stage 20 in the Z-axis direction. FIG. 56B is an explanatory view of the movement in the Z-axis direction of the stage 20 in the operation according to the fifth embodiment (scale-up function area mode);

FIG. 57A is an explanatory view of the case in which two point input operation is performed on the function area S_A_2 to move the stage 20 in the Z-axis direction. FIG. 57B is an explanatory view (1) of the movement in the Z-axis direction of the stage 20 in the operation according to the fifth embodiment (scale-up function area mode);

FIG. 58A is an explanatory view of the case in which two point input operation is performed on the function area S_A_2 to move the stage 20 in the Z-axis direction. FIG. 58B is an explanatory view (2) of the movement in the Z-axis direction of the stage 20 in the operation according to the fifth embodiment (scale-up function area mode);

FIG. 59A is an explanatory view of the case in which two point input operation is performed on the function area S_A_2 to switch an electric revolver. FIG. 59B is an explanatory view (1) of the movement in the X- and Y-axis directions of the stage 20 in the operation according to the fifth embodiment (scale-up function area mode);

FIG. 60A is an explanatory view of the case in which two point input operation is performed on the function area S_A_2 to switch an electric revolver. FIG. 60B is an explanatory view (2) of the movement in the X- and Y-axis directions of the stage 20 in the operation according to the fifth embodiment (scale-up function area mode); and FIG. 61A is an explanatory view of the case in which two point input operation is performed on the function area S_A_2 to switch an electric revolver. FIG. 61B is an explanatory view (3) of the movement in the X- and Y-axis directions of the stage 20 in the operation according to the fifth embodiment (scale-up function area mode).

DESCRIPTION OF EMBODIMENTS

Some recent microscope controllers have a touch panel function to perform various operations. A microscope controller having the touch panel function has an arbitrary button region on the touch panel, and the microscope is operated by pressing the corresponding region.

In the microscopic observation, when the button on the touch panel is operated it is necessary to confirm the position of the button with the sight off the eyepiece temporarily. Therefore, an operation technique is required to perform the operation with a blind touch.

However, it is difficult for the following reason to arrange the same operation screen as the display of the PC on the operation screen of the microscope controller using the above-mentioned touch panel. First, unlike the display of a PC, the touch panel has a small display operation area. Therefore, for example, an operation stroke becomes shorter if the operation area in the X- and Y-axis directions and the Z-axis direction in which the electric unit is continuously moved is arranged as is on the touch panel, thereby degrading the operability.

With the microscope controller using a conventional touch panel, it is not considered to perform the microscope operation by a blind touch, thereby greatly degrading the operability. Furthermore, the operability in moving to the next well in performing the multi-well plate observation is not considered.

To solve the above-mentioned problems, the present invention provides a microscope controller for improving the operability of the movement of a stage when a stage moving operation is performed on the touch panel, and a microscope system provided with the microscope controller. The present invention also provides a microscope controller for improving the operability when an electric unit is operated using the touch panel, and a microscope system provided with the microscope controller.

The microscope controller according to the embodiment of the present invention performs control of the operation of the electric stage used in the microscope system. The microscope controller includes a touch panel unit, a function setting unit, an input detection unit, a determination unit, and a communication control unit.

The touch panel unit receives an input by an external physical contact, and has a display function. The touch panel unit corresponds to the touch panel 207 according to the present embodiment.

The function setting unit sets the stage operation function for operating the electric stage in the specified display region of the touch panel unit. The function setting unit corresponds to, for example, a CPU 201 according to the present embodiment.

The input detection unit detects the input by the physical contact made in the operation display region in which the stage operation function is set. The input detection unit corresponds to, for example, a touch panel control unit 206.

The determination unit determines the moving mode of the electric stage depending on the result of the detected input, and generates a control instruction signal for control of the electric stage. The function setting unit corresponds to, for example, the CPU 201 according to the present embodiment.

The communication control unit transmits the control instruction signal to an external device for control of the operation of the electric stage. The communication control unit corresponds to a communication control unit 205 according to, for example, the present embodiment.

With the configuration above, the operability of the microscope of a user may be improved.

Furthermore, if the determination unit determines based on the request of the detected input that the input continues at a specified position after the position of the input continuously changes in a specified direction in the operation display region, the electric stage is continuously moved in the specified direction.

With the configuration above, when the end point of the input by the dragging operation is in a specified area, the movement of the stage may be continued at a specified speed in the same direction as the direction of approach to the end point immediately before the stop of the dragging operation while the input is continued for a specified time at the end point.

When continuously moving the electric stage in the specified direction, the determination unit controls the moving speed of the electric stage depending on the magnification of the objective inserted into the observation optical path.

With the configuration above, the moving speed of the electric stage may be controlled depending on the movement of a selected objective.

When the electric stage is continuously moved in the specified direction, the determination unit moves the electric stage in the specified direction immediately before the continuous change of the position of the input in the specified direction in the operation display region is completed, and at the moving speed of the electric stage in which the stage moves corresponding to the continuous changes of the position of the input.

With the configuration above, when the end point of the input by the dragging operation is in a specified area, the stage may be continuously moved while maintaining the preceding stage moving speed in the direction of approaching the end point immediately before the stop of the dragging operation while the input continues for a specified time at the end point.

The function setting unit may set the first display area including the specified position and the second display area excluding the first display area.

With the configuration above, when the end point of the input by the dragging operation is located in the first area, the stage may be continuously moved at a specified speed in the direction of the approach to the end point immediately before the stop of the dragging operation while the input is continued for a specified time at the end point.

The electric stage is moved by the specified amount when the determination unit determines that the position of the input in the operation display region has continuously changed by a specified distance based on the result of the detected input.

With the configuration above, the electric stage may be moved by a specified distance in the X- and Y-axis directions regardless of the dragging length when an input (touching operation) of a specified moved distance is made at a specified speed on the touch panel.

With the configuration above, the determination unit moves the electric stage based on the amount of the movement set depending on the magnification of the objective inserted into the observation optical path of the microscope system.

With the configuration above, the electric stage may be moved by a specified distance depending on the magnification of a selected objective.

The microscope system may be provided with the microscope controller.

The electric stage may be loaded with a micro-plate having a plurality of wells. In this case, the microscope controller further includes an interval storage unit. When the interval between the wells of the micro-plate is input to the touch panel unit, the interval storage unit stores the interval between the wells. In this case, based on the result of the detected input, when the determination unit determines that the position of the input in the operation display region has changed at a speed higher than a specified speed and continuously for a specified distance, the unit moves the electric stage based on the distance between the wells which is stored in the interval storage unit. That the position of the input in the operation display region has changed at a speed higher than a specified speed and continuously for a specified distance means that the dragging operation has been performed on the touch panel unit at a speed higher than a specified speed for a specified distance or less.

With the configuration above, when the dragging operation is performed at the dragging speed of SV or higher on the touch panel 207 for the distance shorter than the specified distance of SL, the stage 20 may be moved by the distance of one well in a specified direction depending on the dragging direction regardless of the dragging length.

The electric stage may be loaded with a micro-plate having a plurality of wells. In this case, the microscope controller further includes an interval storage unit. When the interval of the wells of the micro-plate is input on the touch panel unit, the interval storage unit stores the interval between the wells. In this case, when the determination unit determines that the input in the operation display region has been performed in a specified time and in a specified area, the unit moves the electric stage based on the distance between the wells which is stored in the interval storage unit.

With the configuration above, when a touch input is made continuously in a specified time in a specific function area on the touch panel 207, the stage 20 may be moved by the length of one well in a specified direction.

According to another embodiment of the present invention, the microscope system is different in control of the operation of an electric unit between the input by one point and the input by two points. The microscope controller for controlling the operation of the electric unit used in the microscope system according to the other embodiment includes a touch panel unit, a function setting unit, an input detection unit, a control unit, and a communication control unit.

The touch panel unit receives an input by an external physical contact, and has a display function. The touch panel unit corresponds to, for example, the touch panel 207 according to the present embodiment.

The function setting unit sets the operating function for operating the electric unit in a specified display region of the touch panel unit. The function setting unit corresponds to, for example, the CPU 201 according to the present embodiment.

The input detection unit detects the input by the physical contact made in the operation display region in which the operating function is set. The input detection unit corresponds to, for example, the touch panel control unit 206 according to the present embodiment.

The control unit determines the number of input points indicating the position of the input in the operation display region and the moving mode of the input point, determines the moving mode of the electric unit depending on the determined number of input points, and generates a control instruction signal for instructing to control the drive of the electric unit according to the determined moving mode. The control unit corresponds to, for example, the CPU 201 according to the present embodiment.

The communication control unit transmits the control instruction signal to the external device for controlling the operation of the electric unit. The communication control unit corresponds to, for example, the communication control unit 205 according to the present embodiment.

With the configuration above, the operability of an electric unit may be improved when the electric unit is operated using a touch panel.

In addition, assume that the electric unit is an electric stage. Then, assume that the electric stage is moved with respect to the operation display region in the state in which the operating function of moving the electric stage with respect to the operation display region is set. In this case, as a result of the determination, the control unit may change the moved distance of the electric stage between the case in which the number of input points is one and the case in which one or more input points other than the specified input point are detected when the specified input point is detected.

With the configuration above, the moved distance of the electric stage may be changed depending on the number of input points simultaneously input to the touch panel.

In addition, as a result of the determination when the input point changes continuously in a specified direction in the operation display region the control unit, the control unit may change the moved distance of the electric stage between the case in which the number of input points is one and the case in which one or more input points other than the specified input point are detected when the specified input point is detected.

With the configuration above, the moved distance of the electric stage may be changed depending on whether the dragging operation is performed with one input point on the touch panel or with two or more input points.

Furthermore, as a result of the determination, the control unit may change the moved distance of the electric stage between the case in which one input point changes continuously in a specified direction and the case in which the position of one input point is not changed while the other input point continuously changes in a specified direction.

With the configuration above, the moved distance of the electric stage may be changed depending on whether one input point has been dragging operated or one input point is fixed while the other input point has been dragging operated.

Based on the result of the determination, the control unit may control the second electric unit different from the first electric unit which is a target of the operating function set in the operation display region depending on the number of input points input to the operation display region.

To be more concrete, the second electric unit is a microscope control device for controlling an optical axis drive unit for moving the electric stage in the optical axis direction, a light source device, an electric revolver, an optical element turret, or a microscopic examination method. With the device, the control unit generates the control instruction signal for realization of one of moving the electric stage in the optical axis direction by the optical axis direction drive unit, adjusting the quantity of light adjustment by the light source device, switching objectives by the electric revolver, switching the optical element by the optical element turret, and switching the microscopic examination method by the microscope control device.

With the configuration above, the operations of the electric units other than the electric stage may be controlled depending on the number of input points simultaneously input to the touch panel.

In addition, the microscope system may be provided with the microscope controller.

The embodiments of the present invention are described below in detail.

<First Embodiment>

In the present embodiment, the microscope controller described below is capable of continuously moving a stage at a specified speed in the direction of the approach to the end point immediately before the dragging operation while the input is continued for a specified time at the end point when the end point of the input by the dragging operation to the touch panel is located in a specified region.

Figure 1:
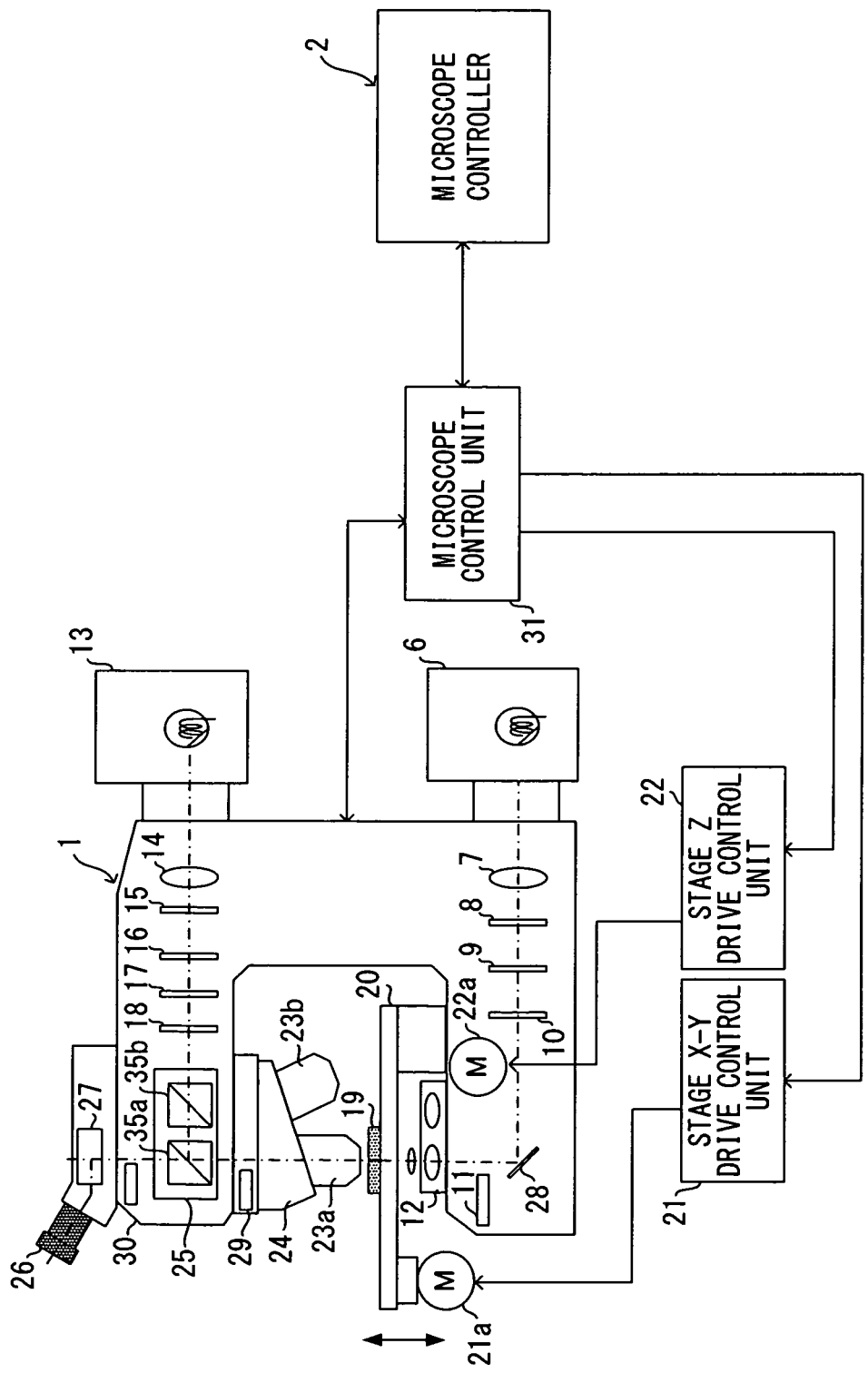
FIG. 1 is an example of a configuration of a microscope system according to the first embodiment of the present invention.

FIG. 1 is an example of a configuration of a microscope system according to the present embodiment. A microscope device 1 includes as a transmission observation optical system a transmitted-light illumination light source 6, a collector lens for collecting the illumination light of the transmitted-light illumination light source 6, a transmission filter unit 8, a transmission field stop 9, a transmission aperture stop 10, a condenser optical element unit 11, and a top lens unit 12.

The microscope device 1 includes as an incident-light optical system an epi-illumination light source 13, a collector lens 14, an incident-light filter unit 15, an incident-light shutter 16, an incident-light field stop 17, and an incident-light aperture stop 18.

On the observation optical path on which the optical path of a transmission observation optical system overlaps the optical path of a incident-light observation optical system, the electric stage 20 loaded with a sample 19 is provided. The electric stage 20 may be moved in each of the vertical direction (Z-axis) direction and the horizontal direction (X- and Y-axis) direction.

The control of the movement of the electric stage 20 is performed by a stage X-Y drive control unit 21 and a stage Z drive control unit 22. The stage X-Y drive control unit 21 moves the electric stage 20 in the X- and Y-axis directions by controlling the drive of an X-Y motor 21a. The stage Z drive control unit 22 moves the electric stage 20 in the Z-axis direction by controlling the drive of a Z motor 22a.

The electric stage 20 has an origin detecting function (not illustrated in the attached drawings) by an origin sensor. Therefore, the movement control may be performed by detecting and specifying the coordinates of the sample 19 loaded on the electric stage 20.

Also provided on the observation optical path are the electric revolver 24, a cube turret 25, and a beam splitter 27.

A plurality of objectives 23a, 23b, . . . (hereafter referred to as an "objective 23" as necessary) are attached to the electric revolver 24. By revolving the electric revolver 24, an objective for use in an observation may be selected from the plurality of objectives 23.

Each of the fluorescent cube A (35a), the fluorescent cube B (35b), and the fluorescent cube C (not illustrated in the attached drawings) has an excitation filter, a dichroic mirror, and an absorption filter corresponding to each fluorescent observation wavelength. Using the cube turret 25, any of the fluorescent cube A (35a), the fluorescent cube B (35b), the fluorescent cube C (not illustrated in the attached drawings) is switched to and arranged on the optical path.

Using the beam splitter 27, the observation optical path is branched to a eyepiece 26 side and a video camera side (not illustrated in the attached drawings).

Furthermore, a polarizer 28 for observing a differentiation observation, a DIC (differential interference contrast) prism 29, and an analyzer 30 may be integrated into the observation optical path.

Each of these units is electrically driven, and the operation is controlled by a microscope control unit 31 which is described later.

The microscope control unit 31 is connected to the microscope controller 2. The microscope control unit 31 has a function of controlling the operation of the entire microscope device 1. The microscope control unit 31 changes the microscopy and adjusts the light of the transmission transmitted-light illumination light source 6 and the epi-illumination light source 13 based on the control signal or a command from the microscope controller 2. Furthermore, the microscope control unit 31 has a function of transmitting the state of the current microscopic observation by the microscope device 1 to the microscope controller 2. Furthermore, the microscope control unit 31 is also connected to the stage X-Y drive control unit 21 and the stage Z drive control unit 22. Therefore, the electric stage 20 is controlled by the microscope controller 2 through the microscope control unit 31.

Figure 2:
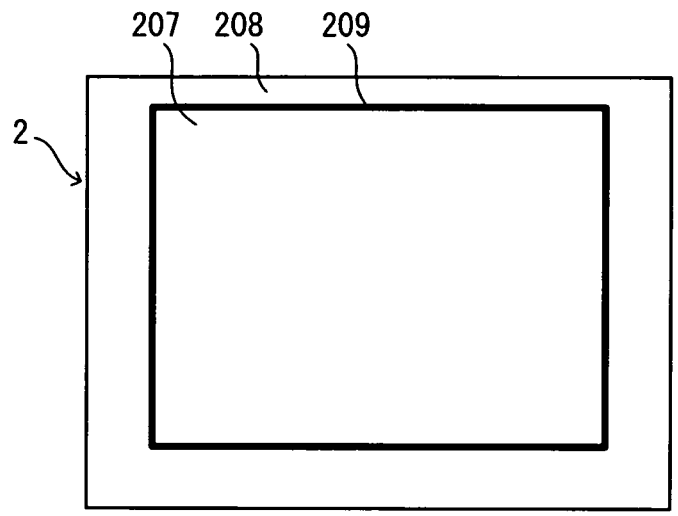
FIG. 2 is a view of the appearance of a microscope controller according to the first embodiment.

FIG. 2 is a view of the appearance of a microscope controller according to the present embodiment. The microscope controller 2 has the touch panel 207 for a user to input the operation of the microscope device 1.

A specified attribute for operation of the microscope device 1 is set in a specified area on the touch panel 207. When the user operates the function area (the GUI (graphical user interface displayed on the touch panel) in which a specified attribute is set, the operations of various microscopes may be performed.

The touch panel 207 includes a function as a display device and a function as an input device. The touch panel 207 is included in an exterior 208 of the microscope controller 2.

The touch panel 207 is attached to the bottom of the concave part of the exterior 208. Between the surface of the touch panel 207 and the external surface of the exterior 208, a regular frame 209 which is formed by a step is provided. When the finger of a user moves along the regular frame 209, the regular frame 209 functions as a guide.

Figure 3:
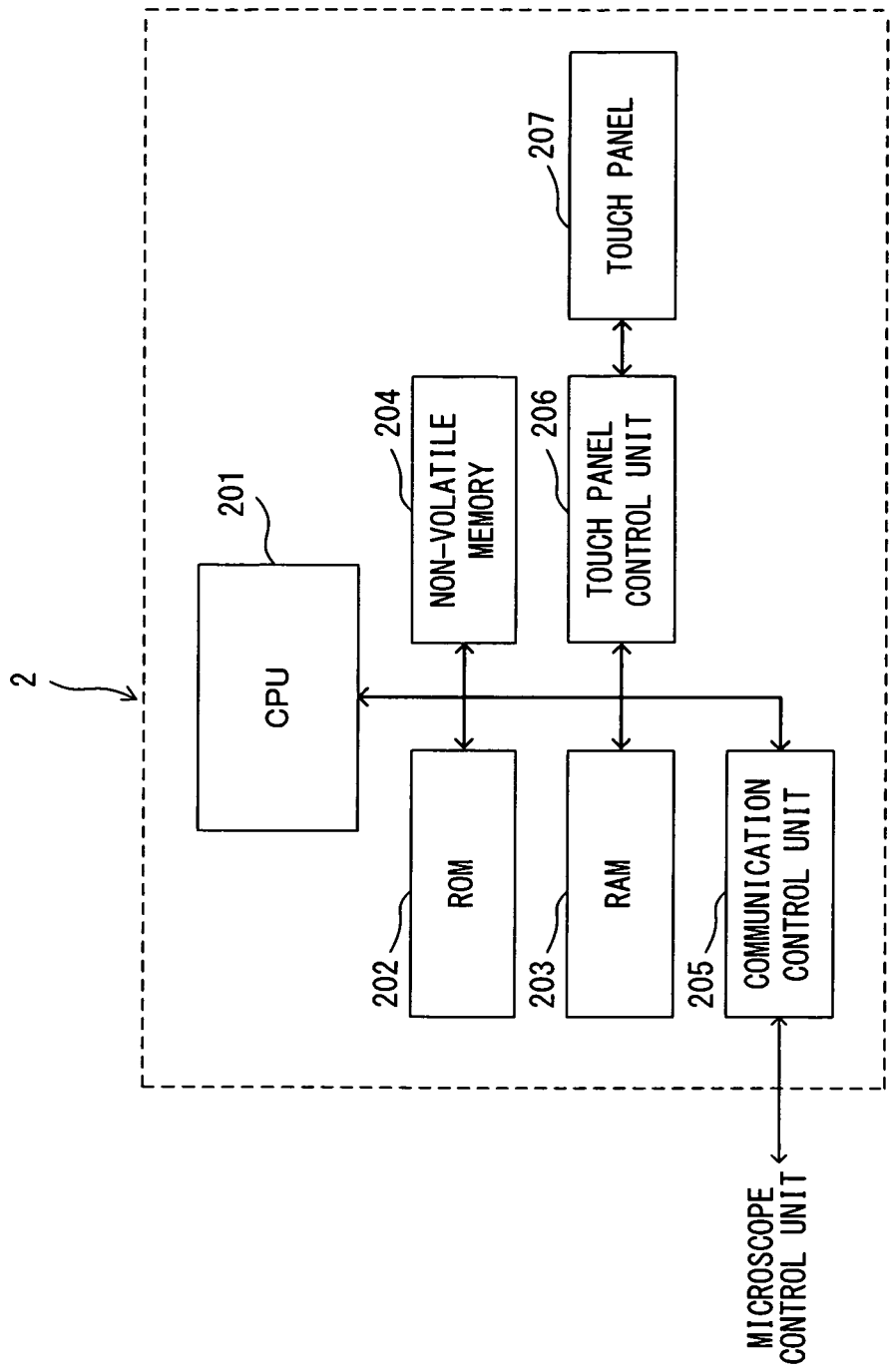
FIG. 3 illustrates the outline of the inner configuration of a microscope controller 2 according to the first embodiment.

FIG. 3 illustrates the outline of the inner configuration of a microscope controller 2 according to the present embodiment. The microscope controller 2 includes the CPU (central processing unit) 201, RAM (random access memory) 202, ROM (read only memory) 203, non-volatile memory 204, the communication control unit 205, the touch panel control unit 206, and the touch panel 207. Among the components, various types of data may be communicated through a bus under the management of the CPU 201.

The CPU 201 controls the operation of the entire microscope controller 2. When the CPU 201 executes a control program, the RAM 202 is used as a work storage area and temporarily stores various types of data. The ROM 203 stores in advance a control program for the CPU 201 to operation control the microscope controller 2. Application software for controlling the microscope device 1 is also a part of the control program.

The non-volatile memory 204 stores in advance the information about a plurality of function areas (function area setting information) in which a specified attribute for operation of the microscope device 1 including the operation button display (icon button display etc.) is set. Concretely, the function area setting information includes the coordinates information on a touch panel indicating the range of the function area associated with the information about the function assigned to the function area for operation of a specified electric unit configuring a microscope system. The function assigned to the function area for operation of the electric unit refers to, for example, for the operation of the electric stage 20, the function for moving the electric stage 20 in the X- and Y-axis directions or the Z-axis direction. The function assigned to the function area refers to, for example, for the operation of the electric revolver 24, the function for rotating the electric revolver to select any objective and insert the selected objective into the observation optical path.

The communication control unit 205 manages the data communication (for example, a serial communication) performed with the microscope control unit 31 of the body of the microscope device 1, and transmits the control information for control of the operation of each configuration unit to the microscope control unit 31.

The touch panel 207 may be any types of touch panels in the film resistance system, the capacitance system, the infrared system, the ultrasonic system, etc., and is not limited to a specific type. Furthermore, the touch panel control unit 206 detects the X and Y coordinates of the position input by a user on the touch panel 207, and transmits the detected coordinate information to the CPU 201. Furthermore, according to the present embodiment, a multi-touch screen device capable of detecting an input of a plurality of points is adopted. Therefore, the touch panel control unit 206 may detect the coordinates of each input point and trace the movement of each point.

Figure 4:
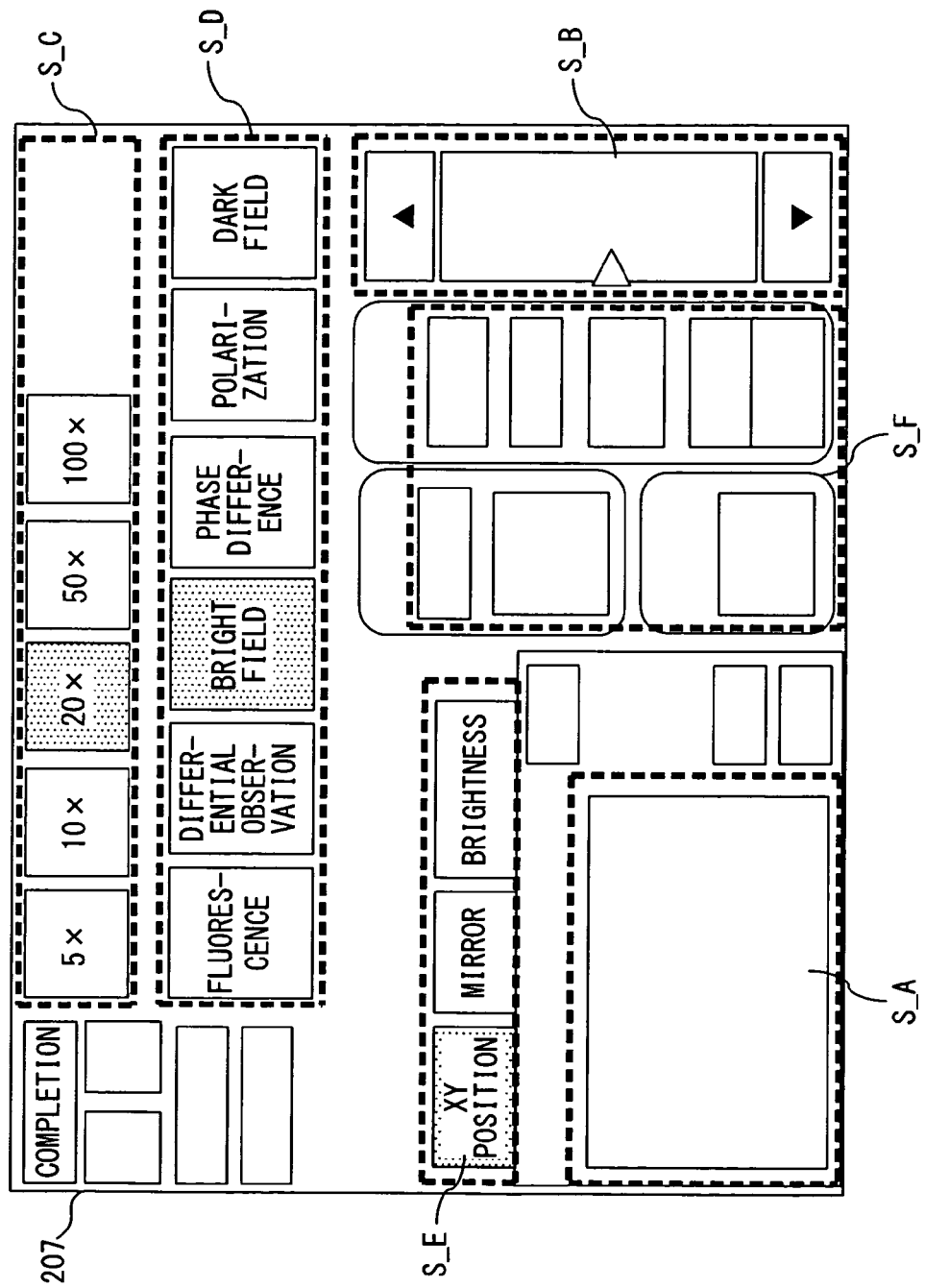
FIG. 4 is an example of the screen displayed on the touch panel according to the first embodiment.

FIG. 4 is an example of the screen displayed on the touch panel according to the present embodiment. In FIG. 4, a function is assigned to each of the region (function area) indicated by S_A, S_B, S_C, S_D, S_E, and S_F on the touch panel 207.

A function for moving the electric stage 20 in the X- and Y-axis directions is assigned to the function area S_A. The function area S_B is assigned the function for moving the electric stage 20 of the microscope device 1 in the Z-axis direction. The function area S_C is assigned the function for operating the interlocking electric revolver 24 for switching the electric revolver 24. The function area S_D is assigned the function for a microscopy switching operation. The function area S_E assigned the function for switching the function of the function area S_A. The function area S_F is assigned the function for performing various settings.

FIG. 5 is a flowchart of the control of the microscope controller 2 when the touching operation is performed on the function area to which the function according to the present embodiment is assigned. The CPU 201 as a control unit of the microscope controller 2 reads the application program stored in the RAM 202 and performs the following process.

First, the CPU 201 reads the function area setting information stored in the non-volatile memory 204 to the ROM 203 (S101). The CPU 201 assigns a specified attribute for operation of the microscope device 1 on the CPU 201 to each function area (including the GUI button etc. displayed on the touch panel) according to the function area setting information, and sets the function area (S102).

For example, the CPU 201 assigns the function area S_A to the function area expressed by the coordinates (x1, y1)~(x2, y2) on the touch panel. Furthermore, for example, the CPU 201 assigns the function area S_B to the function area expressed by the coordinates (x3, y3)~(x4, y4) on the touch panel. Furthermore, for example, the CPU 201 assigns the function area S_C to the function area expressed by the coordinates (x5, y5)~(x6, y6) on the touch panel. Furthermore, for example, the CPU 201 assigns the function area S_D to the function area expressed by the coordinates (x7, y7)~(x8, y8) on the touch panel. Furthermore, for example, the CPU 201 assigns the function area S_E to the function area expressed by the coordinates (x9, y9)~(x10, y10) on the touch panel. Furthermore, for example, the CPU 201 assigns the function area S_F to the function area expressed by the coordinates (x11, y11) ~(x12, y12) on the touch panel. In this case, the function area setting information is configured by associating the function area expressed by the coordinates above with the information about the function assigned to the function area.

When an input is made to the touch panel 207, the touch panel control unit 206 detects the X and Y coordinates of the position of the input (YES in S103). The touch panel control unit 206 transmits the detected coordinate information to the CPU 201.

The CPU 201 determines to which function area the coordinate information transmitted from the touch panel control unit 206 belongs according to the function area setting information (S104).

Based on the determination result, the CPU 201 performs a controlling process depending on each function area (S105). For example, when an input is made at any position of a function area, the CPU 201 controls the display mode of the image on the GUI according to the coordinate information by moving a specified image at the position, changing the image size, changing the color of the image, changing the shape of the image, moving the cursor, etc.

Furthermore, the CPU 201 calculates the amount of the movement by the touching operation on the touch panel 207. Then, the CPU 201 transforms the amount of the movement into the amount of drive of the electric unit which is assigned to the function area, and transmits a control instruction signal to the microscope control unit 31. The CPU 201 transmits the contents selected on the touch panel 207 to the microscope control unit 31 as the control instruction signal to the microscope control unit 31 according to the coordinate information detected on the touching operation. The processes in S103 through S105 are repeated until the observation is completed (S106).

Described below are the stage movement mode used when the electric stage 20 is moved and the display mode of the touch panel 207. The stage movement mode includes the normal movement mode and the continuous movement mode. The display mode includes the normal function area mode and the scale-up function area mode. The switch between the normal movement mode and the continuous movement mode, and between the normal function area mode and the scale-up function area mode using a switch button (not illustrated in the attached drawings).

First, the operations in the normal function area mode and the normal movement mode are described with reference to the operations in the X- and Y-axis directions of the electric stage 20.

Figure 6:
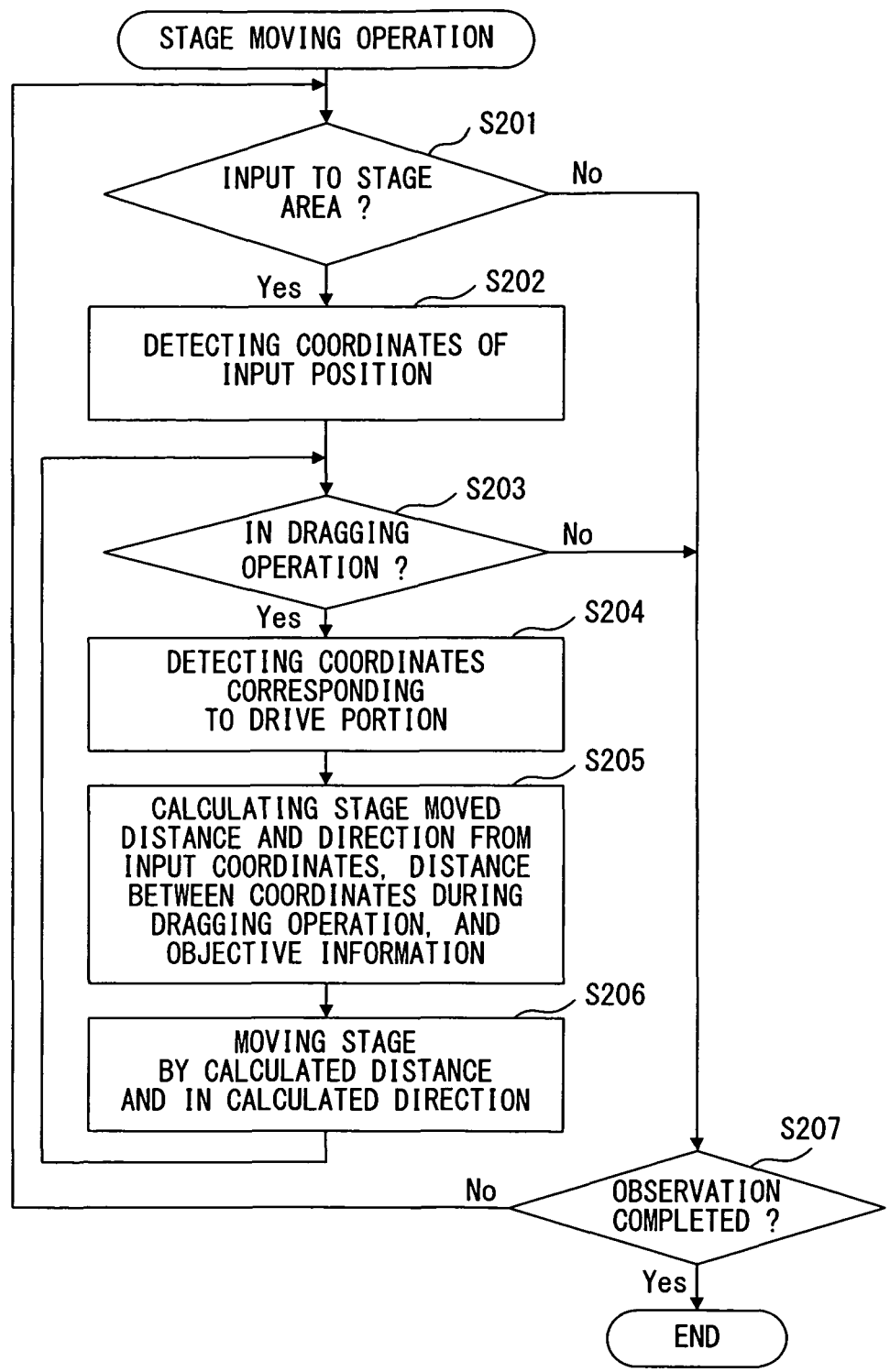
FIG. 6 is a flowchart of the operation of the microscope controller when a dragging operation is performed on a function area S_A according to the first embodiment (normal function area mode, normal movement mode)

FIG. 6 is a flowchart of the operation of the microscope controller when a dragging operation is performed on a function area S_A according to the present embodiment (normal function area mode, normal movement mode). The dragging operation refers to moving the contact portion on the touch panel 207 from one position to another position with the contact on the touch panel surface maintained.

When a user performs the dragging operation on the function area S_A (YES in S201), the touch panel control unit 206 detects the X and Y coordinates of the position of the input an the touch panel 207 (S202). The touch panel control unit 206 transmits the detected coordinate information to the CPU 201.

When the user performs the dragging operation in the function area S_A (YES in S203), the touch panel control unit 206 detects the coordinates corresponding to the dragging position (S204). The touch panel control unit 206 transmits the detected coordinate information to the CPU 201.

The CPU 201 calculates the moved distance and the direction of the movement of the stage from the coordinates of the drag starting position and the coordinates of the drag according to the coordinate information transmitted from the touch panel control unit 206 (S205).

The CPU 201 transmits an instruction to the stage X-Y drive control unit 21 through the microscope control unit 31 so that the electric stage 20 is moved by the calculated distance and in the calculated direction (S206). The processes in S203 through S206 are repeated until the dragging operation is completed.

When there is no input in the function area S_A (NO in S201), or the dragging operation is not performed (NO in S203), it is determined whether or not the observation is completed (S207). When the observation is continued (NO in S207), control is returned to step S201.

FIGS. 7 through 9 are (A) an explanatory view of an operation in the function area S_A to which the function for moving a stage 20 in the X- and Y-axis directions is assigned and (B) an explanatory view of the movement of the stage 20 in the X- and Y-axis directions in the operation according to the present embodiment (normal function area mode, normal movement mode). Described below with reference to FIGS. 7 through 9 is the control of the CPU 201 depending on the operation of the touch panel 207 based on the flow in FIG. 6 about the operation of the electric stage 20 in the X- and Y-axis directions.

A user performs a dragging operation (operation of moving the touch portion with the touch on the touch panel maintained) on the function area S_A. In this case, as described above, the microscope controller 2 instruct the stage X-Y drive control unit 21 to control the electric stage 20 based on the distance and direction of the dragging operation through the microscope control unit 31.

The moved distance in the X- and Y-axis directions of the electric stage 20 corresponds to the distance of the dragging operation in the function area S_A on the touch panel 207. The microscope controller 2 instructs the microscope control unit 31 to make a movement by the value obtained by multiplying the distance on the touch panel 207 by, for example, the coefficient Ia.

Figure 7A:
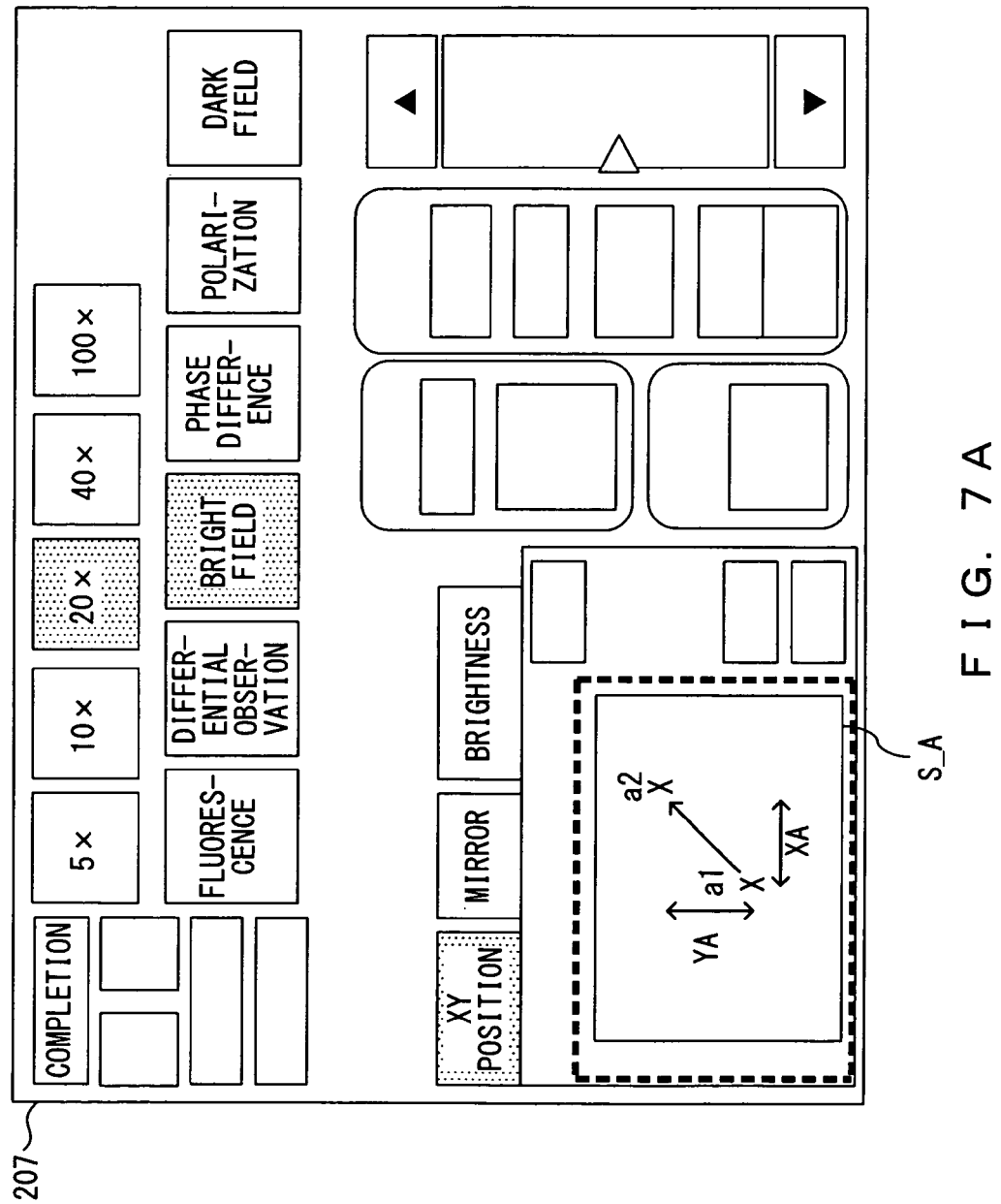
FIG. 7A is an explanatory view of an operation in the function area S_A to which the function for moving a stage 20 in the X- and Y-axis directions is assigned.
Figure 8A:
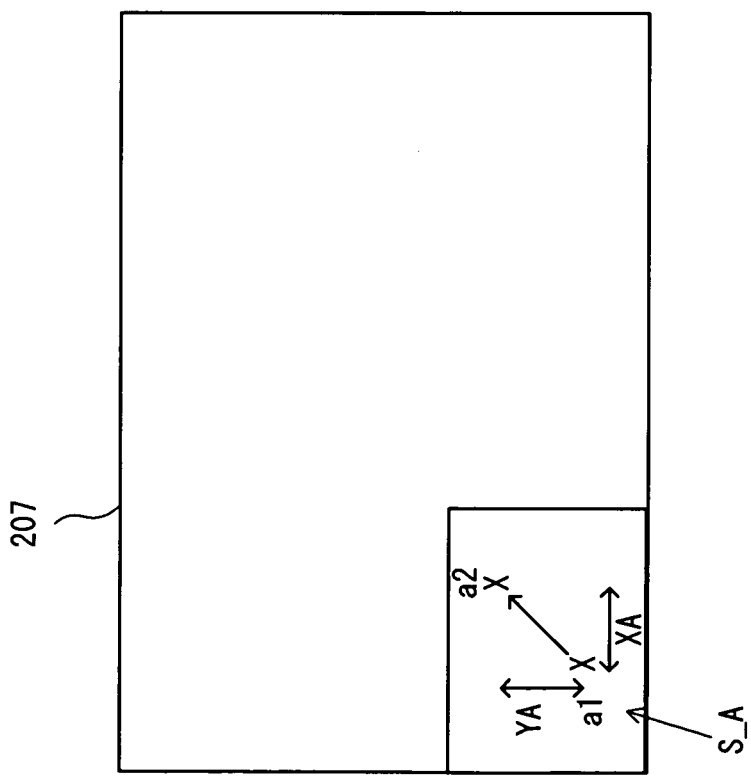
FIG. 8A is an explanatory view of an operation in the function area S_A to which the function for moving a stage 20 in the X- and Y-axis directions is assigned.

In FIG. 7A, the dragging operation (the moving operation to the point a2 with the touch on the touch panel maintained) is performed in the function area S_A by the distance XA in the X-axis direction and the distance YA in the Y-axis direction from the point a1 to the point a2 as illustrated in FIG. 8A. When there is no input in the function area S_A in FIG. 7A, it is assumed that the lower left end of the electric stage 20 is located at the coordinates (X_0, Y_0) in FIG. 7B.

Figure 8B:
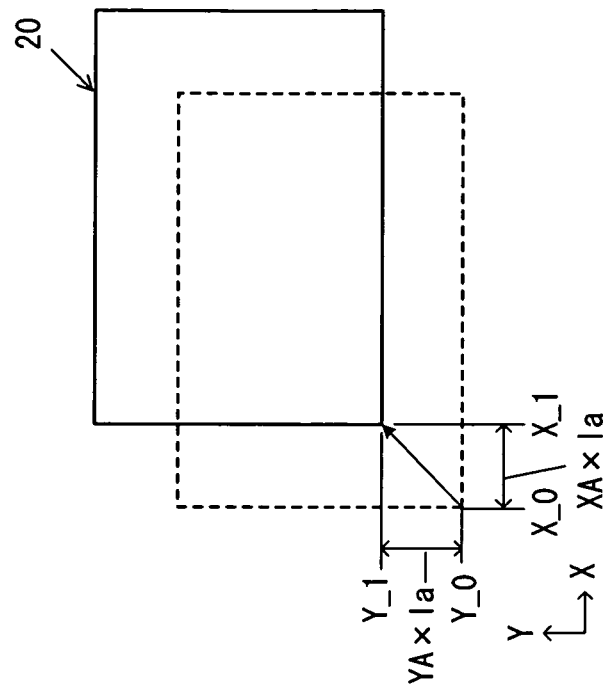
FIG. 8B is an explanatory view (2) of the movement of the stage 20 in the X- and Y-axis directions in the operation according to the first embodiment (normal function area mode, normal movement mode)

Depending on the dragging operation from the point a1 to the point a2 as illustrated in FIG. 8A, the movement is made as illustrated in FIG. 8B by the distance of XA×Ia from the coordinates X_0 to X_1 in the X-axis direction of the electric stage 20, and by the distance of YA×Ia from the coordinates Y_0 to Y_1 in the Y-axis direction of the electric stage 20.

Furthermore, assume that the dragging operation by the distance of XA' in the X-axis direction and the distance of YA' in the Y-axis direction from the point a3 to the point a4 as illustrated in FIG. 9A. In this case, as illustrated in FIG. 9B, the movement is made by the distance of XA'×Ia from the coordinates X_1 to X_2 in the X-axis direction of the electric stage 20, and by the distance of YA'×Ia from the coordinates Y_1 to Y_2 in the Y-axis direction of the electric stage 20.

As illustrated in FIG. 6, the position of the electric stage 20 is traced depending on the dragging position during the dragging operation by the touch panel control unit 206 detecting the coordinates during the dragging operation. The history of the movement of the stage is recorded on the ROM 203 for later reference. Furthermore, according to the present embodiment, the coefficient Ia is fixed, but the coefficient may be variable. For example, the coefficient Ia may be varied for each objective 23.

The operation of the electric stage 20 in the Z-axis direction is described below.

FIGS. 10 through 12 are (A) an explanatory view of an operation in the function area S_B to which the function for moving a stage 20 in the Z-axis direction is assigned and (B) an explanatory view of the movement of the stage 20 in the X- and Y-axis directions in the operation according to the present embodiment (normal function area mode, normal movement mode). Described below with reference to FIGS. 10 through 12 is the control of the CPU 201 depending on the operation of the touch panel 207 based on the flowchart in FIG. 6 about the operation of the electric stage 20 in the Z-axis direction.

Figure 10A:
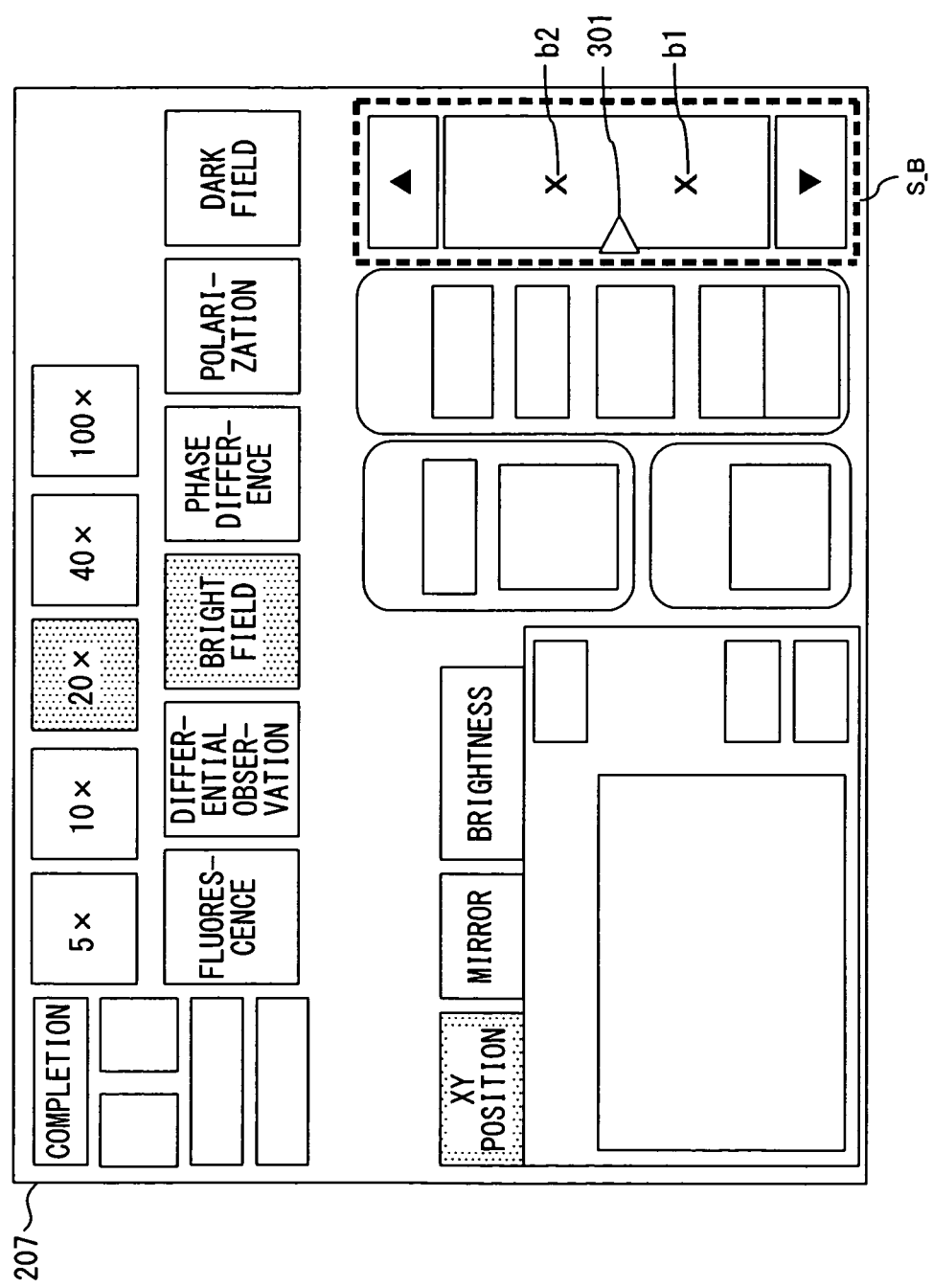
FIG. 10A is an explanatory view of an operation in the function area S_B to which the function for moving a stage 20 in the Z-axis direction is assigned.
Figure 10B:
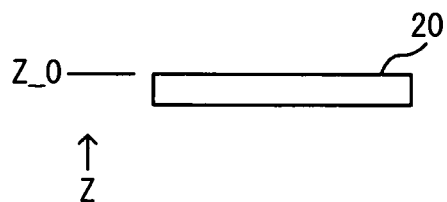
FIG. 10B is an explanatory view (1) of the movement of the stage 20 in the X- and Y-axis directions in the operation according to the first embodiment (normal function area mode, normal movement mode)

In FIG. 10A, a bar 301 indicates the position of the coordinates of the electric stage 20 in the Z-axis direction. The higher in the function area S_B the bar 301 is located, the closer the electric stage 20 is located with respect to the objective 23, and the lower the bar is located, the farther the electric stage 20 is located with respect to the objective 23. When there is no input in the function area S_B in FIG. 10A, it is assumed that the electric stage 20 is located at the position of the Z coordinates. Z_0 as illustrated in FIG. 10B.

Described below is the case in which a user touches the position of the point b1 in the function area S_B illustrated in FIG. 10A, and performs the dragging operation (the operation of moving from the point b1 to the point b2 with the touch maintained on the touch panel) to the position of the point b2. In this case, the microscope controller 2 instructs the stage Z drive control unit 22 through the microscope control unit 31 so that the objective 23 and the electric stage 20 may be closer to each other.

The moved distance of the electric stage 20 in the Z-axis direction corresponds to the distance of the dragging operation on the function area S_B on the touch panel 207. The microscope controller 2 instructs the microscope control unit 31 to make a movement by the distance obtained by multiplying the distance on the touch panel 207 by the distance of the coefficient Ib. Then, as illustrated in FIG. 11B, when the dragging operation by the distance of ZB is performed from the point b1 to the point b2, the objective 23 becomes closer to the electric stage 20 from the coordinates Z_0 to the Z_1 of the electric stage 20 by the distance of ZB×1b.

Described next is the case in which the user touches the position of the point b2 in the function area S_B and performs the dragging operation toward the position of the point b1 along the regular frame 209. In this case, the microscope controller 2 instructs the stage Z drive control unit 22 to perform control to make a movement so that the objective 23 becomes farther from the electric stage 20.

In the state illustrated in FIGS. 11A and 11B, as illustrated in FIG. 12A, when the dragging operation is performed by the distance of ZB' from the point b3 to the point b4, control is performed to move the electric stage 20 by the distance of ZB'×1b from the coordinates Z_1 to Z_2 of the electric stage 20 in the direction so that the objective 23 becomes closer to the electric stage 20. During the dragging operation, the position of the electric stage 20 is traced depending on the dragging position.

According to the present embodiment, the coefficient Ib is fixed. However, it may be switched, and the corresponding Ib may be varied for each objective 23.

Described next is the switching operation of the electric revolver 24.

FIGS. 13 and 14 are (A) an explanatory view of an operation on a function area S_C to which a function for switching an objective by an electric revolver 24 is assigned and (B) an explanatory view (1) of the position of the objective arranged on the electric revolver 24 in the operation according to the present embodiment (normal function area mode). Described below with reference to the flowchart in FIG. 6 is the control of the CPU 201 depending on the operation of the touch panel 207 on the switching operation of an objective by the electric revolver 24 with reference to FIGS. 13 and 14.

Figure 13A:
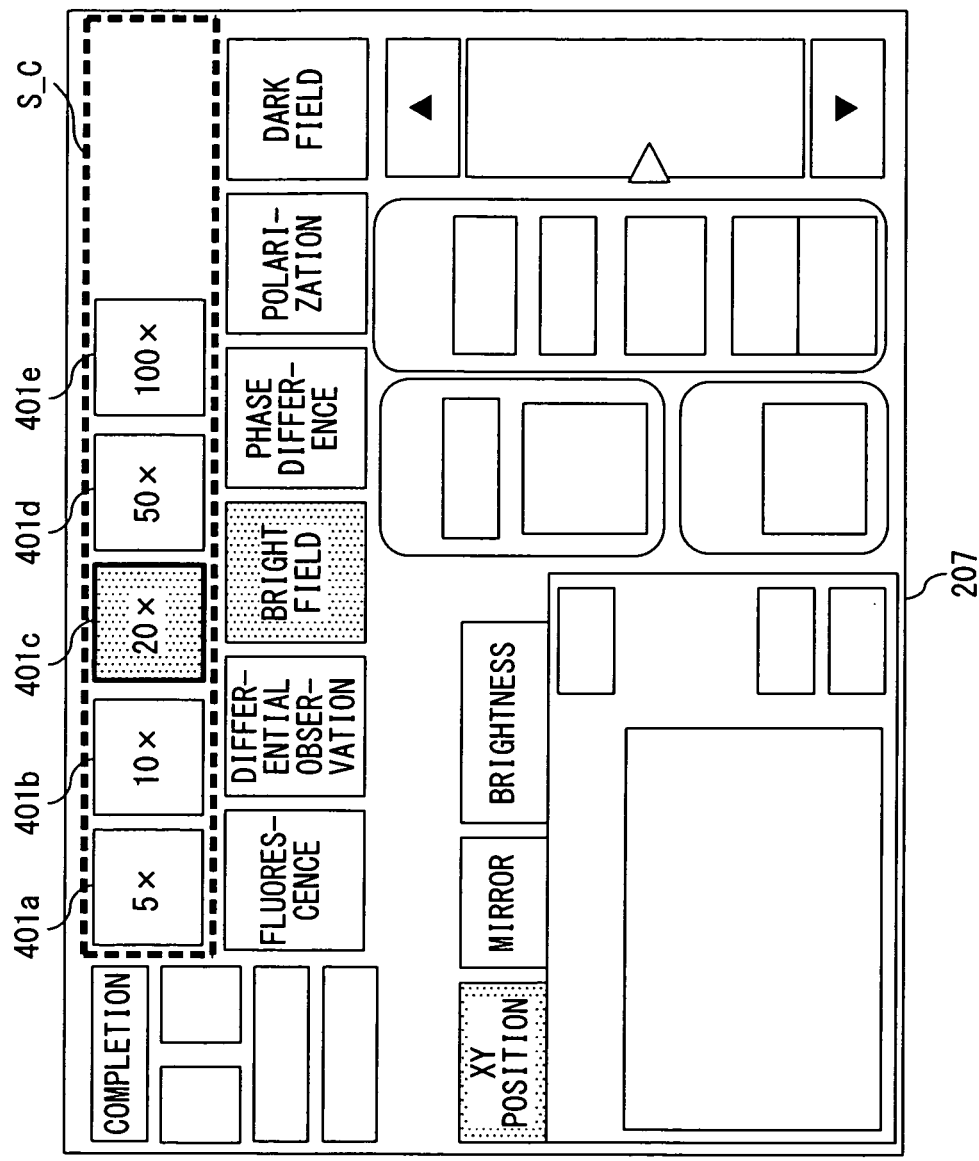
FIG. 13A is an explanatory view of an operation on a function area S_C to which a function for switching an objective by an electric revolver 24 is assigned.
Figure 13B:
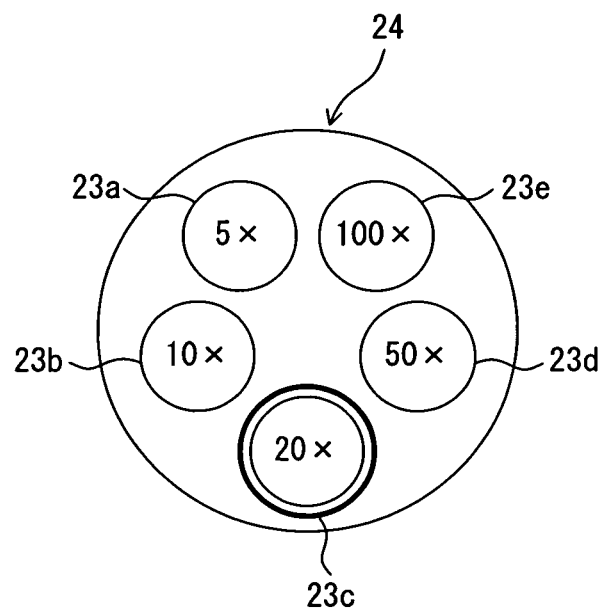
FIG. 13B is an explanatory view (1) of the position of the objective arranged on the electric revolver 24 in the operation according to the first embodiment (normal function area mode)

According to the present embodiment, as illustrated in FIG. 13B, the electric revolver 24 is provided with an objective 23a with a magnification of 5, an objective 23b with a magnification of 10, an objective 23c with a magnification of 20, an objective 23d with a magnification of 50, and an objective 23e with a magnification of 100, and the objective 23c with a magnification of 20 is inserted into the optical axis.

As illustrated in FIG. 13A, icons 401a through 401e corresponding to the objectives 23a through objective 23e attached to the electric revolver 24 are displayed on the screen in the function area S_C. The icon 401a is highlighted to indicate the objective inserted into the current optical path, and displayed as distinguished from other icons 401a, 401b, 401d, and 401e. In this example, the icon corresponding to the objective 23c with a magnification of 20 is highlighted.

Figure 14A:
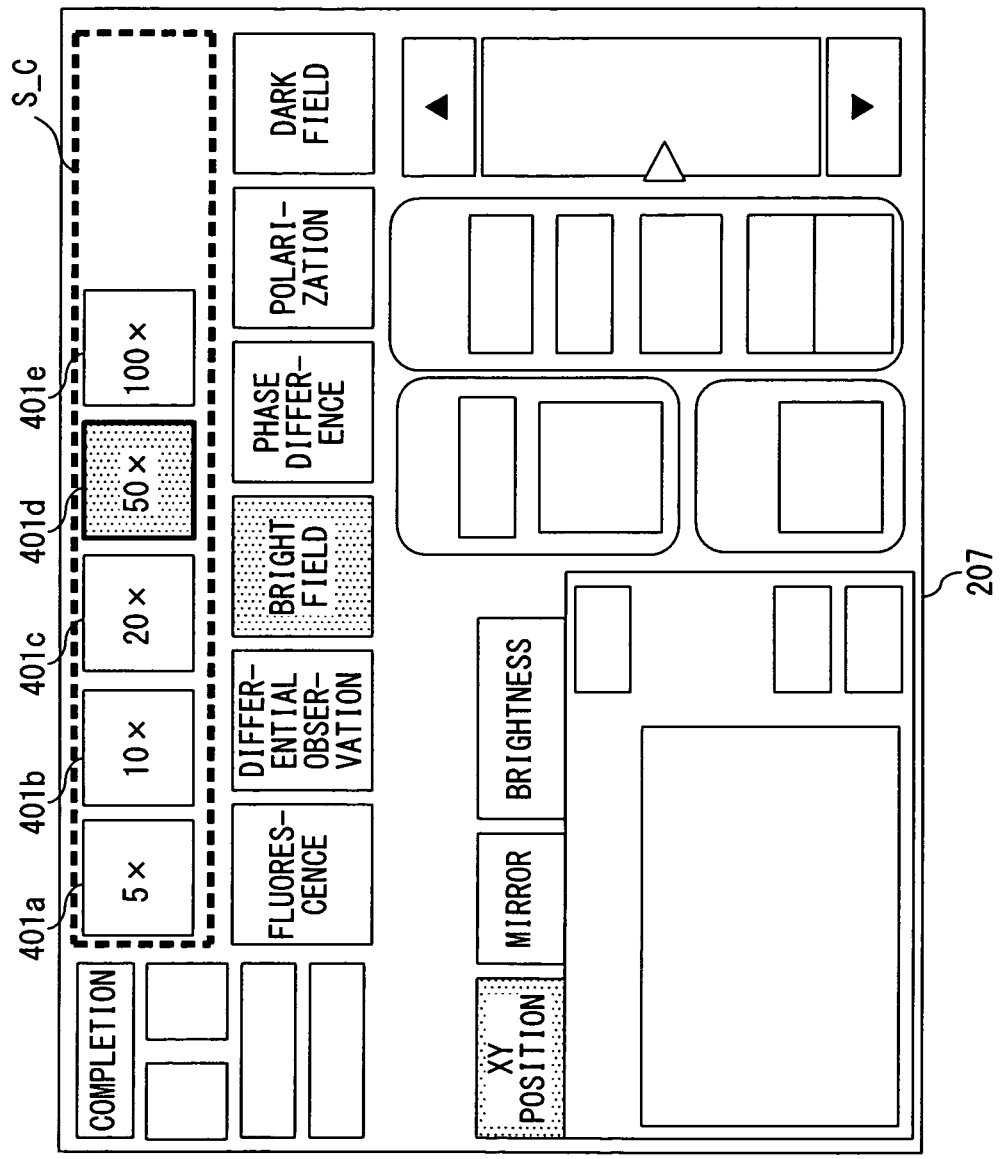
FIG. 14A is an explanatory view of an operation on a function area S_C to which a function for switching an objective by an electric revolver 24 is assigned.

The user touches the function area S_C, and detaches his or her finger at the position of the icon 401d illustrated in FIG. 14A. The microscope controller 2 detects the position at which the user detaches his or her finger on the touch panel 207.

Figure 14B:
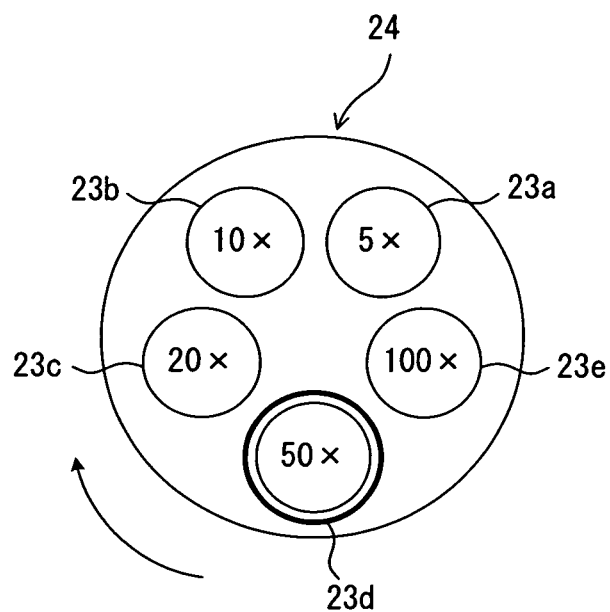
FIG. 14B is an explanatory view (2) of the position of the objective arranged on the electric revolver 24 in the operation according to the first embodiment (normal function area mode)

The microscope controller 2 instructs the microscope control unit 31 to control the revolution of the electric revolver 24 switches from the objective 23c with the magnification of 20 to the objective 23d with the magnification of 50 corresponding to the icon 401d to be inserted into the observation optical path as illustrated in FIG. 14B.

Then, to display the icon of the objective currently inserted into the optical path, the icon 401c is switched for display as distinguished from other icons 401a, 401b, 401d, and 401e.

In the present embodiment, the objective corresponding to the icon at the position where the finger is detached on the touch panel 207 is inserted, but the objective corresponding to the icon at the touching position may be inserted.

For the function area S_D and the function area S_F, the function corresponding to the icon at the detaching position is selected in each function area, and the operation is similar to that in the function area S_C. Therefore, the explanation is omitted here.

The function area S_E is an area in which the operation of the microscope component assigned to the function area S_A is to be switched. The function area S_E is described with reference to FIGS. 15 and 16.

Figure 15:
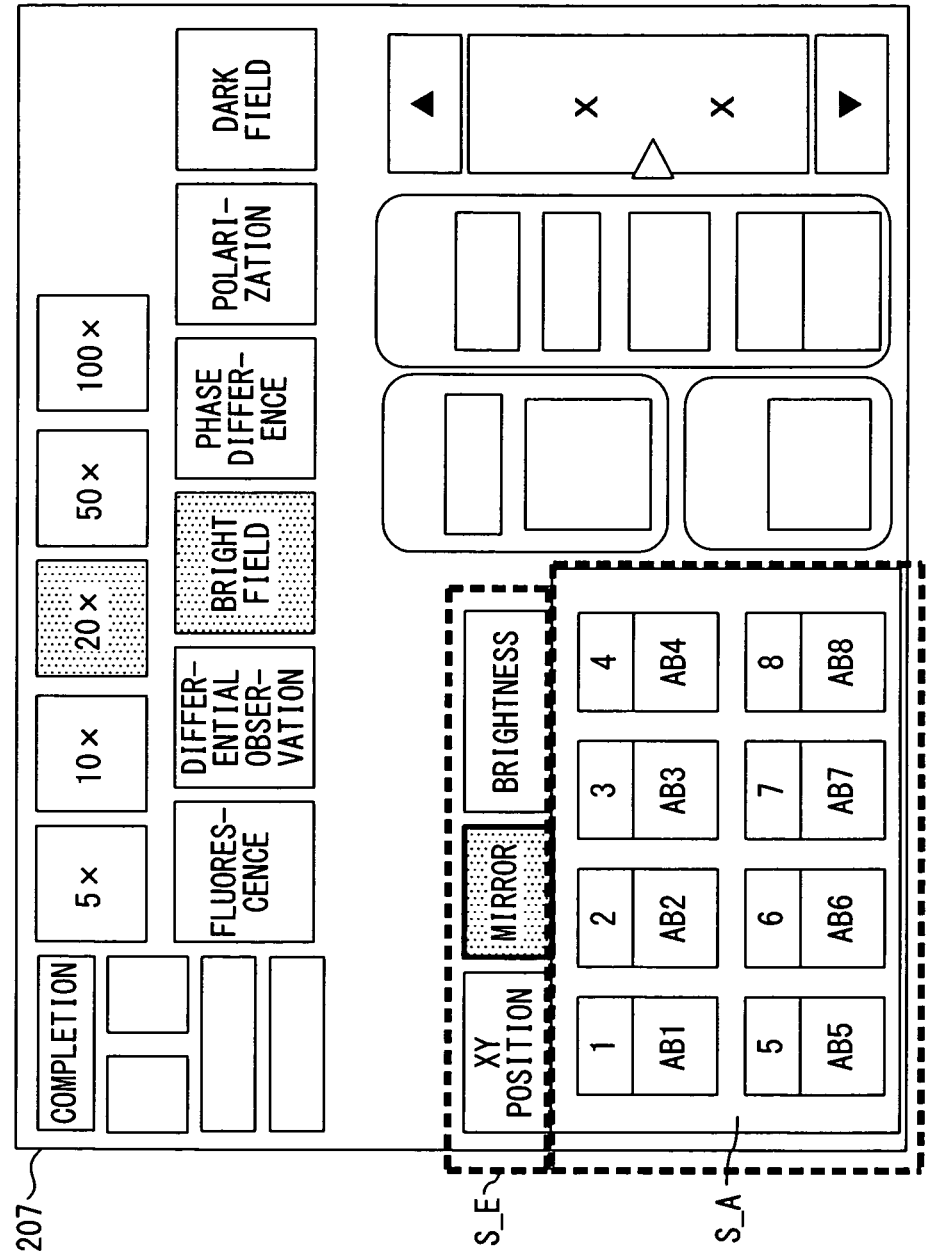
FIG. 15 is an explanatory view (1) of the operation on a function area S_E according to the first embodiment.
Figure 16:
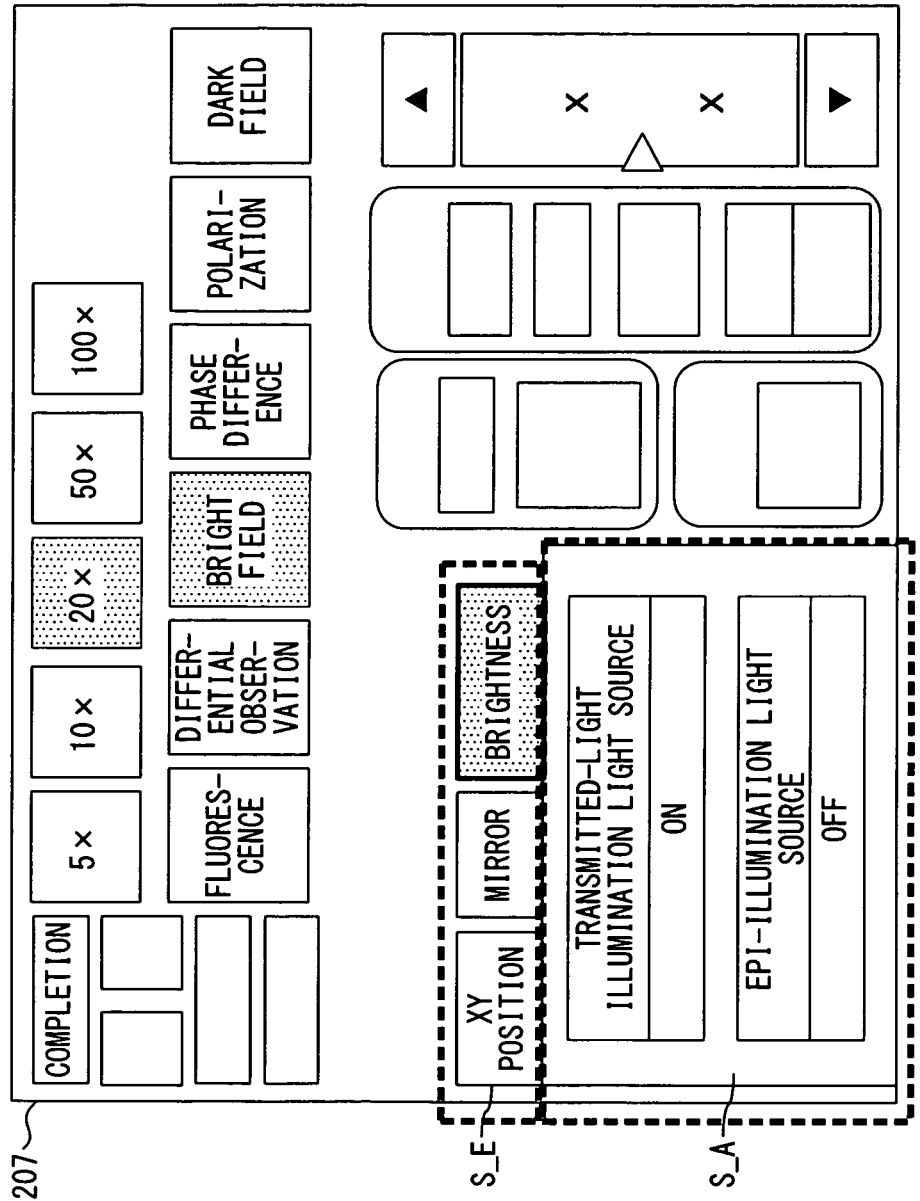
FIG. 16 is an explanatory view (2) of the operation on a function area S_E according to the first embodiment.

FIGS. 15 and 16 are explanatory views of the operations in the function area S_E according to the present embodiment. In FIG. 4, the "XY position" for the moving operation in the X- and Y-axis directions of the electric stage 20 is selected in the function area S_E. Based on the selection, the function area S_A is assigned the function for moving the electric stage 20 in the X- and Y-axis directions.

If the "mirror" displayed in the function area S_E is selected from the state in FIG. 4, the function area S_A is assigned the function of switching the electric cube turret 25 as illustrated in FIG. 15.

Furthermore, when the "brightness" displayed in the function area S_E is selected, the function area S_A is assigned the function for switching to the light adjusting operation of the transmitted-light illumination light source 6 and the epi-illumination light source 13 as illustrated in FIG. 16.

Described next is the case of the scale-up function area mode. Described according to the present embodiment is the case in which the function area S_A assigned the operation of the electric stage 20 in the X- and Y-axis directions and the function area S_B assigned the operation of the electric stage 20 in the Z-axis direction are scaled up.

Figure 17B:
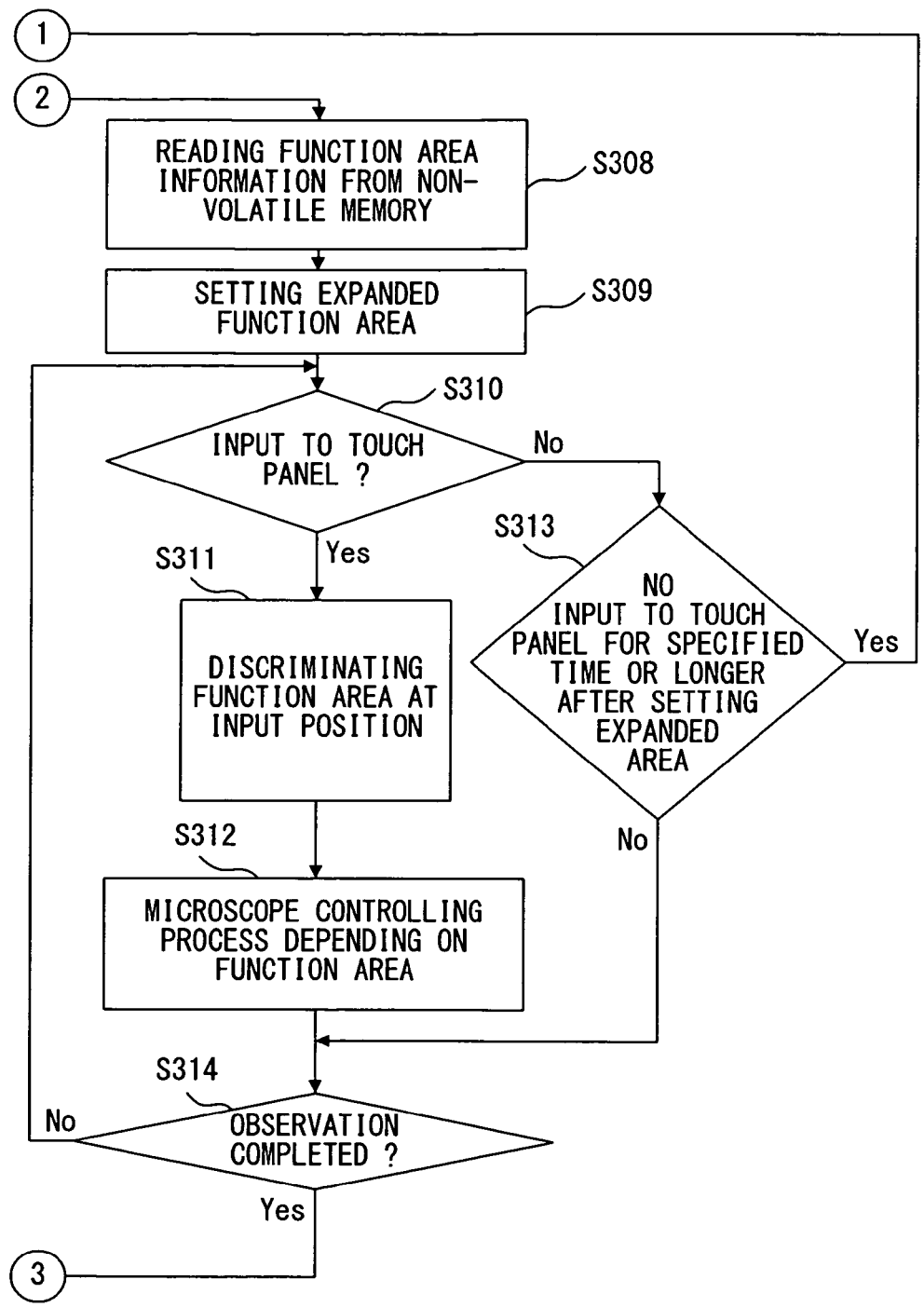

FIGS. 17A and 17B are a flowchart of the control of the microscope controller 2 in the touching operation on the function area to which the function according to the present embodiment (scale-up function area mode) is assigned. S301 through S304, S306 to S307 in FIGS. 17A and 17B are similar to the processes in S101 through S106 in FIG. 5.

First, as in the normal mode, and as in the explanation in FIG. 4, the CPU 201 reads the function area setting information stored in the non-volatile memory 204 to the ROM 203 (S301), and assigns a function to each function area (S302). Concretely, the function area S_A is assigned the operating function for moving the electric stage 20 in the X- and Y-axis directions. The function area S_B is assigned the operation function for moving the microscope device 1 of the microscope device 1 in the Z-axis direction. The function area S_C is assigned the function for operating the electric revolver 24 for switching the electric revolver 24. The function area S_D is assigned the function for performing the microscopy switching operation. The function area S_E is assigned the function area S_A switching function. The function area S_F is assigned other various setting functions.

When there is an input to the touch panel 207 (YES in S303), the CPU 201 determines to which function area an input has been made (S304). If an input has been made to the function area S_C, S_D, S_E, and S_F (NO in S305), the CPU 201 performs the controlling process depending on each function area as in the normal function area mode (S306).

Figure 18:
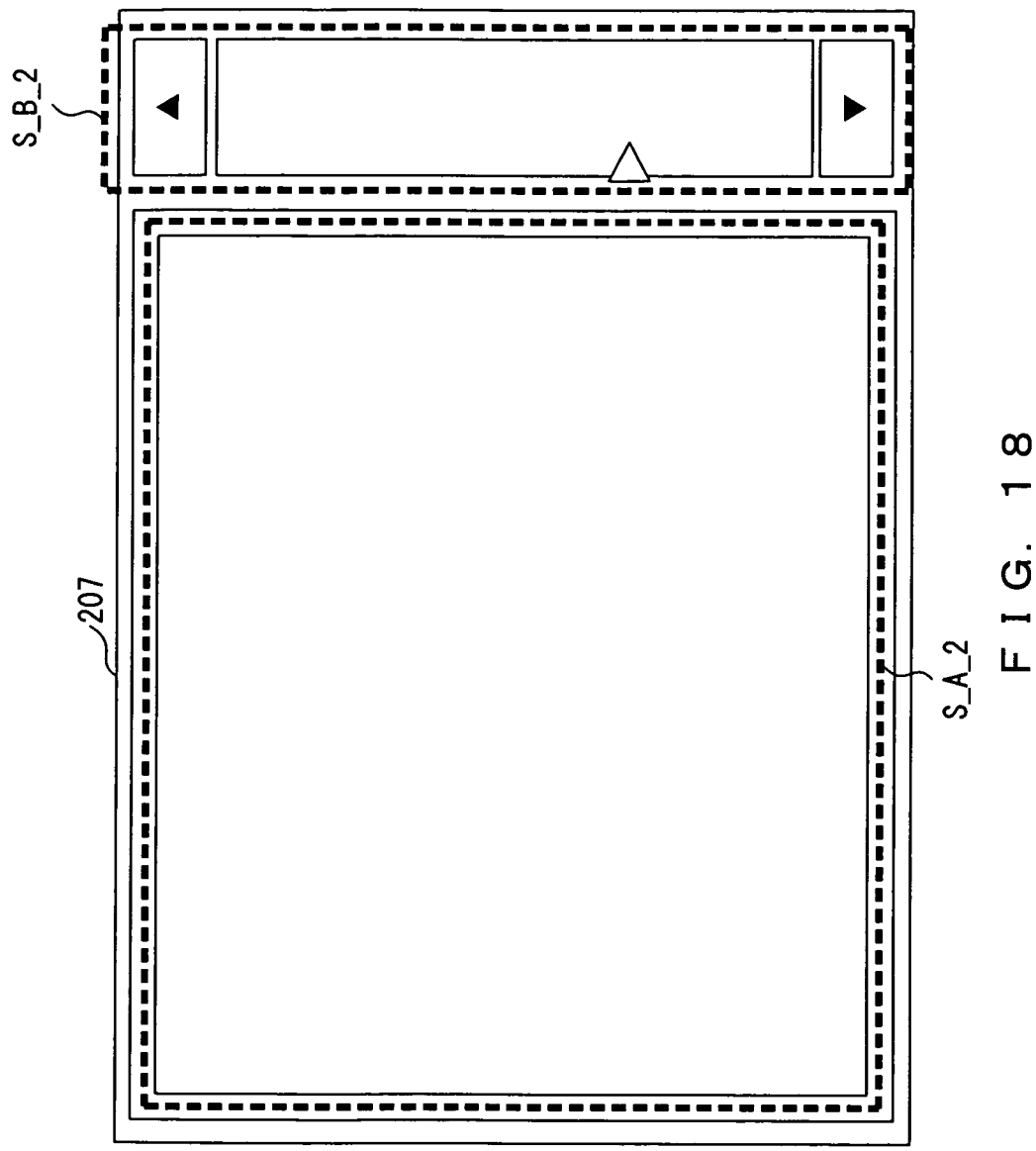
FIG. 18 illustrates a function area S_A_2 and a function area S_B_2 (embodiment 1) according to the first embodiment (scale-up function area mode)

If there is a touch input to the function area S_A or the function area S_B (YES in S305), the CPU 201 changes the display mode from the normal function area mode to the scale-up function area mode. Concretely, the CPU 201 reads the function area setting information recorded in the non-volatile memory 204 to the RAM 203 (S308), and resets the function area S_A and the function area S_B as the function area S_A_2 and the function area S_B_2 as illustrated in FIG. 18 (S309). This process is described below with reference to FIGS. 18 and 19.

FIG. 18 illustrates the function area S_A_2 and the function area S_B_2 (embodiment 1) according to the present embodiment (scale-up function area mode). FIG. 19 illustrates the function area S_A_2 and the function area S_B_2 (embodiment 2) according to the present embodiment (scale-up function area mode).

In FIG. 18, the function area S_A_2 and S_B_2 are arranged on the touch panel 207. In the case of the input to the function area S_A_2 (S311 if YES in S310), the operation function of moving the electric stage 20 in the X- and Y-axis directions is assigned (S312). In the case of the input to the function area S_B_2 (S311 if YES in S310), the operation function of moving the electric stage 20 of the microscope device 1 in the Z-axis direction is assigned (S312). In the case in FIG. 19, the function area S_A_2 is arranged to be scaled up to the function areas S_E and S_F.

If there is no input to the function area S_A_2 or S_B_2 (NO in S310, YES in S313), then control is returned to the state in FIG. 4. Instead of time control, a specific return button may be provided. In addition, when an input is made for a specified time in the function area S_A_2 or S_B_2 (NO in S310, NO in S313), control is passed to step S314. The processes in S310 through S314 are repeated until the observation is completed in the scale-up function area mode.

FIGS. 20 and 21 are (A) an explanatory view of an operation in the function area S_A_2 to which the function for moving a stage 20 in the X- and Y-axis directions is assigned and (B) an explanatory view of the movement of the stage 20 in the X- and Y-axis directions in the operation according to the present embodiment (scale-up function area mode, normal movement mode).

As illustrated in FIG. 20A, a user performs the dragging operation (operation of moving from the point a5 to the point a6 with the touch on the touch panel maintained) in the function area S_A_2 from the point a5 to the point a6 by the distance XA_2 in the X-axis direction, and the distance YA_2 in the Y-axis direction. Then, as illustrated in FIG. 20B, the electric stage 20 is moved by the distance of XA_2×Ia from the coordinate X_0 to the coordinate X_21 in the X-axis direction, and by the distance of YA_2×Ia from the coordinate Y_0 to the coordinate Y_21 in the Y-axis direction as in the normal function area mode. During the dragging operation, the position of the electric stage 20 is traced depending on the dragging position.

Similarly, as illustrated in FIG. 21A, a user performs the dragging operation (operation of moving to the point a8 with the touch on the touch panel maintained) in the function area S_A_2 from the point a7 to the point a8 by the distance XA_3 in the X-axis direction, and the distance YA_3 in the Y-axis direction. Then, in response to the dragging operation in the function area 2_A_2, the electric stage 20 is moved by the distance of XA_3×Ia from the coordinate X_0 to the coordinate X_22 in the X-axis direction, and by the distance of YA_3×Ia from the coordinate Y_0 to the coordinate Y_22 in the Y-axis direction.

During the dragging operation, the position of the electric stage 20 is traced depending on the dragging position. In the normal movement mode, although an input is continued to the touch panel at the same position at the point a8 after the dragging operation, the electric stage 20 maintains the stopped state.

Described below is the case in which the continuous movement mode is selected from among the stage movement modes. The continuous movement mode refers to a mode in which when the end point of the input by the dragging operation to the touch panel is in a specified area, the movement of the stage may be continued at a specified speed in the direction of approach to the end point immediately before the stop of the dragging operation while the input is continued at the end point in a specified time (that is, the touch is maintained at the same position after the dragging operation).

FIGS. 22A and 22B are a flowchart of the operation of the microscope controller when a dragging operation is performed on the function area S_A_2 according to the present embodiment (continuous movement mode). S401 through S403 and S405 through S407 in FIGS. 22A and 22B are the same as S201 through S206 in FIG. 6.

When the continuous movement mode is selected, the function area S_A_2 corresponding to the drive of the electric stage 20 in the X- and Y-axis directions is further divided into S_A_21 near the perimeter of the function area S_A_2 and S_A_22 as any other area. The information about the function area relating to S_A_21 and S_A_22 is also stored in advance in the non-volatile memory 204 as function area setting information.

When a user performs the dragging operation on the function area S_A_2 (YES in S401), the touch panel control unit 206 detects the X coordinate and the Y coordinate of the position input by the dragging operation on the touch panel 207 (S402). The touch panel control unit 206 transmits the detected coordinate information to the CPU 201.

When a user performs the dragging operation in the function area S_A_2 (YES in S403), the touch panel control unit 206 determines whether or not there is a change in input detection position by the dragging operation (S404).

When there is a change in input detection position by the dragging operation (NO in S404), the touch panel control unit 206 detects the coordinates corresponding to the dragging position. The touch panel control unit 206 transmits the detected coordinate information to the CPU 201. The processes in S405 through S407 performed during the dragging operation are the same as S204 through S206.

However, when there is no change in detection position in the dragging operation in the function area S_A_2 (YES in S404), the CPU 201 determines according to the coordinate information transmitted from the touch panel control-unit 206 whether or not the stop position is in the function area S_A_21 (S408).

If the stop position is in the function area S_A_21, that is, the dragging operation is stopped with the touch maintained at the same position in the function area S_A_2, the CPU 201 calculates the moved distance and the direction or movement of the electric stage 20 from the current input coordinates, the coordinate information history of the dragging operation, and the information about the currently selected objective (S409).

The CPU 201 instructs the stage X-Y drive control unit 21 through the microscope control unit 31 to move the electric stage 20 by the calculated distance and direction (S410). S410 is repeated in the function area S_A_21 during the continuous input (NO in S411).

If the stop position is not located in the function area S_A_21 in S408 (NO in S408), or if there is no input to the function area S_A_21 in S411 (YES in S411), it is determined whether or not the observation is terminated (S412). When the observation is continued (NO in S412), control is returned to step S401.

FIGS. 23 through 25 are (A) an explanatory view of an operation in the function area S_A_2 to which the function for moving a stage 20 in the X- and Y-axis directions is assigned and (B) an explanatory view of the movement of the stage 20 in the X- and Y-axis directions in the operation in the continuous movement mode according to the present embodiment. Described below is the control of the CPU 201 depending on the operation of the touch panel 207 according to the flowchart in FIGS. 22A and 22B on the operation of the electric stage 20 in the X- and Y-axis directions.

As illustrated in FIG. 23A, a user performs the dragging operation (operation of moving from the point a5 to the point a6 with the touch on the touch panel maintained) in the function area S_A_2 from the point a5 to the point a6 by the distance XA_2 in the X-axis direction, and the distance YA_2 in the Y-axis direction. Then, as illustrated in FIG. 23B, the electric stage 20 is moved by the distance of XA_2×Ia from the coordinate X_0 to the coordinate X_21 in the X-axis direction, and by the distance of YA_2×Ia from the coordinate Y_0 to the coordinate Y_21 in the Y-axis direction as in the normal function area mode. During the dragging operation, the position of the electric stage 20 is traced depending on the dragging position.

Next, as illustrated in FIG. 24A, a user performs the dragging operation (operation of moving from the point a7 to the point a8 with the touch on the touch panel maintained) in the function area S_A_22 from the point a7 to the point a8 by the distance XA_3 in the X-axis direction, and the distance YA_3 in the Y-axis direction, and the input (touch) is maintained at the same position at the point a8 for a specified time T1 as described below.

First, a user performs the dragging operation from the point a7 to the point a8 in the function area S_A_21. In this case, as illustrated in FIG. 24B, the electric stage 20 is moved by the distance of XA_3×Ia from the coordinate X_0 to the coordinate X_22 in the X-axis direction, by the distance of YA_3×Ia from the coordinate Y_0 to the coordinate Y_22 in the Y-axis direction During the dragging operation, the position of the electric stage 20 is traced depending on the dragging position.

Next, after the completion of the dragging operation, as illustrated in FIG. 25A, the user continues the input (touch) for a specified time T1 on the touch panel at the same position at the position A8 in the function area S_A_21.

The CPU 201 controls the stage X-Y drive control unit 21 through the microscope control unit 31 while inputting (touching) the point a8, and the electric stage 20 continues moving in the same direction (angle) D1 as the direction of the movement to the point a8 as illustrated in FIG. 25B.

The direction of the movement of the electric stage 20 is calculated as follows. The CPU 201 acquires the stage history information from the RAM 203. According to the stage history information, the CPU 201 calculates the direction D1 of the movement of the electric stage 20 from the direction (angle) obtained by connecting the point a8 to the point a8' as the position of the immediately previous dragging operation at the position apart by a specified distance R. As a result, the electric stage 20 moves in the direction of D1.

The moving speed of the stage is variable depending on the currently selected objective as described below with reference to FIG. 26.

FIG. 26 is an example of a continuous movement speed table storing the continuous movement speed set for each objective according to the present embodiment (continuous movement mode). The ID in the table refers to the information for identification of an objective. The continuous movement speed table is stored in the non-volatile memory 204.

For example, when the objective with a magnification of 50 is currently selected, the movement of the electric stage 20 is continued at the speed of V4 while the user performs the dragging operation from the point a7 to the point a8 in the direction of D1 and continues the input at the point 8. In this case, the CPU 201 instructs the microscope control unit 31 to move the microscope controller 2 at the speed of V4 based on the continuous movement speed table.

That is, when the dragging operation is performed from the point in the function area S_A_22 to the point in the function area S_A_21, and the input (touch) is further continues in the function area S_A_21 even after the dragging operation stops, the microscope controller 2 is continuously moved at the speed of V4 in the direction of the movement of the electric stage 20 immediately before stopping the dragging operation.

Furthermore, the moving speed of the electric stage 20 is determined for each objective, but there may be a switch to a mode in which the moving speed from the point a8' to the point a8 is taken over. For example, if the stage moving speed from the point a8' to the point a8 is V4', and the input (touch) is continued to the touch panel for a specified time T1 in the same position at the point a8, then V4' is set as the moving speed of the stage.

The moving speed of the electric stage 20 is fixed depending on the selected objective or the moving speed from the point a8' to the point a8, but the speed is not limited to the values. For example, depending on the lapse of time in which the input (touch) is continued in the function area S_A_21, the movement of the electric stage 20 may be accelerated.

In the description above, the dragging operation is performed over the function area S_A_21 and the function area S_A_22. However, it is not necessary to always cover the boundary. For example, when the dragging operation is performed in the function area S_A_21, the process is applicable when the endpoint of the dragging operation is in the function area S_A_21 after performing the dragging operation in the function area S_A_21. In this case, during the dragging operation, the position of the electric stage 20 is traced depending on the dragging position. After the completion of the dragging operation, if the input is continued at the same position in the function area S_A_21, the movement of the electric stage 20 may be continued in the X- and Y-axis directions as with the example above.

That is, if the end point of the dragging operation is in the function area S_A_21, and the input is continued for a specified time at the end point, the movement of the electric stage 20 is continued in the same direction as the direction of the movement from the dragging point immediately before to the position where the dragging operation is terminated.

In the description above, the continuous movement of the electric stage 20 in the X- and Y-axis directions in the function area S_A_2 is described, but it is also applicable to the function area S_B_2. That is, the upper end area and the lower end area of the function area S_B_2 may be set as areas corresponding to the function area S_A_21, and other areas may be set as an area corresponding to the function area S_A_22. Thus, if the user performs the dragging operation from the point in the area corresponding to the function area S_A_22 to the point in the area corresponding to the function area S_A_21, and the input (touch) is continued at the same position for a specified time T1 at the end point of the dragging operation, then the movement of the electric stage 20 is continued in the Z-axis direction.

The area of the function area S_A_21 may be arbitrary set.

Then, if the range of the function area S_2_21 set as including S_B_2, that is, the function of the function area S_2_21 is expanded to the area of S_B_2 as described below with reference to FIGS. 27 and 28.

FIGS. 27 and 28 are (A) an explanatory view of a touching operation when the range of a function area S_A_21 is set so as to include the range of the function area S_B_2 and (B) an explanatory view of the movement of the stage 20 in the X- and Y-axis directions in the operation according to the present embodiment (scale-up function area mode, continuous movement mode). In the description below, the control of the CPU 201 depending on the operation of the touch panel 207 is described based on the flowchart in FIGS. 22A and 22B relating to the operation of the electric stage 20 in the Z-axis direction with reference to FIGS. 27 and 28.

The function area S_B_2 normally accepts the moving operation of the electric stage 20 of the microscope device 1 in the Z-axis direction. However, if the function area S_B_2 continuously receives an input from the function area S_A_2, it functions as the function area S_A_21 in the function area S_A_2. That is, when the dragging operation is started in the function area S_A_2, the function to be set in the function area S_A_21 is set in the function area S_B_2. The setting continues while the user keeps touching on the touch panel 207. When the user touch terminates, the original function is set again in the function area S_B_2.

The dragging operation (the moving operation from the point a9 to the point a10 with the touch on the touch panel maintained) by the distance of XA_4 in the X-axis direction and the distance of YA_4 in the Y-axis direction is performed from the point a9 in the function area S_A_22 to the point a10 in the function area S_B_2, and the input (touch) is continuously performed at the same position in the specified time T2 at the point a10 as described below.

As illustrated in FIG. 27A, assume that the dragging operation is performed from the point a0 to the point a10 in the function area S_B_2 (expanded function area S_A_21). In this case, as illustrated in FIG. 27B, the electric stage 20 is moved by the distance of XA_4×Ia from the coordinate X_0 to the coordinates X_23 in the X-axis direction and by the distance of YA_4×Ia in the Y-axis direction from the coordinate Y_0 to the coordinates Y_23.

During the dragging operation, the position of the electric stage 20 is traced depending on the dragging position. Assume that, after performing the dragging operation, the input (touch) is continued for a specified time T2 on the touch panel at the same position at the point a10 in the function area S_B_2 (expanded function area S_A_21). In this case, while the input (touch) is continued at the point a10, the CPU 201 issues an instruction to continue the movement of the electric stage 20 in the same direction (angle) D2 as the direction (angle) in which the movement is made to the point a10 as illustrated in FIG. 28B.

The direction D2 of the movement of the electric stage 20 is calculated as follows. The CPU 201 acquires the stage history information from the RAM 203. The CPU 201 calculates the direction D2 of the movement of the electric stage 20 from the direction (angle) obtained by connecting the point a10 to the point a10' as the position of the previous dragging operation at the position apart from the specified distance R immediately before the stop of the dragging operation from the point a10. As a result, the electric stage 20 moves in the direction of D2.

The movement of the electric stage 20 is continued while the input is continued to the point a10. According to the present embodiment, for example, the electric stage 20 is moved for the time T2 in the direction D2 and at the speed V4. That is, assume that the dragging operation is performed from the point in the function area S_A_22 to the point in the function area S_B_2 (expanded function area S_A_21), and the input (touch) is continued in the function area S_A_1. In this case, the movement of the electric stage 20 is not stopped and the electric stage 20 is continuously moved in the direction in which the movement of the electric stage 20 is performed immediately before stopping the dragging operation. In this case, in the function area S_B_2, the operation of the electric stage 20 in the X- and Y-axis directions is performed as an operation of the function area at the point a9 where the dragging operation is started, and the operation of the electric stage 20 of the microscope device 1 in the Z-axis direction is not performed.

FIG. 29 is an example of the case when the continuous movement mode is realized by the normal function area mode. In the description above, the case in the scale-up function area mode is described, but as illustrated in FIG. 29, the area corresponding to S_A_21 may be set to function as S_A_11 also in the normal function area mode, and the area corresponding to S_A_22 may be set to function as S_A_12 also in the normal function area mode.

According to the present embodiment, when the end point of the input by the dragging operation to the touch panel is in a specified area, the stage may be continuously moved while the input is continued for a specified time at the end point (that is, the touch is continued at the same position after the dragging operation is performed) at a specified speed in the same direction as the direction of the approach to the endpoint immediately before stopping the dragging operation. Thus, with the controller having a limited (small) operation area such as a touch panel etc., the operability may be improved in the X- and Y-axis directions to continuously move the stage by the dragging operation.

<Second Embodiment>

In the second embodiment, when an input (touching operation) for a specified moved distance is made at a specified speed on the touch panel, the electric stage 20 is moved by a specified distance in the X- and Y-axis directions regardless of the dragging length. The same configuration, process, and function as in the first embodiment are assigned the same reference numerals, and the descriptions are omitted here. The configuration of the microscope system according to the second embodiment is the same as that according to the first embodiment.

FIG. 30 is a table of the moving speed and the moved distance according to the present embodiment. The table of the moving speed and the moved distance stores the distance and the speed used in moving the electric stage 20 by a specified distance for each objective. The ID in the table refers to the information for identification of an objective. The table of the moving speed and the moved distance is stored in the non-volatile memory 204.

FIGS. 31A and 31B are a flowchart of the operation of the microscope controller when the touching operation is performed on the function area S_A_2 according to the present embodiment. Since the normal stage operation, that is, the processes in S501 and S503 through S507 are similar to those according to the first embodiment (S201 through S206 in FIG. 6), the descriptions are omitted here.

When the user performs the dragging operation on the function area S_A_2 (YES in S501), the CPU 201 determines according to the detection signal from the touch panel control unit 206 whether or not the input of the dragging operation is performed for the length of a specified distance of SL or less on the touch panel 207 at a specified speed of SV or more in the function area S_A_2 (S502).

If it is determined (YES in S502) that the input of the dragging operation is performed for the length of a specified distance of SL or less on the touch panel 207 at a specified speed of SV or more, the CPU 201 performs the following process. That is, the CPU 201 calculates the moved distance and the direction of the movement of the electric stage 20 from the current dragging input direction and the currently selected objective information based on the information stored in the table of the moving speed and the moved distance illustrated in FIG. 30 (S508).

The CPU 201 move-controls the electric stage 20 by a specified distance based on the calculated moved distance and the direction of the movement (S509). That is, the CPU 201 move-controls the electric stage 20 by a specified distance in a specified direction regardless of the dragging length when the CPU 201 determines that the speed of the input of the dragging operation is a specified speed of SV or more and the length of the input on the touch panel 207 is a specified distance of SL or less.

Thus, for example, when the objective with a magnification of 50 is selected, the electric stage 20 is moved by L4 at the speed of V4 according to the table of the moving speed and the moved distance illustrated in FIG. 30. The moved distance is set as ½ of the distance of the vision for each objective. The direction of the movement is selected as the direction of the dragging operation.

When the normal dragging operation is performed in the function area S_A_2 (NO in S502), the same processes (S503 through S507) as in the first embodiment are performed.

FIG. 32A is an explanatory view of the operation of moving the stage 20 by a specified distance in the X- and Y-axis directions (horizontally on the figure) regardless of the dragging length. FIG. 32B is an explanatory view of the movement of the stage 20 in the X- and Y-axis directions (horizontally on the figure) in the operation according to the present embodiment (scale-up function area mode). FIG. 33A is an explanatory view of the operation of moving the stage 20 by a specified distance in the X- and Y-axis directions (vertically on the figure) regardless of the dragging length. FIG. 33B is an explanatory view of the movement of the stage 20 in the X- and Y-axis directions (vertically on the figure) in the operation according to the second embodiment (scale-up function area mode). In the following detailed description, the CPU 201 is controlled depending on the operation of the touch panel 207 according to the flowchart in FIGS. 31A and 31B relating to the operation in the X- or Y-axis direction of the electric stage 20 with reference to FIGS. 32 and 33.

In FIG. 32A, for example, when an objective with a magnification of 50 is selected, and if an input by the distance of LL1 as a distance of a specified distance of SL or less is made at a dragging speed of SV or more on the touch panel from the point a11 to the point a12 in S_A_2 of the touch panel, the electric stage 20 is moved by the distance of L4 at the speed of V4 in the X-axis direction regardless of the distance of LL1 based on the table of the moving speed and the moved distance illustrated in FIG. 30 (FIG. 32B).

In FIG. 32A, if an input by the distance of LL2 as a distance of a specified distance of SL or less is made at a dragging speed of SV or more on the touch panel 207 from the point a13 to the point a14, the stage is moved by the specified distance of L4 corresponding to the magnification of the objective in the X-axis direction regardless of the distance of LL2 (FIG. 32B).

In FIG. 32A, if an input by the distance of LL3 as a distance of a specified distance of SL or less is made at a dragging speed of SV or more on the touch panel from the point a15 to the point a16, the stage is moved by the specified distance of L4 corresponding to the magnification of the objective in the X-axis direction as illustrated in FIG. 32B regardless of the distance of LL3 (FIG. 32B).

As illustrated in FIG. 33A, the direction of the dragging operation may be changed into the Y-axis direction. In this case, for example, if an input by the distance of LL4 as a distance of a specified distance of SL or less is made at a dragging speed of SV or more on the touch panel 207 from the point a17 to the point a18, the stage is moved by the specified distance of L4 corresponding to the magnification of the objective in the Y-axis direction as illustrated in FIG. 33B regardless of the distance of LL4 (FIG. 33B).

As illustrated in FIG. 33A, if an input by the distance of LL5 as a distance of a specified distance of SL or less is made at a dragging speed of SV or more on the touch panel 207 from the point a19 to the point a20, the stage is moved by the specified distance of L4 corresponding to the magnification of the objective in the Y-axis direction regardless of the distance of LL5 (FIG. 33B).

Furthermore, as illustrated in FIG. 33A, if an input by the distance of LL6 as a distance of a specified distance of SL or less is made at a dragging speed of SV or more on the touch panel 207 from the point a21 to the point a22, the stage is moved by the specified distance of L4 corresponding to the magnification of the objective in the Y-axis direction regardless of the distance of LL6 (FIG. 33B).

FIG. 34A is an explanatory view of the operation of moving the stage 20 regardless of the dragging length. FIG. 34B is an explanatory view of the movement of the stage 20 in the X- and Y-axis directions in the operation according to the present embodiment (normal function area mode).

In the normal function area mode, as in the scale-up function area mode, if an input by the distance of LL7 as a distance of a specified distance of SL or less is made at a dragging speed of SV or more on the touch panel from the point a23 to the point a24 in S_A of the touch panel as illustrated in FIG. 34A, the electric stage 20 is moved by the distance of L4 at the speed of V4 regardless of the distance of LL7 based on the table of the moving speed and the moved distance illustrated in FIG. 30 (FIG. 34B). Similarly, from the point a25 to the point a26, and from the point a27 to the point a28, as illustrated in FIG. 34A, the electric stage 20 is moved by the distance of L4 at the speed of V4 regardless of the distance of LL8 and LL9 based on the table of the moving speed and the moved distance illustrated in FIG. 30 (FIG. 34B).

Furthermore, as described above with reference to FIGS. 33A and 33B, the direction of the dragging operation may be changed to the Y-axis direction.

The dragging operation in the X- or Y-axis direction, and the movement of the stage in the same direction as the dragging direction are described above. The description above may also be applied to the dragging operation in the diagonal direction on the XY plane and the movement of the stage in the same direction as the dragging direction. For example, in the case of the dragging operation in the diagonal direction, the movement vector of the dragging operation may be analyzed into the X component and the Y component, and the distance of the larger component is the distance of a specified distance of SL or less. If the dragging speed is SV or higher, the electric stage 20 may be moved at a specified speed and by a specified distance according to the table of the moving speed and the moved distance illustrated in FIG. 30.

As described above, if an input is made at the dragging speed of SV or higher and by a specified distance of SL or less on the touch panel 207, the stage is moved by the specified distance of L4 corresponding to the magnification of the objective in the Y-axis direction regardless of the distance of SL. Thus, the blind operation may be performed with the controller having a limited (small) operation area such as a touch panel.

<Third Embodiment>

In the present embodiment, if an dragging operation is performed at the dragging speed of SV or higher and by a specified distance of SL or less on the touch panel 207, the stage 20 is moved by the distance of one well regardless of the dragging length in the dragging direction. The same configuration, process, and function as in the first or second embodiment are assigned the same reference numerals, and the descriptions are omitted here.

FIG. 35 is an example of a configuration of the microscope system according to the present embodiment. The microscope system in FIG. 35 is obtained by changing from the erecting microscope device 1 in the first embodiment to the inverted microscope device 1b. Using the inverted microscope device 1b, the multiplate 50 on the electric stage 20 is observed.

The touch panel input operation determination unit and the inter-well movement amount setting unit correspond to the CPU 201 and the non-volatile memory 204 of the microscope controller 2 illustrated in FIGS. 35 and 3. The well interval input unit corresponds to the touch panel 207.

FIG. 36 illustrates the multiplate 50 according to the present embodiment. The multiplate 50 has a plurality of wells uniformly arranged at equal intervals. In the present embodiment, the multiplate 50 includes 96 (12×8) wells (W_A1~W_H12). The intervals of the centers of the wells in the X-axis direction are L_WX, and L_WY in the Y-axis direction. According to the present embodiment, L_WX and L_WY are equal, and L_WX=L_WY=9 mm. That is, the interval between the centers of the wells in the X-axis direction and the interval in the Y-axis direction are 9 mm as a micro-plate.

FIG. 37 illustrates a well interval input screen according to the third embodiment. A well interval input screen 60 is displayed on the touch panel 207. The well interval input screen 60 includes an input column 61 for input of the interval L_WX in the X-axis direction of the multiplate 50, and an input column 62 for input of the interval L_WY in the Y-axis direction.

FIG. 38 is a flowchart of the well interval setting operation according to the present embodiment. First, a user switches the display of the touch panel 207 of the microscope controller 2 from the normal screen (FIG. 4) to the well interval input screen for input of the well interval illustrated in FIG. 37 (S601). Then, the values of the interval L_WX in the X-axis direction of the multiplate 50 and the interval L_WY in the Y-axis direction are input (S602). The input values of the interval L_WX in the X-axis direction, and the interval L_WY in the Y direction are recorded in the non-volatile memory 204 of the microscope controller 2 (S603). After the input, control is passed to the normal screen (FIG. 4) again (S604). According to the present embodiment, it is assumed that the value of L_WX=9 mm and L_WY=9 mm are recorded.

Since the normal stage operation is similar to that according to the first embodiment, the explanation is omitted here.

FIG. 39 is a flowchart of the operation of the microscope controller when the touching operation is performed on the function area S_A_2 according to the present embodiment. As illustrated in FIG. 39, when the normal dragging operation is performed in the function area S_A_2, the operation is similar to that according to the first embodiment.

FIG. 40 is an explanatory view of the operation of moving the stage 20 by one well distance in the X- and Y-axis directions (horizontally on the figure) regardless of the dragging length according to the present embodiment (scale-up function area mode). Described below with reference to FIG. 32A is the case in which the dragging operation input is made at a specified speed of SV or higher and an input with the length of a specified distance or less is made on the touch panel in the function area S_A_2.

When the dragging operation input is made at a specified speed of SV or higher and an input with the length of a specified distance or less is made on the touch panel, the CPU 201 determines that it is a specified operation.

If it is determined that the specified operation has been performed, the CPU 201 moves the electric stage 20 by the distance of one well regardless of the dragging length according to the well interval distance L_WX in the X-axis direction and the well interval distance L_XY in the Y-axis direction recorded in the electric revolver 24 of the microscope controller 2.

FIG. 41 is a view obtained by scaling up the multiplate 50 in FIG. 36. Assume that the point of S_W_1 in the well W_A1 of the multiplate 50 is observed. That is, the stage coordinates of the center of the observation (vision) are the coordinates of S_W_A1.

As illustrated in FIG. 40, when an input with the distance of LL10 as a distance of less than the specified distance of SL is made at a dragging speed of SV or less on the touch panel 207 from the point a30 to the point a31 in S_A_2 of the touch panel as illustrated in FIG. 40, the CPU 201 determines that it is a specified operation. That is, with the starting point of the dragging operation as S_XY, the CPU 201 determines the direction of the movement of the electric stage 20 from the direction of the dragging operation. According to the present embodiment, as illustrated in FIG. 42, the direction of the dragging operation is divided into four sections, that is, X+, X−, Y+, and Y− around the starting point of the dragging operation. Then, the CPU 201 determines which the direction of the dragging operation is.

When it is determined that the direction of the dragging operation is X+, the CPU 201 determines that the electric stage 20 is driven toward the X coordinate indicating a + value with the Y-axis direction fixed. When it is determined that the direction of the dragging operation is X−, the CPU 201 determines that the electric stage 20 is driven toward the X coordinate indicating a +− value with the Y-axis direction fixed. When it is determined that the direction of the dragging operation is Y+, the CPU 201 determines that the electric stage 20 is driven toward the X coordinate indicating a + value with the X-axis direction fixed. When it is determined that the direction of the dragging operation is Y−, the CPU 201 determines that the electric stage 20 is driven toward the Y coordinate indicating a +− value with the X-axis direction fixed. That is, when the dragging operation is performed from the point a30 to the point a31, it is determined that the value indicates X+, and the CPU 201 determines that the stage is driven toward the X coordinate indicating a + value with the Y-axis direction fixed.

Next, if the direction of the movement is determined, the CPU 201 sets the movement distance of the electric stage 20. That is, when the direction of the movement is determined as the X-axis direction (X+, X−), the CPU 201 sets the value of L_WX. When the direction of the movement is determined as the Y-axis direction (Y+, Y−), the CPU 201 sets the value of L_WY. When the dragging operation is made from the point a30 to the point a31, it is determined as X+, and the CPU 201 sets the value of L_WX=9 mm as a moved distance (S701).

If the direction of the movement and the moved distance are set, the CPU 201 moves the electric stage 20 by the set moved distance in the set direction of the movement. If the dragging operation is performed from the point a30 to the point a31, the electric stage 20 is driven by L_WX=9 mm in the direction with the X coordinate indicating a + value with the Y-axis direction fixed. The movement of the observation position in the X-axis direction with the drive of the electric stage 20 is described below with reference to FIG. 43.

FIG. 43 is an explanatory view of the movement of the observation position in the X-axis direction with the drive of the electric stage 20 according to the present embodiment. The CPU 201 controls the movement of the observation position from the point of S_W_A1 of the well S_A1 in FIG. 43 (A) to the point of S_W_A2 of the well W_A2 after the stage is moved by one well (L_WX=9 mm) as illustrated in FIG. 43 (B) (S702).

Furthermore, when an input with the distance of LL11 as a distance of less than the specified distance of SL is made at a dragging speed of SV or less on the touch panel from the point a32 to the point a33, the CPU 201 controls the drive of the electric stage 20 by L_WX=9 mm in the direction in which the X coordinate indicates a + value with the Y-axis direction fixed regardless of the distance of LL11.

That is, the observation position is moved from the point of S_W_A2 of the well W_A2 in FIG. 43 (B) to point of S_W_A3 of the well W_A3 moved by one well (L_WX=9 mm) in FIG. 43 (C).

Then, the movement in the Y-axis direction is described below. In FIG. 41, assume that the point of S_W_A1 in the well W_A1 of the micro-plate is observed. Then, as illustrated in FIG. 44, when an input with the distance of LL10 as a distance of less than the specified distance of SL is made at a dragging speed of SV or less on the touch panel from the point a34 to the point a35 in S_A_2 of the 207, the CPU 201 determines it as a specified operation. Then, the CPU 201 determines the direction of the dragging operation illustrated in FIG. 42. Since it is determined as Y− when the dragging operation is performed from the point a34 to the point 35, the CPU 201 determines that the stage is driven in the direction in which the Y coordinate indicates a − value with the X-axis direction fixed.

When the direction of the minimum is determined, the CPU 201 sets the moved distance of the electric stage 20. When the dragging operation is performed from the point a34 to the point a35, the CPU 201 sets the value of L_WX=9 mm as a moved distance.

When the direction of the movement and the moved distance are set, the CPU 201 controls the electric stage 20 so that it is moved in the set direction of the movement by the set distance of the movement. When the dragging operation is performed from the point a34 to the point a35, the stage is driven by L_WY=9 mm in the direction in which the X-axis direction is fixed and the Y coordinate indicates a − value. The movement of the observation position in the Y-axis direction with the drive of the electric stage 20 is described below with reference to FIG. 45.

FIG. 45 is an explanatory view of the movement of the observation position in the Y-axis direction with the drive of the electric stage 20 according to the present embodiment. The observation position is moved from the point of S_W_A1 of the well W_A1 in FIG. 45 (A) to the point S_W_B1 of the well W_B1 moved by one well (L_WX=9 mm) illustrated in FIG. 45 (B).

In the present embodiment, as illustrated in FIG. 42, the direction is divided into four sections, that is, X+, X−, Y+, and Y− abound the starting point of the dragging operation, but the direction may be divided into eight sections. That is, the direction may be further divided into the diagonally upper right direction, the diagonally lower right direction, the diagonally upper left direction, and the diagonally lower left direction in addition to the vertical and horizontal directions around the starting point of the dragging operation. Thus, when the dragging operation is performed in any of the diagonal directions, the electric stage 20 may be moved by the distance of one well in the corresponding direction.

As described above, when the dragging operation is performed by the distance of less than a specified distance of SL at a dragging speed of SV or higher on the touch panel 207, the electric stage 20 may be moved by one well in the specified direction. Thus, a blind operation may be performed with a controller having a limited (small) operation area such as a touch panel.

<Fourth Embodiment>

In the present embodiment, when a touch input is continuously made in a specified time in a specific function area on the touch panel 207, the electric stage 20 is moved in a specified direction by a distance of one well depending on the function area as described below. The same configurations, processes, and functions as those according to the first, second, and third embodiments are assigned the same reference numerals, and the descriptions are omitted here. Since the input of the values of the interval L_WX in the X-axis direction and the interval L_WY in the Y-axis direction of the multiplate 50 is also similar to that according to the third embodiment, the explanation is omitted here.

When the normal dragging operation is performed in the function area S_A_2, the operation is similar to that according to the first embodiment.

FIG. 46 illustrates the function area on the touch panel according to the fourth embodiment the function area on the touch panel according to the present embodiment. The CPU 201 divides the display region of the touch panel 207 into the function areas SS_1 through SS_8.

FIG. 47 is an explanatory view of the case in which an input by two continuous touches is made at the same place within a specified time T2 in a specific function area SS_1 according to the fourth embodiment. If there are two or more continuous touch inputs in a specified time T2 in the function area SS_1, the CPU 201 determines that it is a specified operation. If a specific operation is determined, the CPU 201 moves the electric stage 20 by the distance of one well regardless of the dragging length according to the information about the well interval distance L_WX in the X-axis direction and the well interval distance L_WY in the Y-axis direction recorded in the electric revolver 24 of the microscope controller 2.

FIG. 48 is an explanatory view of the movement of the observation position with the drive of the electric stage 20 according to the fourth embodiment. It is observed that the point of the S_W_A1 in the well W_A1 of the 50 is observed. That is, relating to the coordinates of the stage, the coordinates of the center of the observation (vision) is the coordinates of S_W_A1.

FIG. 49 is an example of a microscope system operation control table used in the case in which an input by two continuous touches is made at the same place within a specified time T2 in each function area according to the present embodiment. The microscope system operation control table in FIG. 49 is stored in the RAM 202 or the non-volatile memory 204. The microscope system operation control table includes data items of, for example, an "ID" 41, an "input area" 42, a "touch panel input specified operation" 43, a "drive portion" 44, and a "control contents" 45.

The "ID" 41 stores the information for identification of a touch panel input specific operation. The "input area" 42 stores the information for identification of the function area which has received the input. The "touch panel input specified operation" 43 stores the mode of the specific operation by the touch panel input performed on the touch panel 207. The "drive portion" 44 stores the information for identification of the drive portion to be process in the specific operation by the touch panel input. The "control contents" 45 store the contents of the control for the drive portion to be process in the specific operation by the touch panel input.

The contents of the microscope system operation control table in FIG. 48 may be stored and changed, for example, on the setting screen displayed on the touch panel 207.

FIG. 50 is a flowchart of the operation of the microscope controller when the touching operation is performed on the function area SS_1 according to the present embodiment. As illustrated in FIG. 47, when the continuous touch inputs are made twice on the same place within a specified time T2 at the point a36 in the SS_1 of the touch panel 207, the CPU 201 determines that it is a specific operation (S801).

Then, the CPU 201 sets the direction and the distance of the movement of the electric stage 20. That is, the CPU 201 determines that two continuous touch inputs have been made on the same place within a specified time T2 in the area of SS_1. Then, the CPU 201 determines that the driving operation is to be performed in the direction in which the X coordinate indicates a + value with the Y-axis direction fixed. As a result, the CPU 201 sets the value of L_WX=9 mm as a moved distance (S802).

When the direction and the distance of the movement are set, the CPU 201 controls the electric stage 20 in the set direction of the movement by the set distance of the movement. That is, the electric stage 20 is driven by the distance of L_WX=9 mm in the direction in which the X coordinate indicates a + value with the Y-axis direction fixed. That is, the observation position is moved by one well (L_WX=9 mm) in FIG. 48 (B) from the point of S_W_A1 of the well W_A1 in FIG. 48 (A) to the point of S_WA2 of the well W_A2 (S803).

In addition, according to the microscope system operation control table in FIG. 49, if two continuous touch inputs are made at the same place in SS_2 within a specified time T2, the electric stage 20 may be moved by the distance of L_WX in the direction in which the X coordinate indicates a "−" value. In addition, if two continuous touch inputs are made at the same place in SS_3 within a specified time T2, the electric stage 20 may be moved by the distance of L_WY in the direction in which the Y coordinate indicates a "+" value. If two continuous touch inputs are made at the same place in SS_4 within a specified time T2, the electric stage 20 may be moved by the distance of L_WY in the direction in which the Y coordinate indicates a "−" value.

Thus, based on the input of the specific operation on the touch panel 207, a switch may be made to the next well. As a result, with a controller having a limited (small) operation area such as a touch panel etc., the blind operation may be performed.

The X- and Y-axis directions may be horizontally, vertically, or horizontally and vertically inverted, and a user may arbitrarily change. In addition, according to the present embodiment, the stage minimum distance by a specific operation is defined as a movement by a well interval, but it may be an moving operation to the center of the next well.

As described above, when a continuously touch input is made within a specified time in a specific function area on the touch panel 207, the electric stage 20 may be moved by one well in a specified direction depending on the function area. Thus, with a controller having a limited (small) operation area such as a touch panel etc., the blind operation may be performed.

As described above according to the first through fourth embodiments, the present invention may perform various types of improvements and changes within the gist of the present invention.

For example, in a microscope system according to the first through fourth embodiments, an erecting microscope device has been adopted as the microscope device 1, but the present invention is not limited to this device, and an inverted microscope device may be used. In addition, the first through fourth embodiments may be applied to various types of systems such as a line device into which a microscope device is incorporated.

In the first through fourth embodiments, the movement of the electric stage 20 is described. However, it is not limited to the movement of the electric stage 20 in that a part of a microscope is continuously driven by performing the dragging operation on the touch panel 207. In addition, in the first through fourth embodiments, the microscope controller having a touch panel is defined, but a device having the function equivalent to the touch panel may replace the controller.

According to the first through fourth embodiments of the microscope system, the operability in the X- and Y-axis directions by continuous movements by a dragging operation may be improved by a controller having a limited (small) operation area such as a touch panel etc. Furthermore, by assigning the embodiments to a specific operation depending on the objective and multi-well plate observation specific to a microscope, the operability of other microscopes including a stage may be improved.

<Fifth Embodiment>

Next, by inputting by plural points to the touch panel 207, a specified operation may be performed by an electric unit as described below. In this case, inputting by plural points refers to, for example, touch-operation on the touch panel 207, performing the dragging operation, and performing the dragging operation with one finger touching the same position on the touch panel, and with another finger performing the dragging operation. According to the present embodiment, for example, the touching operation is performed using two fingers. However the touching operation may be performed using three or more fingers. In the following descriptions, inputting on the touch panel 207 using a plurality of fingers (points) to allow the electric unit to perform a specified operation is hereafter referred to as a "specific operation".

FIGS. 51A and 51B are flowcharts of the operation of the microscope controller when an input of a specific operation of two points is performed on the function area S_A_2 according to the fifth embodiment. The flowcharts of FIGS. 51A and 51B are obtained by adding the processes in S901 and S902 to the flowchart in FIGS. 17A and 17B.

In S311, after the determination of the function area to which an input is made, the CPU 201 determines whether or not an input of a specific operation has been made using a two point input to the touch panel 207 based on the detection result by the touch panel control unit 206 (S901).

When it is determined that an input of a specific operation has been made by two-point input to the touch panel 207, the CPU 201 reads the microscope system operation control table described later from the RAM 202 or the non-volatile memory 204, and performs the microscope controlling process depending on the specific operation (S902). The process in S902 is described in detail with reference to FIGS. 52 through 61.

If it is determined that the input is not a specific operation by a two-point input to the touch panel 207, the CPU 201 performs a microscope controlling process depending on the function area (S312).

FIGS. 52A and 52B and FIGS. 52C and 52D are examples of a microscope system operation control table used when an input of two points is performed on the touch panel according to the fifth embodiment. The microscope system operation control table is stored in the RAM 202 or the non-volatile memory 204. The microscope system operation control table is formed by the data items of, for example, an "ID" 541, an "input area" 542, a "two-point input specific operation" 543, a "drive portion" 544, a "control contents" 545, and an "ON/OFF flag" 546.

The "ID" 541 stores the information for identification of the two-point input specific operation. The "input area" 542 stores the information for identification of the function area to which the input has been made. The "two-point input specific operation" 543 stores the mode of the specific operation by a two-point input made on the touch panel 207. The "drive portion" 544 stores the information for identification of the drive portion to be processed by the operation of the specific operation performed by the two-point input. The "control contents" 545 stores the contents of the control for the drive portion to be processed by the operation of the specific operation by the two-point input.

The "ON/OFF flag" 546 stores the information about whether the control of the two-point input specific operation indicated by the corresponding "ID" 541 is to be valid (ON) or invalid (OFF). For example, if a plurality of control contents exist for the two-point input specific operation A, then ON or OFF may be set for the "ON/OFF flag" 546. Thus, for the same specific operation, a drive portion to be processed in the specific operation may be exclusively set. FIGS. 52A and 52B and FIGS. 52C and 52D are different from each other in contents of the "ON/OFF flag" 546.

The contents of the microscope system operation control table may be entered or changed on the setting screen displayed on the touch panel 207.

FIG. 53A is an explanatory view of the case in which one point input operation is performed on the function area S_A_2 to move the stage 20 in the X- and Y-axis directions. FIG. 53B is an explanatory view of the movement in the X- and Y-axis directions of the stage 20 in the operation according to the fifth embodiment (scale-up function area mode).

As illustrated in FIGS. 53A and 53B, assume that the dragging operation (operation of moving the touch portion to the point a6 with the touch on the touch panel maintained) by the distance XA_2 in the X-axis direction and the distance YA_2 in the Y-axis direction from the point a5 to the point a6 on the function area S_A_2. In this case, as with the normal function area mode, the electric stage 20 is moved by the distance of XA_2×Ia from the coordinates X_0 in the X-axis direction, and by the distance of YA_2×Ia from the coordinates Y_0 in the Y-axis direction. During the dragging operation, the position of the electric stage 20 is traced depending on the dragging position.

FIGS. 54 and 55 are (A) an explanatory view of the case in which two point input operation is performed on the function area S_A_2 to move the stage 20 in the X- and Y-axis directions, and (B) an explanatory view (1) of the movement in the X- and Y-axis directions of the stage 20 in the operation according to the fifth embodiment (scale-up function area mode).

In FIGS. 54 and 55, the case in which a two-point input, that is, a dragging operation using two fingers is made is described. Assume that the point a5 is touched by the forefinger and the point a5' is touched by the middle finger, and the dragging operation (operation of moving the touch portion to the point a6 with the touch on the touch panel maintained) is performed using the forefinger by the distance XA_2 in the X-axis direction by the forefinger and the distance YA_2 in the Y-axis direction from the point a5 to the point a6, and simultaneously the dragging operation (operation of moving the touch portion to the point a6' with the touch on the touch panel maintained) is performed using the forefinger by the distance XA_2 in the X-axis direction by the middle finger and the distance YA_2 in the Y-axis direction from the point a5' to the point a6'.

When a two-point input is made on the touch panel 207, and the dragging operation is performed on the inputs, the CPU 201 performs the control entered in the microscope system operation control table (FIGS. 52A and 52B). FIGS. 52A and 52B store the input function area, the specific operation, the drive portion, the control contents, and its ON/OFF flag corresponding to the two-point input operation on the touch panel 207.

In the case in FIG. "ID" 541=ID 01 is selected. Therefore, the moved distance by the dragging operation by the one-point input is multiplied by the stage movement coefficient S. That is, the electric stage 20 is moved by the distance of XA_2×Ia×s from the coordinate X_0 to X_22 in the X-axis direction and by the distance of YA_2×Ia×s from the coordinate Y_0 to Y_22 in the Y-axis direction. In the fifth embodiment, for example, the movement coefficient S=3 is set. Therefore, when the dragging operation is performed simultaneously on the two points, the drive distance is three times as long as the dragging operation on one point only.

The dragging operation corresponding to the locus of the electric stage 20 is set so that the left input is prioritized according to the fifth embodiment. Therefore, in the case in FIGS. 54A and 54B, the electric stage 20 is driven corresponding to the dragging operation from the point a5 to the point a6.

In the fifth embodiment, the movement coefficient S=3. However, for example, it may be a value smaller than 1, that is, s=0.5. In this case, as compared with the dragging operation by the one-point input, the dragging operation simultaneously performed on two points requires a shorter moved distance.

Next, as illustrated in FIGS. 52C and 52D, the case in which the contents of the "ON/OFF flag" 546 of the "ID" 541=ID 01 indicate OFF from the state in FIGS. 52A and 52B and the contents of the "ON/OFF flag" 546 of the "ID" 5 41=ID 02 indicate ON is described below.

As illustrated in FIGS. 55A and 55B, while one point is fixed with respect to the function area S_A_2, the dragging operation is performed on the other point. Assume that the point a5" is touched by the thumb, and the dragging operation (the moving operation to the point a6 with the touch on the touch panel maintained) is performed by the distance XA_2 in the X-axis direction and the distance YA_2 in the Y-axis direction from the point a5 to the point a6 by the forefinger.

In this case, the CPU 201 controls entered in the table of the moving speed and the moved distance (FIGS. 52C and 52D). In the case in FIGS. 55A and 55B, the "ID" 541=ID 02 is selected. Therefore, the moved distance by the dragging operation by the one-point input is multiplied by the stage movement coefficient s. Like the operation of the ID 01, the electric stage 20 is moved by the distance of XA_2×Ia×s from the coordinate X_0 to the coordinate X_22 in the X-axis direction, and by the distance of YA_2×Ia×s from the coordinate Y_0 to the coordinate Y_22 in the Y-axis direction. In the fifth embodiment, for example, the movement coefficient S=3 is set. Therefore, when one point is fixed and the dragging operation is performed for another point, the moved distance is three times as long as that for the dragging operation for one point only.

Described next is the drive in the Z-axis direction.

FIG. 56A is an explanatory view of the case in which one point input operation is performed on the function area S_B_2 to move the stage 20 in the Z-axis direction. FIG. 56B is an explanatory view of the movement in the Z-axis direction of the stage 20 in the operation according to the fifth embodiment (scale-up function area mode).

As illustrated in FIGS. 56A and 56B, when the dragging operation is performed by the distance ZB_2 from the point b5 to the point b6 for the function area S_B_2, the movement by the distance ZB_2×1*b* is performed in the direction in which the objective 23 approaches the electric stage 20 as in the normal function area mode. During the dragging operation, the position of the electric stage 20 is traced depending on the dragging position.

FIGS. 57 and 58 are (A) an explanatory view of the case in which two point input operation is performed on the function area S_A_2 to move the stage 20 in the Z-axis direction, and (B) an explanatory view (1) of the movement in the Z-axis direction of the stage 20 in the operation according to the fifth embodiment.

As illustrated in FIGS. 57A and 57B, when the point a7 is touched in the function area S_A_2 and the dragging operation is performed by the distance of ZB_2 from the point b8 to the point b9, the CPU 201 performs the control entered in the microscope system operation control table (FIGS. 52A and 52B or FIGS. 52C and 52D). In this example, one point is fixed, and the dragging operation is performed in the Y-axis direction for another point. Therefore, the case in FIGS. 57A and 57B, the "ID" 541=ID 03 is selected. Accordingly, the movement by the distance ZB_2×Ib is performed in the direction in which the objective 23 approaches the electric stage 20. During the dragging operation, the position of the electric stage 20 is traced depending on the dragging position.

As illustrated in FIGS. 58A and 58B, when the point a7 is touched in the function area S_A_2 and the dragging operation is performed by the distance of ZB_2 from the point b10 to the point b11 in the reverse direction to FIGS. 57A and 57B, the movement is performed by the distance of ZB_2×1*b* in the direction in which the objective 23 becomes apart from the electric stage 20.

Described next with reference to FIGS. 59 through 61 is a switch of the electric revolver 24.

FIGS. 59 through 61 are (A) an explanatory view of the case in which two point input operation is performed on the function area S_A_2 to switch an electric revolver, and (B) an explanatory view of the movement in the X- and Y-axis directions of the stage 20 in the operation according to the fifth embodiment (scale-up function area mode).

The switch of the electric revolver 24 corresponds to, in the microscope system operation control table (FIGS. 52A and 52B and FIGS. 52C and 52D), the "ID" 541=ID 04, ID 05. The initial state is the state in FIGS. 59A and 59B, that is, as illustrated in FIG. 59B, it is assumed that the objective 23*c* with a magnification of 20 is selected.

As illustrated in FIG. 60A, if the point a12 in S_A_2 is touched, and the dragging operation is performed in the direction from the point a13 to the point a14, then the CPU 201 controls the electric revolver 24, and switches the objective 23 into a lens with a higher magnification (FIG. 60B).

From the state in FIGS. 60A and 60B, as illustrated in FIG. 61A, if the point a12 in S_A_2 is touched and the dragging operation is performed in the direction from the point a15 to the point a16, then the CPU 201 controls the electric revolver 24 and switches the objective 23 with a lower magnification (FIG. 61A).

With the microscope system according to the fifth embodiment, an input of a specific operation on the touch panel may be assigned to the operation of the electric stage depending on the selected objective, and the blind operation may be performed with the controller having a limited (small) operation area such as a touch panel.

In the description above, the embodiments according to the present invention is described, but the present invention is not limited to each embodiment above, and various improvements and changes may be performed within the scope of the gist of the present invention. For example, with the microscope system according to each of the above-mentioned embodiments, an erecting microscope device is adopted as the microscope device 1 which is replaced with an inverted microscope device. Furthermore, the fifth embodiment may be applied to various systems such as a line device etc. in which the microscope device is incorporated.

In the fifth embodiment, the assignment of the functions of a microscope is described with reference to the changes of the coordinates of a focusing unit, the amount of adjusted light of a light source, a magnification, the position of an optical element turret. However, the present invention is not limited to those, but a field stop, an aperture stop, and other well known electric portions or units may be used. It is obvious that the microscope device according to the present embodiment has a plurality of objectives to be switched at any time, but an objective having a zoom mechanism may be used obviously.

In the fifth embodiment, a movement of the electric stage 20 and a switch of an electric revolver are mainly described as operation targets of a specific operation by plural point input to the touch panel 207. However, in the point that the drive of a part of a microscope is performed by performing the specific operation by plural point input, the present invention is not limited to the operation. As an operation target of the specific operation by the plural point input, for example, the amount of adjusted light of a light source, an optical magnification, an optical element turret, or a microscopy may be switched. Furthermore, when the electric stage 20 is moved as an operation target of a specific operation by a plural point input to the touch panel 207, the moving speed may be changed depending on the number of input points. Furthermore, in the fifth embodiment, a microscope controller having a touch panel is used, but it may be replaced with a device having an equivalent function to the touch panel.

Furthermore, depending on the number of points to be input during the dragging operation, the speed or the distance may be changed in the stage movement.

According to the microscope system of the fifth embodiment, with the controller having a limited (small) operation area such as a touch panel etc., the operability may be improved in the X- and Y-axis directions to continuously move the stage by the dragging operation. Furthermore, by assignment to a specific operation depending on the objective specific to a microscope, the operability of a microscope including the stage and others may be improved.

What is claimed is:

1. A microscope controller which controls an operation of an electric stage used in a microscope system, comprising:
   a touch panel unit which has a display function and which receives an input by an external physical contact;
   a function setting unit which sets a stage drive function of driving the electric stage in a specified display region of the touch panel unit;
   an input detection unit which detects the input performed in an operation display region of the touch panel unit;
   a determination unit which determines a moved distance and a direction of a movement of the electric stage depending on a result of the detected input, and which generates a control instruction signal for control of the movement of the electric stage; and
   a communication control unit which transmits the control instruction signal to a stage drive control unit for control of the operation of the electric stage in X-, Y-, and Z-axis directions,
   wherein when the determination unit determines based on the detected input that the input continues at a specified position after a position of the input continuously changes in a specified direction in the operation display region, the electric stage is continuously moved in the specified direction, and
   wherein when the electric stage is continuously moved in the specified direction, the microscope controller moves the electric stage in the specified direction immediately before the continuous change of the position of the input in the specified direction in the operation display region is completed by maintaining a moving speed of the electric stage in which the stage moves corresponding to the continuous changes of the position of the input.

2. The controller according to claim 1, wherein the function setting unit sets a first display area including the specified position and a second display area excluding the first display area.

3. A system including a microscope controller according to claim 1.

4. The controller according to claim 1, wherein when the electric stage is continuously moved in the specified direction, the determination unit controls a moving speed of the electric stage depending on a lapse of time in which the input is continuously performed.

5. The controller according to claim 1, wherein when continuously moving the electric stage in the specified direction, the determination unit sets the moving speed of the electric stage depending on a magnification of an objective inserted into a revolver installed on an observation optical path of the microscope system.

6. A microscope controller which controls an operation of an electric stage used in a microscope system, comprising:
   a touch panel unit which has a display function and which receives an input by an external physical contact;
   a function setting unit which sets a stage drive function of driving the electric stage in a specified display region of the touch panel unit;
   an input detection unit which detects the input performed in an operation display region of the touch panel unit;
   a determination unit which determines a moved distance and a direction of a movement of the electric stage depending on a result of the detected input, and which generates a control instruction signal for control of the movement of the electric stage; and
   a communication control unit which transmits the control instruction signal to a stage drive control unit for control of the operation of the electric stage in X-, Y-, and Z-axis directions,
   wherein the electric stage is moved by a specified amount when the determination unit determines that the position of the input in the operation display region has continuously changed by a specified distance based on the result of the detected input, and
   wherein the microscope controller moves the electric stage based on the amount of the movement set depending on a magnification of an objective inserted into an observation optical path of the microscope system.

7. A microscope controller which controls an operation of an electric stage used in a microscope system, comprising:
   a touch panel unit which has a display function and which receives an input by an external physical contact;
   a function setting unit which sets a stage drive function of driving the electric stage in a specified display region of the touch panel unit;
   an input detection unit which detects the input performed in an operation display region of the touch panel unit;
   a determination unit which determines a moved distance and a direction of a movement of the electric stage depending on a result of the detected input, and which generates a control instruction signal for control of the movement of the electric stage; and
   a communication control unit which transmits the control instruction signal to a stage drive control unit for control of the operation of the electric stage in X-, Y-, and Z-axis directions,
   wherein the electric stage is loaded with a micro-plate having a plurality of wells;
   wherein the microscope controller further comprises an interval storage unit which stores an interval between the wells when the interval between the wells of the microplate is input to the touch panel unit; and wherein, based on the result of the detected input, when the determination unit determines that a position of the input in the operation display region has changed at a speed higher than a specified speed and continuously for a specified distance, the microscope controller moves the electric stage based on the distance between the wells which is stored in the interval storage unit.

8. The controller according to claim 7, wherein the determination unit determines that the position of the input in the operation display region has changed at a speed higher than the specified speed and continuously for the specified distance when a dragging operation has been performed on the touch panel unit at a speed higher than the specified speed for the specified distance.

9. A microscope controller which controls an operation of an electric stage used in a microscope system, comprising:
- a touch panel unit which has a display function and which receives an input by an external physical contact;
- a function setting unit which sets a stage drive function of driving the electric stage in a specified display region of the touch panel unit;
- an input detection unit which detects the input performed in an operation display region of the touch panel unit;
- a determination unit which determines a moved distance and a direction of a movement of the electric stage depending on a result of the detected input, and which generates a control instruction signal for control of the movement of the electric stage; and
- a communication control unit which transmits the control instruction signal to a stage drive control unit for control of the operation of the electric stage in X-, Y-, and Z-axis directions,
- wherein the electric stage is loaded with a micro-plate having a plurality of wells,
- wherein the microscope controller further comprises:
  - a well interval input unit for inputting a distance between wells of the micro-plate;
  - an inter-well movement amount setting unit which sets a value of a well interval input to the well interval input unit; and
  - a touch panel input operation determination unit; and
- wherein when an input operation in a function area corresponding to the electric stage which is defined as a specific operation is entered in the touch panel input operation determination unit, the microscope controller moves the stage by a value of the well interval recorded in the inter-well movement amount setting unit.

10. A non-transitory computer-readable storage medium having stored thereon an electric stage operation control program that is executable by a computer to control an operation of an electric stage used in a microscope system, the program being executable by the computer to perform processes comprising:
- a function setting process of receiving an input by an external physical contact and setting a stage operation function for operating the electric stage on a specified display region of a touch panel unit having a display function;
- a determining process of determining a moved distance and a direction of a movement of the electric stage depending on the input by the physical contact performed on an operation display region as a display region in which the stage operation function is set, and generating a control instruction signal for control of the movement of the electric stage based on a result of the determination; and
- a communication control process for transmitting the control instruction signal to a stage drive control unit for control of the operation of the electric stage in X-, Y-, and Z-axis directions.

11. A microscope controller which controls an operation of an electric stage used in a microscope system, comprising:
- a touch panel unit which has a display function and which receives an input by an external physical contact;
- a function setting unit which sets an operation function of operating the electric stage in a specified display region of the touch panel unit;
- an input detection unit which detects the input by the physical contact performed in an operation display region as a display region in which the operation function is set;
- a control unit which (i) decides a number of input points indicating a position of the input to the operation display region and a moving mode of an input point based on a result of the detected input, (ii) determines an operation mode of the electric stage based on the decided number of the input points, and (iii) generates a control instruction signal for controlling drive of the electric stage based on the determined moving mode; and
- a communication control unit for transmitting the control instruction signal to an external device for controlling an operation of the electric stage,
- wherein when the electric stage is moved in a state in which the operating function of moving the electric stage is set in the operation display region, as a result of the determination, the control unit changes the moved distance of the electric stage between a case in which the number of input points is one and a case in which one or more input points other than the specified input point are detected when the specified input point is detected.

12. The controller according to claim 11, wherein as a result of the determination, when the input point changes continuously in a specified direction in the operation display region, the control unit changes the moved distance of the electric stage between the case in which the number of input points is one and the case in which one or more input points other than the specified input point are detected when the specified input point is detected.

13. The controller according to claim 11, wherein as a result of the determination, the control unit changes the moved distance of the electric stage between a case in which one input point changes continuously in a specified direction and a case in which the position of one input point is not changed while the other input point continuously changes in a specified direction.

14. A microscope controller which controls an operation of a first electric unit used in a microscope system, comprising:
- a touch panel unit which has a display function and which receives an input by an external physical contact;
- a function setting unit which sets an operation function of operating the first electric unit in a specified display region of the touch panel unit;
- an input detection unit which detects the input by the physical contact performed in an operation display region as a display region in which the operation function is set;
- a control unit which decides a number of input points indicating a position of the input to the operation display region and a moving mode of an input point based on a result of the detected input, which determines an operation mode of the first electric unit based on the decided number of the input points, and which generates a control instruction signal for controlling drive of the first electric unit based on the determined moving mode; and a communication control unit for transmitting the control instruction signal to an external device for controlling an operation of the first electric unit, wherein based on the result of the determination, the control unit controls a second electric unit different from the first electric unit which is a target of the operating function set in the operation display region depending on the number of input points input to the operation display region.

15. The controller according to claim 14, wherein:

the first electric unit is an electric stage;

the second electric unit is a microscope control device for controlling an optical axis drive unit for moving the electric stage in an optical axis direction, a light source device, an electric revolver, an optical element turret, or a microscopic examination method;

the control unit generates the control instruction signal for realization of one of moving the electric stage in the optical axis direction by the optical axis direction drive unit, adjusting a quantity of light adjustment by the light source device, switching objectives by the electric revolver, switching an optical element by the optical element turret, and switching the microscopic examination method by the microscope control device.

16. A system including a microscope controller according to claim 14.

17. A non-transitory computer-readable storage medium having stored thereon a microscope control program that is executable by a computer which controls an operation of an electric unit used in a microscope system which comprises (i) a touch panel unit which has a display function and which receives an input by an external physical contact; (ii) a function setting unit which sets an operation function of operating the electric unit in a specified display region of the touch panel unit; and (iii) an input detection unit which detects the input by the physical contact performed in an operation display region as a display region in which the operation function is set to control the operation of the electric unit, wherein the program is executable by the computer to perform processes comprising:

a deciding process of deciding a number of input points indicating a position of the input to the operation display region and a moving mode of an input point based on a result of the detected input;

a determining process of determining an operation mode of the electric unit based on the determined number of the input points;

a generating process of generating a control instruction signal to control drive of the electric unit based on the determined moving mode; and a transmitting process of transmitting the control instruction signal to an external device for controlling the operation of the electric unit.

* * * * *